United States Patent
Song et al.

(10) Patent No.: US 8,250,619 B2
(45) Date of Patent: Aug. 21, 2012

(54) METHOD OF RECEIVING A BROADCASTING SIGNAL AND RECEIVING SYSTEM FOR RECEIVING A BROADCASTING SIGNAL

(75) Inventors: Jae Hyung Song, Seoul (KR); Chul Soo Lee, Seoul (KR); Jin Pil Kim, Seoul (KR); Jong Yeul Suh, Seoul (KR); Joon Hui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 580 days.

(21) Appl. No.: 12/481,559

(22) Filed: Jun. 9, 2009

(65) Prior Publication Data

US 2010/0017839 A1 Jan. 21, 2010

Related U.S. Application Data

(60) Provisional application No. 61/059,811, filed on Jun. 9, 2008, provisional application No. 61/076,684, filed on Jun. 29, 2008, provisional application No. 61/115,888, filed on Nov. 18, 2008, provisional application No. 61/121,178, filed on Dec. 9, 2008, provisional application No. 61/138,494, filed on Dec. 17, 2008, provisional application No. 61/145,104, filed on Jan. 15, 2009, provisional application No. 61/153,973, filed on Feb. 20, 2009, provisional application No. 61/153,985, filed on Feb. 20, 2009.

(30) Foreign Application Priority Data

Jun. 8, 2009 (KR) .......................... 10-2009-0050710

(51) Int. Cl.
*H04N 7/173* (2011.01)

(52) U.S. Cl. ............... 725/118; 725/40; 725/48; 725/51
(58) Field of Classification Search .................. None
See application file for complete search history.

(56) References Cited

U.S. PATENT DOCUMENTS

| | | | |
|---|---|---|---|
| 7,305,696 B2 * | 12/2007 | Thomas et al. | 725/114 |
| 2003/0196204 A1 * | 10/2003 | Thiagarajan et al. | 725/61 |
| 2004/0160943 A1 * | 8/2004 | Cain | 370/351 |
| 2004/0163110 A1 * | 8/2004 | Won | 725/40 |
| 2007/0147409 A1 | 6/2007 | Kallio et al. | |
| 2010/0095328 A1 * | 4/2010 | Hartung et al. | 725/46 |

FOREIGN PATENT DOCUMENTS

| | | |
|---|---|---|
| JP | 2001078104 | 3/2001 |
| JP | 2006352458 | 12/2006 |
| JP | 2006352556 | 12/2006 |

* cited by examiner

*Primary Examiner* — Hunter B Lonsberry
*Assistant Examiner* — Oschta Montoya
(74) *Attorney, Agent, or Firm* — Lee, Hong, Degerman, Kang & Waimey

(57) ABSTRACT

A broadcast signal reception method and a reception system are provided. The reception system includes a first processor, a second processor, and a storage medium. The first processor receives and processes a signaling table, the signaling table comprising first signaling information including access information of Non-Real-Time (NRT) service data and second signaling information including media object association information of the NRT service data. The second processor receives the NRT service data and processes a file including the received NRT service data based on the access information and the media object association information processed by the first processor. The storage medium stores the processed file of the NRT service data.

12 Claims, 31 Drawing Sheets

FIG. 4

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslb |
|         reserved | 6 | '111111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptors() | | |
|         } | | |
|     } | | |
|     reserved | 6 | '111111' |
|     additional_descriptors_length | 10 | uimsbf |
|     for(j=0;j<N;j++){ | | |
|         additional_descriptors() | | |
|     } | | |
|     CRC_32 | 32 | rpchof |
| } | | |

FIG. 5

| Service_type meaning | |
|---|---|
| 0 x 00 | [Reserved] |
| 0 x 01 | analog_television - The virtual channel carries analog television programming |
| 0 x 02 | ATSC_digital_television - The virtual channel carries television programming (audio, video and optional associated data) conforming to ATSC standards |
| 0 x 03 | ATSC_audio - The virtual channel carries audio programming (audio service and optional associated data) conforming to ATSC standards. |
| 0 x 04 | ATSC_data_only_service - The virtual channel carries a data service conforming to ATSC standards, but no video of stream_type 0x02 or audio of stream_type 0x81 |
| 0 x 05 - 0 x 3F | [Reserved for future ATSC use] |

FIG. 6

| Service_type meaning | |
|---|---|
| 0 x 00 | [Reserved] |
| 0 x 01 | analog_television - The virtual channel carries analog television programming |
| 0 x 02 | ATSC_digital_television - The virtual channel carries television programming (audio, video and optional associated data) conforming to ATSC standards |
| 0 x 03 | ATSC_audio - The virtual channel carries audio programming (audio service and optional associated data) conforming to ATSC standards. |
| 0 x 04 | ATSC_data_only_service - The virtual channel carries a data service conforming to ATSC standards, but no video of stream_type 0x02 or audio of stream_type 0x81 |
| 0 x 05 | ATSC_nrt_service - The virtual channel carries a NRT service conforming to ATSC standards, but no video of stream_type 0x02 or audio of stream_type 0x81 |
| 0 x 06 - 0 x 3F | [Reserved for future ATSC use] |

FIG. 7

| Syntax | No. of bits | Format |
|---|---|---|
| NRT_service_descriptor() { | | |
|   descriptor_tag | 8 | TBD |
|   descriptor_length | 8 | uimsbf |
|   num_NRT_services | 8 | uimsbf |
|   for (i=0; i<num_NRT_services; i++) { | | |
|     NRT_service_id | 16 | uimsbf |
|     NRT_service_short_name | 7*16 | uimsbf |
|     reserved | 1 | '1' |
|     NRT_service_category | 5 | uimsbf |
|     NRT_service_status | 2 | uimsbf |
| } | | |

FIG. 9

| Syntax | No. of bits | Format |
|---|---|---|
| NRT_service_map_table_section ( ) { | | |
|   table_id | 8 | TBD |
|   section_syntax_indicator | 1 | '0' |
|   private_indicator | 1 | '1' |
|   reserved | 2 | '11' |
|   section_length | 12 | uimsbf |
|   table_id_extension { | | |
|     source_id | 16 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   NST_protocol_version | 8 | uimsbf |
|   transport_stream_id | 16 | uimsbf |
|   num_NRT_services | 8 | uimsbf |
|   for (i=0; i<num_NRT_services; i++) { | | |
|     NRT_service_id | 16 | uimsbf |
|     NRT_service_category | 5 | uimsbf |
|     NRT_service_status | 2 | uimsbf |
|     SP_indicator | 1 | bslbf |
|     short_NRT_service_name | 8*8 | |
|     num_FLUTE_sessions | 8 | uimsbf |
|     for (j=0; j<num_FLUTE_sessions; j++) { | | |
|       reserved | 1 | '1' |
|       FLUTE_session_type | 3 | uimbsf |
|       media_object_association_indicator | 1 | bslbf |
|       essential_component_delivery_indicator | 1 | bslbf |
|       IP_version_flag | 1 | bslbf |
|       source_IP_address_flag | 1 | bslbf |
|       if (source_IP_address_flag) | | |
|       FLUTE_session_source_IP_address | 32 or 128 | uimsbf |
|       FLUTE_session_destination_IP_address | 32 or 128 | uimsbf |
|       FLUTE_session_destination_UDP_port_num | 16 | uimsbf |
|       reserved | 4 | '1111' |
|       num_FLUTE_session_level_descriptors | 4 | uimsbf |
|       for (k=0; k<num_FLUTE_session_level_descriptors; k++) { | | |
|         FLUTE_session_level_descriptor () | var | |
|       } | | |
|     } | | |
|     reserved | 4 | |
|     num_NRT_service_level_descriptors | 4 | |
|     for (m=0; m<num_NRT_service_level_descriptors; m++) { | | |
|       NRT_service_level_descriptors () | var | |
|     } | | |
|   } | | |
| } | | |

FIG. 10

| FLUTE_session_type | Meaning |
|---|---|
| '000' | FLUTE file delivery session which carries the actual NRT service components |
| '001' - '111' | Reserved for future use |

FIG. 11

| Syntax | No. of bits | Format |
|---|---|---|
| NRT_FLUTE_File_Delivery_descriptor() { | | |
|   descriptor_tag | 8 | TBD |
|   descriptor_length | 8 | uimsbf |
|   FLUTE_session_TSI | 16 | uimsbf |
|   session_start_time | 32 | uimsbf |
|   session_end_time | 32 | uimsbf |
|   reserved | 5 | '11111' |
|   tias_bandwidth_indicator | 1 | bslbf |
|   as_bandwidth_indicator | 1 | bslbf |
|   FEC_OTI_indicator | 1 | bslbf |
|   if (tias_bandwidth_indicator == '1') | | |
|     tias_bandwidth | 16 | uimsbf |
|   if (as_bandwidth_indicator == '1') | | |
|     as_bandwidth | 16 | uimsbf |
|   if (FEC_OTI_indicator == '1') { | | |
|     FEC_encoding_id | 8 | uimsbf |
|     FEC_instance_id | 16 | uimsbf |
|   } | | |
| } | | |

FIG. 12

| Syntax | No. of bits | Format |
|---|---|---|
| NRT_media_object_association_descriptor() { | | |
|   descriptor_tag | 8 | TBD |
|   descriptor_length | 8 | uimsbf |
|   reserved | 5 | '11111' |
|   object_association_type | 3 | uimsbf |
|   if (object_association_type == '000') { | | |
|     num_media_objects_in_session | 8 | uimsbf |
|     for (i=0; i<num_media_objects_in_session; i++) { | | |
|       media_object_TOI | 32 | uimsbf |
|       object_container_type_text_length | 8 | uimsbf |
|       object_container_type_text() | var | |
|       object_media_type_text_length | 8 | uimsbf |
|       object_media_type_text() | var | |
|       object_media_decoding_parameters_text_length | 8 | uimsbf |
|       object_media_decoding_parameters_text() | var | |
|     } | | |
|   } | | |
|   if (object_association_type == '001' \|\| '010') { | | |
|     reserved | 6 | '111111' |
|     IP_version_flag | 1 | bslbf |
|     source_specific_multicast_flag | 1 | bslbf |
|     if (source_specific_multicast_flag == '1') | | |
|       object_association_stream_source_IP_address | 32 or 128 | uimsbf |
|       object_association_stream_destination_IP_address | 32 or 128 | uimsbf |
|       object_association_stream_destination_UDP_port_num | 16 | uimsbf |
|     if (object_association_type == '010') { | | |
|       object_association_session_TSI | 16 | uimsbf |
|       object_association_session_start_time | 32 | uimsbf |
|       object_association_session_end_time | 32 | uimsbf |
|       reserved | 5 | '11111' |
|       tias_bandwidth_indicator | 1 | bslbf |
|       as_bandwidth_indicator | 1 | bslbf |
|       FEC_OTI_indicator | 1 | bslbf |
|       if (tias_bandwidth_indicator == '1') | | |
|         tias_bandwidth | 16 | uimsbf |
|       if (as_bandwidth_indicator == '1') | | |
|         as_bandwidth | 16 | uimsbf |
|       if (FEC_OTI_indicator == '1') { | | |
|         FEC_encoding_id | 8 | uimsbf |
|         FEC_instance_id | 16 | uimsbf |
|       } | | |
|     } | | |
|   } | | |
| } | | |

FIG. 13

| object_association_type | Meaning |
|---|---|
| '000' | The media object association information, which are necessary for rendering the content that the associated object is carrying, is provided as in-line text of this descriptor |
| '001' | The media object association information, which are necessary for rendering the content that the associated object is carrying, is provided by a separated UDP/IP stream, which carries SAP/SDP like data structure |
| '010' | The media object association information, which are necessary for rendering the content that the associated object is carrying, is provided by a SDP-like file, which is carried through a separated FLUTE file delivery session |
| '011' ~ '111' | Reserved for future use |

FIG. 14

| Syntax | No. of Bits | Format |
|---|---|---|
| NRT_service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|        ST_protocol_version | 8 | uimsbf |
|        eserved | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   reserved | 4 | '1111' |
|   carrier_frequency | 32 | uimsbf |
|   transport_stream_id | 16 | uimsbf |
|   program_number | 16 | uimsbf |
|   source_id | 16 | uimsbf |
|   num_NRT_services | 8 | uimsbf |
|   for (i=0; i<num_NRT_services; i++) | | |
|   { | | |
|        reserved | 4 | '1111' |
|        NRT_service_status | 2 | uimsbf |
|        SP_indicator | 1 | bsblf |
|        CP_indicator | 1 | bsblf |
|        NRT_service_id | 16 | uimsbf |
|        short_NRT_service_name | 8*8 | |
|        reserved | 2 | '11' |
|        NRT_service_category | 6 | uimsbf |
|        num_components | 5 | uimsbf |
|        IP_version_flag | 1 | bsblf |
|        source_IP_address_flag | 1 | bsblf |
|        NRT_service_destination_IP_address_flag | 1 | bsblf |
|        if (source_IP_address_flag) | | |
|            source_IP_address | 32 or 128 | uimsbf |
|        if (NRT_service_destination_IP_address_flag) | | |
|            NRT_service_destination_IP_address | 32 or 128 | uimsbf |
|        for (j=0; j<num_components; j++) | | |
|        { | | |
|            reserved | 1 | '1' |
|            essential_component_indicator | 1 | bsblf |
|            component_destination_IP_address_flag | 1 | bsblf |
|            port_num_count | 5 | uimsbf |
|            component_destination_UDP_port_num | 16 | uimsbf |
|            if (component_destination_IP_address_flag) | | |
|                component_destination_IP_address | 32 or 128 | uimsbf |

FIG. 15

```
        num_component_level_descriptors                              4       uimsbf
        for (k=0; k<num_component_level_descriptors; k++)
        {
            component_level_descriptor()                             var
        }
    }
    reserved                                                         4       '1111'
    num_NRT_service_level_descriptors                                4       uimsbf
    for (m=0; m<num_NRT_service_level_descriptors; m++)
    {
        NRT_service_level_descriptor()                               var
    }
}
reserved                                                             4       '1111'
num_virtual_channel_level_descriptors                                4       uimsbf
for (n=0; n<num_virtual_channel_level_descriptors; n++) {
{
    virtual_channel_level_descriptor()                               var
}
}
```

FIG. 16

| Syntax | No. of bits | Format |
|---|---|---|
| Component_descriptor() { | | |
|    descriptor_tag | 8 | 0x8D |
|    descriptor_length | 8 | uimsbf |
|    component_type | 7 | uimsbf |
|    component_encryption_flag | 1 | bsblf |
|    if (component_encryption_flag == '1') { | | |
|      num_STKM_streams | 8 | uimsbf |
|      for (i=0; i<num_STKM_streams; i++) { | | |
|         STKM_stream_id | 8 | uimsbf |
|      } | | |
|      component_data(component_type) | var | |
|    } | | |
| } | | |

FIG. 17

| Syntax | No. of bits | Format |
|---|---|---|
| Component_data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if (tias_bandwidth_indicator == '1') { | | |
|       tias_bandwidth | 16 | uimsbf |
|    } | | |
|    if (as_bandwidth_indicator == '1') { | | |
|       as_bandwidth | 16 | uimsbf |
|    } | | |
|    if (FEC_OTI_indicator == '1') { | | |
|       FEC_encoding_id | 8 | uimsbf |
|       FEC_instance_id | 16 | uimsbf |
|    } | | |
| } | | |

FIG. 18

| Syntax | No. of bits | Format |
|---|---|---|
| Component_data() { | | |
|   object_association_type | 3 | uimsbf |
|   if (object_association_type == '000') { | | |
|     num_media_objects_in_session | 8 | uimsbf |
|     for (i=0; i<num_media_objects_in_session; i++) { | | |
|       media_object_TOI | 32 | uimsbf |
|       object_container_type_text_length | 8 | uimsbf |
|       object_container_type_text() | var | |
|       object_media_type_text_length | 8 | uimsbf |
|       object_media_type_text() | var | |
|       object_media_decoding_parameters_text_length | 8 | uimsbf |
|       object_media_decoding_parameters_text() | var | |
|     } | | |
|   } | | |
|   if (object_association_type == '001'|| '010') { | | |
|     reserved | 6 | '111111' |
|     IP_version_flag | 1 | bslbf |
|     source_specific_multicast_flag | 1 | bslbf |
|     if (source_specific_multicast_flag == '1') | | |
|       object_association_stream_source_IP_address | 32 or 128 | uimsbf |
|       object_association_stream_destination_IP_address | 32 or 128 | uimsbf |
|       object_association_stream_destination_UDP_port_num | 16 | uimsbf |
|     if (object_association_type == '010') { | | |
|       object_association_session_TSI | 16 | uimsbf |
|       object_association_session_start_time | 32 | uimsbf |
|       object_association_session_end_time | 32 | uimsbf |
|       reserved | 5 | '11111' |
|       tias_bandwidth_indicator | 1 | bslbf |
|       as_bandwidth_indicator | 1 | bslbf |
|       FEC_OTI_indicator | 1 | bslbf |
|       if (tias_bandwidth_indicator == '1') | | |
|         tias_bandwidth | 16 | uimsbf |
|       if (as_bandwidth_indicator == '1') | | |
|         as_bandwidth | 16 | uimsbf |
|       if (FEC_OTI_indicator == '1') { | | |
|         FEC_encoding_id | 8 | uimsbf |
|         FEC_instance_id | 16 | uimsbf |
|       } | | |
|     } | | |
|   } | | |
| } | | |

FIG. 19

| Syntax | No. of bits | Format |
|---|---|---|
| Component_data() { | | |
|     reserved | 4 | '1111' |
|     general_media_type | 4 | uimsbf |
|     if ( general_media_type == 1){ | | |
|         ISO_639_language_code | 3*8 | |
|     } | | |
|     media_type_text_length | 8 | uimsbf |
|     media_type_text() | var | |
|     decoding_parameters_text_length | 8 | uimsbf |
|     decoding_parameters_text() | var | |
| } | | |

FIG. 22

| Syntax | No. of Bits | Format |
|---|---|---|
| NRT_content_table_section() { | | |
|     table_id | 8 | uimsbf |
|     section_syntax_indicator | 1 | '1' |
|     Private_indicator | 1 | '1' |
|     reserved | 2 | bslbf |
|     section_length | 12 | uimsbf |
|     NRT_service_ID | 16 | uimsbf |
|     reserved | 2 | bslbf |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_contents_in_section | 8 | uimsbf |
|     for(j=0;j<num_contents_in_section;j++){ | | |
|         content_version | 32 | uimsbf |
|         content_id | 16 | uimsbf |
|         content_available_start_time | 32 | uimsbf |
|         content_available_end_time | 32 | uimsbf |
|         ETM_location | 2 | uimsbf |
|         content_length_in_seconds | 30 | uimsbf |
|         content_size | 48 | uimsbf |
|         content_delivery_bit_rate | 32 | uimsbf |
|         content_title_length | 8 | uimsbf |
|         content_title_text ( ) | var | uimsbf |
|         descriptors_length | 16 | uimsbf |
|         for (i=0; i < N; i++) { | | |
|             descriptor() | | |
|         } | | |
|     } | | |
| } | | |

FIG. 24

| | | OMA BCAST Service Guide | NRT Contents / Files |
|---|---|---|---|
| | A/V Streamings (mobile service data) | FLUTE | |
| Service Signaling Channel (SMT) | RTP | ALC/ LCT | |
| UDP | | | |
| IP | | | |
| Adaptation Layer | | | |
| M/H Physical Layer | | | |

FIG. 30

| Syntax | No. of Bits | Format |
|---|---|---|
| service_map_table_section() { | | |
| table_id | 8 | 0xDB |
| section_syntax_indicator | 1 | '0' |
| private_indicator | 1 | '1' |
| reserved | 2 | '11' |
| section_length | 12 | uimsbf |
| table_id_extension { | | |
| SMT_protocol_version | 8 | uimsbf |
| ensemble_id | 8 | uimsbf |
| } | | |
| reserved | 2 | '11' |
| version_number | 5 | uimsbf |
| current_next_indicator | 1 | bslbf |
| section_number | 8 | uimsbf |
| last_section_number | 8 | uimsbf |
| num_services | 8 | uimsbf |
| for (j=0;j<num_services; j++) { | | |
| service_id | 16 | uimsbf |
| multi_ensemble_service | 2 | uimsbf |
| service_status | 2 | uimsbf |
| SP_indicator | 1 | bslbf |
| short_service_name_length | 3 | uimsbf |
| short_service_name | 16*m | |
| reserved | 2 | '11' |
| service_category | 6 | uimsbf |
| num_components | 5 | uimsbf |
| IP_version_flag | 1 | bslbf |
| source_IP_address_flag | 1 | bslbf |
| service_destination_IP_address_flag | 1 | bslbf |
| if (source_IP_address_flag) | | |
| source_IP_address | 32 or 128 | uimsbf |
| if (service_destination_IP_address_flag) | | |
| service_destination_IP_address | 32 or 128 | uimsbf |
| for (j=0;j<num_components; j++) | | |
| { | | |
| reserved | 1 | '1' |
| essential_component_indicator | 1 | bslbf |
| component_destination_IP_address_flag | 1 | bslbf |
| port_num_count | 5 | uimsbf |
| component_destination_UDP_port_num | 16 | uimsbf |
| if (component_destination_IP_address_flag) | | |
| component_destination_IP_address | 32 or 128 | uimsbf |
| reserved | 4 | '1111' |
| num_component_level_descriptors | 4 | uimsbf |
| for (k=0;k<num_components_level_descriptors; k++) | | |
| { | | |
| component_level_descriptor() | var | |
| } | | |
| reserved | 4 | '1111' |
| num_service_level_descriptors | 4 | uimsbf |
| for (m=0; m<num_service_level_descriptors; m++) { | | |
| service_level_descriptor() | var | |
| } | | |
| } | | |
| reserved | 4 | '1111' |
| num_ensemble_level_descriptors | 4 | uimsbf |
| for (n=0; n<num_ensemble_level_descriptors; n++) { | | |
| ensemble_level_descriptor() | var | |
| } | | |
| } | | |

METHOD OF RECEIVING A BROADCASTING SIGNAL AND RECEIVING SYSTEM FOR RECEIVING A BROADCASTING SIGNAL

This application claims the benefit of U.S. Provisional Application No. 61/059,811, filed on Jun. 9, 2008, which is hereby incorporated by reference. Also, this application claims the benefit of U.S. Provisional Application No. 61/076,684, filed on Jun. 29, 2008, which is hereby incorporated by reference. This application also claims the benefit of U.S. Provisional Application No. 61/115,888, filed on Nov. 18, 2008, which is hereby incorporated by reference. This application also claims the benefit of U.S. Provisional Application No. 61/121,178, filed on Dec. 9, 2008, which is hereby incorporated by reference. This application also claims the benefit of U.S. Provisional Application No. 61/138,494, filed on Dec. 17, 2008, which is hereby incorporated by reference. This application also claims the benefit of U.S. Provisional Application No. 61/145,104, filed on Jan. 15, 2009, which is hereby incorporated by reference. This application also claims the benefit of U.S. Provisional Application No. 61/153,973, filed on Feb. 20, 2009, which is hereby incorporated by reference. This application also claims the benefit of U.S. Provisional Application No. 61/153,985, filed on Feb. 20, 2009, which is hereby incorporated by reference. And this application claims the priority benefit of Korean Application No. 10-2009-0050710, filed on Jun. 8, 2009, which is hereby incorporated by reference.

BACKGROUND OF THE INVENTION

1. The Field of the Invention

The present invention relates to a method and apparatus for receiving a broadcast signal transmitted in non-real time and a broadcast signal transmitted in real time.

2. Description of the Related Art

A digital television (DTV) can provide not only video and audio services, which are conventional TV services, but can now also provide various other services. For example, the DTV can provide an Electronic Program Guide (EPG) or the like to the user and can simultaneously provide broadcast services received through 2 or more channels. Especially, the number of services that a reception system can provide has been significantly increased since the reception system has been equipped with a large-capacity storage device and has been connected to the Internet or data communication channels which enable bidirectional communication.

In such environments, recently, a method for transmitting and receiving broadcast signals to provide a service combining a real-time broadcast service and a non-real-time broadcast service and a reception system that enables implementation of the method are under development.

SUMMARY OF THE INVENTION

An object of the present invention is to provide a broadcast signal reception method and a reception system that can efficiently combine and provide a real-time broadcast service and a non-real-time broadcast service.

Another object of the present invention is to provide a broadcast signal reception method and a reception system that enable reception of an IP-based non-real-time service in an MPEG-2-based broadcast system.

Another object of the present invention is to provide a broadcast signal reception method and a reception system in which an IP-based non-real-time service access method is signaled in order to receive an IP-based non-real-time service in an MPEG-2-based broadcast system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

A broadcast signal reception method according to an embodiment of the present invention to achieve the above objects may include receiving and processing first signaling information including access information of Non-Real-Time (NRT) service data, receiving and processing second signaling information including media object association information of the NRT service data, receiving the NRT service data based on the access information included in the first signaling information, and processing the received NRT service data according to the media object association information included in the second signaling information.

The first signaling information and the second signaling information are received in a signaling table for an NRT service.

The media object association information includes at least one of container information of the NRT service data, encoding information of the NRT service data, and a decoding parameter of a file that constitutes the NRT service.

The media object association information is provided in text format using at least one field of a descriptor that is received in the signaling table.

The media object association information is provided in a format of a stream or a file and access information of the stream or file is received in the descriptor.

When the media object association information is provided in the file format, parameters including time information and an identifier of a FLUTE session that carries the file are additionally received in the descriptor.

When the NRT service is a fixed NRT service, the signaling table and the file that constitutes the NRT service are received after IP packetization, addressable section packetization, and MPEG-2 TS packetization are sequentially performed.

When the NRT service is a mobile NRT service, the signaling table and the file that constitutes the NRT service are IP-packetized to be received in one ensemble.

A reception system according to an embodiment of the present invention includes a first processor, a second processor, and a storage medium. The first processor receives and processes a signaling table, the signaling table comprising first signaling information including access information of Non-Real-Time (NRT) service data and second signaling information including media object association information of the NRT service data. The second processor receives the NRT service data and processes a file including the received NRT service data based on the access information and the media object association information processed by the first processor. The storage medium stores the processed file of the NRT service data.

Other objects, features, and advantages of the present invention will be apparent through a detailed description of the embodiments with reference to the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates an embodiment of a bitstream syntax structure of a virtual channel table according to the present invention;

FIG. 5 illustrates an embodiment of service type field values in the virtual channel table of FIG. 4 and respective meanings of the values;

FIG. 6 illustrates another embodiment of values allocated to a service type field in the virtual channel table of FIG. 4 and respective meanings of the values;

FIG. 7 illustrates an embodiment of a bitstream syntax structure of an NRT service descriptor included in a virtual channel loop of the virtual channel table of FIG. 4;

FIG. 9 illustrates an embodiment of the bitstream syntax structure of an NST according to the present invention;

FIG. 10 illustrates an embodiment of values allocated to a FLUTE session type field in the NST of FIG. 9 and respective meanings of the values;

FIG. 11 illustrates an embodiment of a bitstream syntax structure of an NRT FLUTE file delivery descriptor included in a FLUTE session loop of the NST of FIG. 9;

FIG. 12 illustrates an embodiment of a bitstream syntax structure of an NRT media object association descriptor included in the FLUTE session loop of the NST of FIG. 9;

FIG. 13 illustrates an embodiment of values allocated to an object_association_type field of the NRT media object association descriptor of FIG. 12 and respective meanings of the values;

FIG. 14 and FIG. 15 illustrate another embodiment of the bitstream syntax structure of the NST section according to the present invention;

FIG. 16 illustrates an embodiment of the bitstream syntax structure of a component_descriptor( ) according to the present invention;

FIG. 17 illustrates an embodiment of the bitstream syntax structure of FLUTE file delivery data using the component_descriptor( ) of FIG. 16;

FIG. 18 illustrates an embodiment of the bitstream syntax structure of media object association information data using the component_descriptor( ) of FIG. 16;

FIG. 19 illustrates another embodiment of the bitstream syntax structure of media object association information data using the component_descriptor( ) of FIG. 16;

FIG. 22 illustrates an embodiment of the bitstream syntax structure of an NRT Content Table (NCT) according to the present invention;

FIG. 24 illustrates an embodiment of a protocol stack for a mobile NRT service according to the present invention;

FIG. 30 illustrates an embodiment of a bitstream syntax structure of an SMT section according to the present invention.

DETAILED DESCRIPTION OF THE INVENTION

Figure 1:
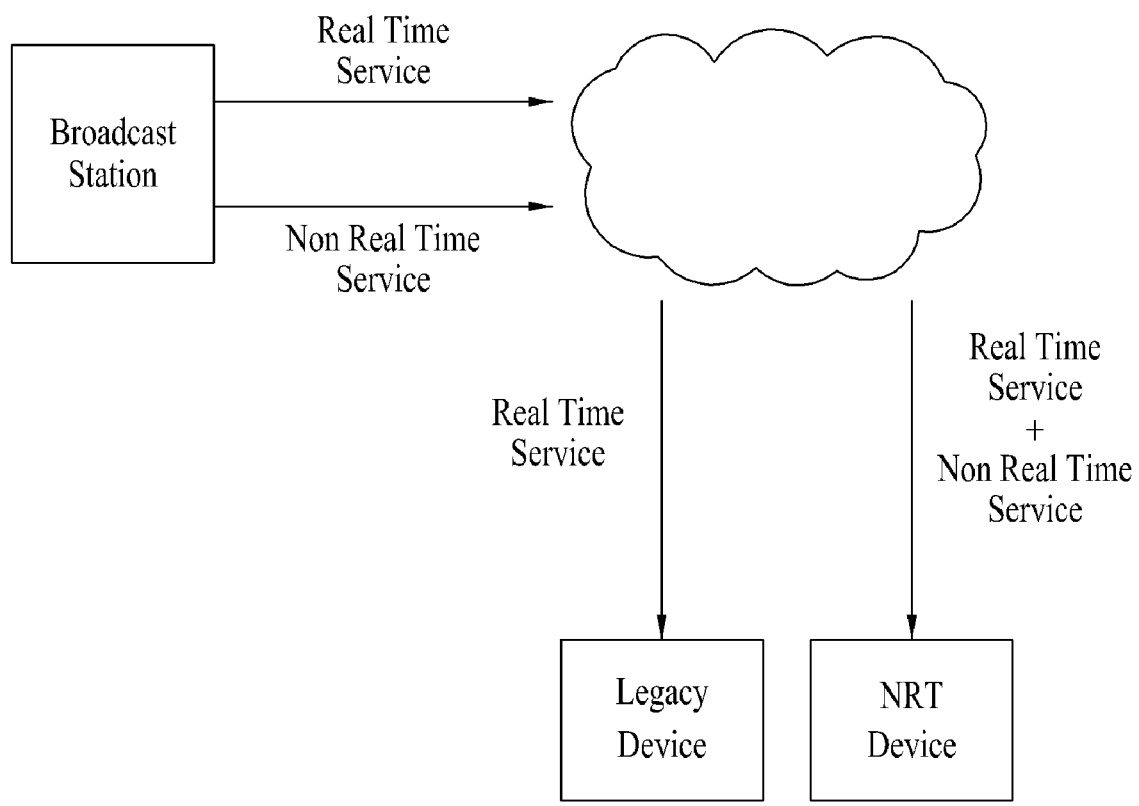
FIG. 1 illustrates a concept of providing a real-time (RT) service and a non-real-time (NRT) service according to the present invention.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

The present invention aims to provide services such that the receiver can receive a broadcast service in non-real time through a medium such as a terrestrial or a cable. In the present invention, for ease of convenience, such a broadcast service is referred to as an "NRT service" and broadcast service data in this case is referred to as "NRT service data".

The received NRT service data is stored in a storage medium and is then displayed on a display at a preset time or according to a request from the user. In an embodiment, the NRT service data is received in a file format and stored in the storage medium. In an embodiment, the storage medium is an internal HDD installed in a broadcast reception device. In another embodiment, the storage medium may be a Universal Serial Bus (USB) memory or an external HDD externally connected to the broadcast reception device.

Signaling information is required to receive files which constitute the NRT service and to store the files in a storage medium. In the present invention, the signaling information is referred to as "NRT service signaling information" or "NRT service signaling data".

An NRT service according to the present invention is mainly classified into a fixed NRT service and a mobile NRT service. In the present invention, the fixed NRT service is described first and the mobile NRT service is then described.

Fixed NRT Service

In an embodiment of the present invention, in order to provide a fixed NRT service, an NRT service in a file format is IP-packetized in the IP layer and is then transmitted in an MPEG-2 TS format through a specific virtual channel.

In the present invention, information indicating whether or not an NRT service is present in a virtual channel and NRT service identification information are signaled through an MPEG-2-based Program Specific Information/Program and System Information Protocol (PSI/PSIP) table, for example, through a Virtual Channel Table (VCT).

In an embodiment of the present invention, an NRT service signaling channel that carries NRT service signaling data for signaling IP-based NRT service access information is IP-packetized into a specific IP stream in the IP layer and is then transmitted in an MPEG-2 TS format.

FIG. 1 illustrates how a Real-Time (RT) service and a Non-Real Time (NRT) service are provided.

The NRT service is a service that is provided such that RT service data transmitted in non-real time is received using a specific broadcast channel (specifically, extra bandwidth in a broadcast channel) and the received data is stored and thereafter provided to the user when needed. The transfer rate of the NRT service is low. Thus, the NRT service is generally used for playback after storage rather than for real-time viewing.

The RT service is a broadcast service in which broadcast service data is received in real time and is provided to the user, similar to current terrestrial broadcasts.

For example, a broadcast station can transmit broadcast service data in real time and transmit news clips, weather information, advertisements, push VOD, or the like in non-real time. The NRT service may provide not only such news clips, weather information, advertisements, and push VOD but also specific scenes included in a real-time broadcast service.

A conventional broadcast receiver (i.e., a legacy device) can receive and process RT services but cannot receive and process NRT services.

A broadcast receiver (i.e., an NRT device) can combine NRT services and RT services to provide a variety of services.

Figure 2:
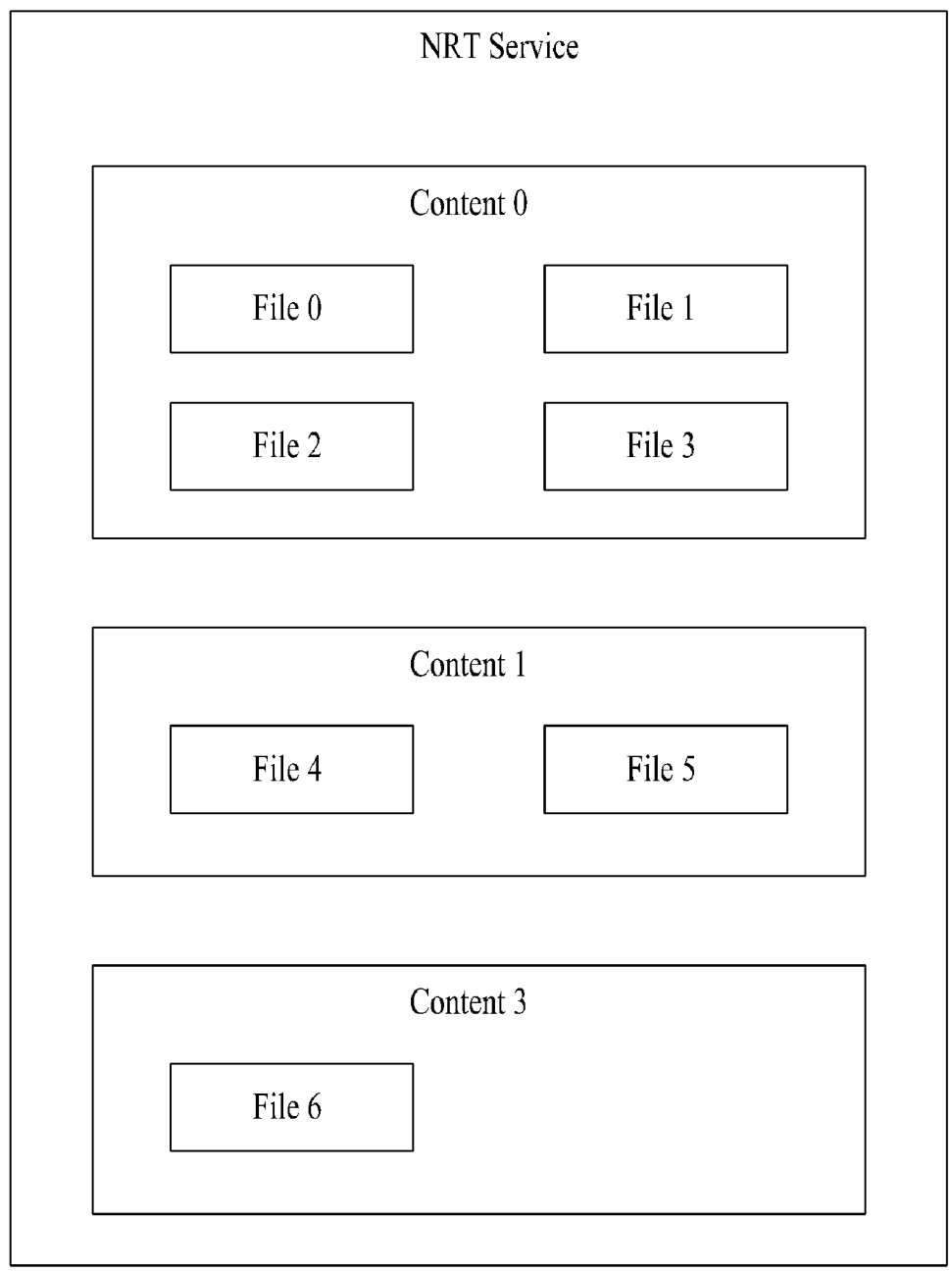
FIG. 2 illustrates relations between an NRT service, content, and files.

In an embodiment, one NRT service according to the present invention includes one or more content (or NRT content) and one content includes one or more files as shown in FIG. 2. The terms "file" and "object" have the same meaning in the description of the present invention.

The NRT content is the minimum unit that can be presented independently. For example, when a news program, which includes an economic news section, a political news section, and a life news section, is provided in non-real time, the news program may be an NRT service and each of the economic news section, the political news section, and the life news section may be an NRT content. Each of the economic news section, the political news section, and the life news section may include at least one file.

Herein, the NRT service can be transmitted in an MPEG-2 Transport Stream (TS) packet format through a dedicated broadcast channel or the same broadcast channel as the RT service. In this case, a unique PID is transmitted after being allocated to a TS packet of the NRT service data in order to identify the NRT service. In an embodiment of the present invention, IP-based NRT service data is packetized into an MPEG-2 TS packet to be transmitted.

Furthermore, NRT service signaling data required to receive the NRT service data is transmitted through an NRT service signaling channel. The NRT service signaling channel is transmitted through a specific IP stream in the IP layer. Here, the IP stream is also packetized into an MPEG-2 TS packet to be transmitted. In an embodiment of the present invention, the NRT service signaling data transmitted through the NRT service signaling channel provides access information of NRT services that operate in the IP layer.

Figure 3:
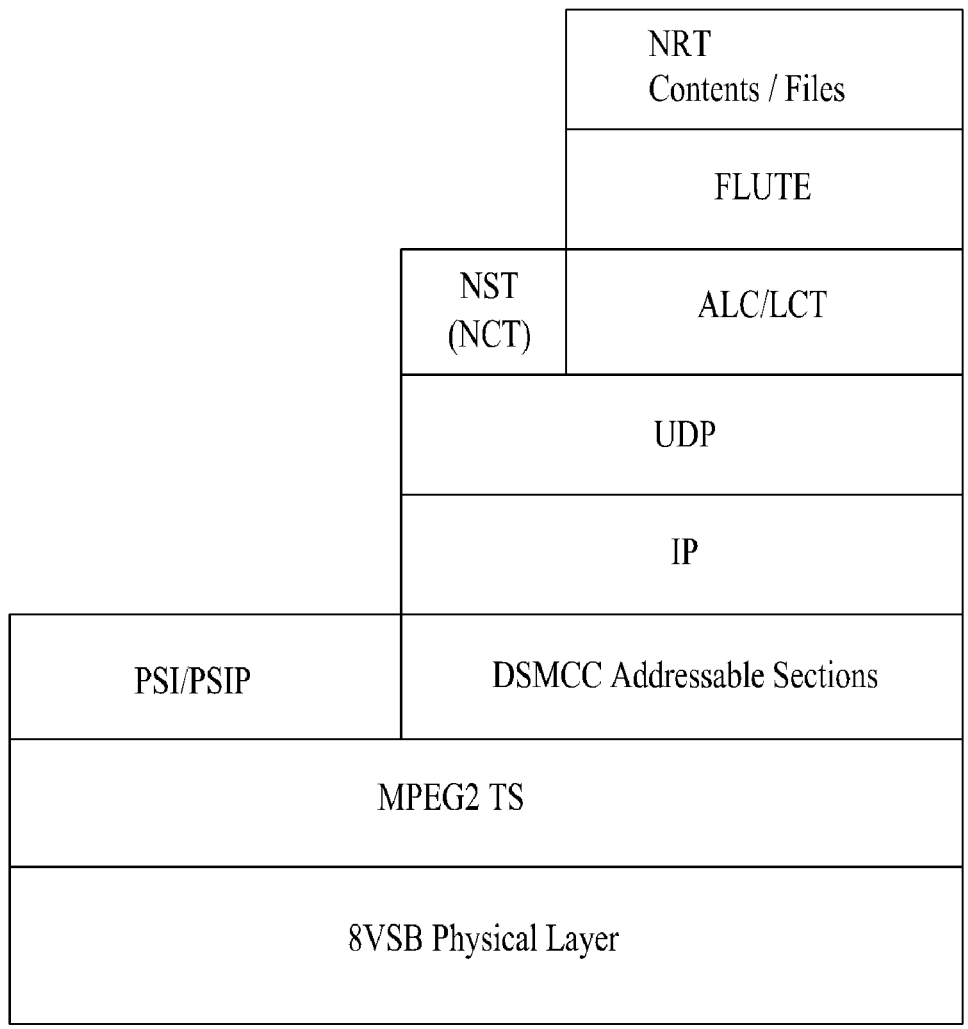
FIG. 3 illustrates an embodiment of a protocol stack for a fixed NRT service according to the present invention.

More specifically, in the broadcast station, NRT content/files are packetized according to a file transfer protocol scheme and are again packetized according to an Asynchronous Layered Coding/Layered Coding Transport (ALC/LCT) scheme as shown in FIG. 3. The packetized ALC/LCT data is again packetized according to a UDP scheme and the packetized ALC/LCT/UDP data is again packetized into ALC/LCT/UDP/IP data according to an IP scheme. In the present invention, the packetized ALC/LCT/UDP/IP data is referred to as an "IP datagram" for ease of explanation.

In addition, NRT service signaling information required to receive the NRT content/files is transmitted through an NRT service signaling channel. Here, the NRT service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, the NRT service signaling channel is multicast after being encapsulated in an IP datagram having a well-known IP destination address and a well-known destination UDP port number.

In an embodiment of the present invention, IP datagrams of the NRT service signaling channel and the NRT service are encapsulated in an addressable section structure and again packetized in an MPEG-2 TS format. Specifically, one addressable section structure has a format in which a section header and a CRC checksum are added to one IP datagram. This addressable section structure format complies with a Digital Storage Media Command and Control (DSM-CC) section format for private data transmission. Thus, the addressable section is also referred to as a "DSM-CC addressable section". A 188-byte MPEG-2 TS packet can be created by dividing the addressable section data into 184-byte units and adding a 4-byte MPEG header to each 184-byte unit. Here, a value allocated to a PID of the MPEG header is a unique value that can identify TS packets that carry the NRT service signaling channel and the NRT service.

Program Specific Information (PSI) and Program and System Information Protocol (PSIP) table section data is also packetized into MPEG-2 TS packets.

An embodiment of the PSI table may include a Program Map Table (PMT), a Program Association Table (PAT), or the like and an embodiment of the PSIP table may include a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The MPEG-2 TS packets are modulated according to a predetermined transmission scheme, for example, a VSB transmission scheme, in a physical layer and are then transmitted to the reception system.

In an embodiment of the present invention, whether or not an NRT service is transmitted is signaled through a PSI/PSIP table. For example, whether or not an NRT service is transmitted is signaled through a Virtual Channel Table (VCT).

FIG. 4 illustrates a VCT section syntax structure according to an embodiment of the present invention.

The VCT section transmits information on virtual channels, such as channel information for selecting channels and information such as packet identification (PID) numbers for receiving the audio and/or video data. More specifically, when the VCT section is parsed, the PID of the audio/video data of the broadcast program may be known. Herein, the corresponding audio/video data are transmitted within the channel along with the channel name and the channel number.

The VCT section syntax is configured by including at least one of a table_id field, a section_syntax_indicator field, a private_indicator field, a section_length field, a transport_stream_id field, a version_number field, a current_next_indicator field, a section_number field, a last_section_number field, a protocol_version field, and a num_channels_in_section field.

The VCT section syntax further includes a first 'for' loop (i.e., virtual channel loop) repetition statement that is repeated as much as the num_channels_in_section field value. The first repetition statement may include at least one of a short_name field, a major_channel_number field, a minor_channel_number field, a modulation_mode field, a carrier_frequency field, a channel_TSID field, a program_number field, an ETM_location field, an access controlled field, a hidden field, a service_type field, a source_id field, a descriptor_length field, and a second 'for' loop statement that is repeated as much as the number of descriptors included in the first repetition statement. Herein, the second repetition statement will be referred to as a first descriptor loop for simplicity. The descriptor descriptors( ) included in the first descriptor loop is separately applied to each virtual channel.

Furthermore, the VCT section syntax may further include an additional_descriptor_length field, and a third 'for' loop statement that is repeated as much as the number of descriptors additionally added to the VCT. For simplicity of the description of the present invention, the third repetition statement will be referred to as a second descriptor loop. The descriptor additional_descriptors( ) included in the second descriptor loop is commonly applied to all virtual channels described in the VCT.

As described above, referring to FIG. 4, the table_id field indicates a unique identifier (or identification) (ID) that can identify the information being transmitted to the table as the VCT. More specifically, the table_id field indicates a value informing that the table corresponding to this section is a VCT. For example, a 0xC8 value may be given to the table_id field.

The version_number field indicates the version number of the VCT. The section_number field indicates the number of this section. The last_section_number field indicates the number of the last section of a complete VCT. And, the num_channel_in_section field designates the number of the overall virtual channel existing within the VCT section.

Furthermore, in the first 'for' loop repetition statement, the short_name field indicates the name of a virtual channel. The major_channel_number field indicates a 'major' channel number associated with the virtual channel defined within the first repetition statement, and the minor_channel_number field indicates a 'minor' channel number. More specifically, each of the channel numbers should be connected to the major and minor channel numbers, and the major and minor channel numbers are used as user reference numbers for the corresponding virtual channel.

The program_number field is shown for connecting the virtual channel having an MPEG-2 program association table (PAT) and program map table (PMT) defined therein, and the program_number field matches the program number within the PAT/PMT. Herein, the PAT describes the elements of a program corresponding to each program number, and the PAT indicates the PID of a transport packet transmitting the PMT. The PMT described subordinate information, and a PID list of the transport packet through which a program identification number and a separate bit sequence, such as video and/or audio data configuring the program, are being transmitted.

The service_type field indicates a service type within a corresponding virtual channel. In an embodiment, the virtual channel may include at least one RT service and at least one NRT service including audio and/or video. In this case, service type values may be allocated as shown in FIG. 5 and a value of 0x04 representing an ATSC-data-only service may be used to indicate that an NRT service is provided through the virtual channel.

In another embodiment, the virtual channel may include only at least one NRT service. In this case, as shown in FIG. 6, a new service_type field value of 0x05 may be defined to indicate that an NRT service is provided through the virtual channel.

The source_id field indicates a program source connected to the corresponding virtual channel.

Herein, the term "source" refers to a specific source such as a video, text, data, or audio source. The source_id field has a unique value in a transport stream in which a VCT is transmitted.

On the other hand, a descriptor loop (descriptor{ }) in the loop statement of a next 'for' loop may include a service location descriptor.

This service location descriptor may include a stream type field, an Elementary_PID field, a language code field, or the like of each elementary stream.

FIG. 7 illustrates an embodiment for a syntax structure of an NRT service descriptor "NRT_service_descriptor( )" that is transmitted within the first descriptor loop of the VCT when the service_type field indicates that an NRT service is transmitted through the corresponding virtual channel.

The NRT service descriptor "NRT_service_descriptor( )" is applied only to the corresponding virtual channel and provides identification information of NRT services included in the corresponding virtual channel.

In FIG. 7, a descriptor_tag field is a descriptor identifier and an identifier that identifies an NRT service descriptor can be set in this field.

A descriptor_length field represents, in bytes, the remaining length of the descriptor (from a field next to the descriptor_length field to the end of this descriptor).

A num_NRT_services field can be allocated 8 bits and indicates the number of NRT services included in the virtual channel. Thereafter, the 'for' loop is executed the same number of times as the number of NRT services corresponding to the num_NRT_services field value to indicate identification information of each NRT service included in the virtual channel. That is, the 'for' loop may include an NRT_service_id field, an NRT_service_short_name field, an NRT_service_category field, and an NRT_service_status field.

The NRT_service_id field is allocated 16 bits and indicates a value that can uniquely identify the corresponding NRT service in the virtual channel. (That is, this field indicates a 16-bit unsigned integer that shall uniquely identify this NRT service within the scope of this virtual channel.)

The NRT_service_short_name field includes a short name of the NRT service. This field may be filled with null data when the NRT service has no short name.

The NRT_service_category field is allocated 5 bits and indicates the type of a service that is transmitted in the NRT service.

The NRT_service_status field is allocated 2 bits and indicates the status of the NRT service. For example, the NRT_service_status field indicates that the corresponding NRT service is in an active state when the most significant bit of the NRT_service_status field is set to "1" and indicates that the corresponding NRT service is in an inactive state when the most significant bit is set to "0". In addition, the NRT_service_status field indicates that the corresponding NRT service is in a hidden state when the least significant bit of the NRT_service_status field is set to "1" and indicates that the corresponding NRT service is not in a hidden state when the least significant bit is set to "0". (That is, the most significant bit shall indicate whether this NRT service is active (when set to 1) or inactive (when set to 0) and the least significant bit shall indicate whether this NRT service is hidden (when set to 1) or not (when set to 0)).

Figure 8:
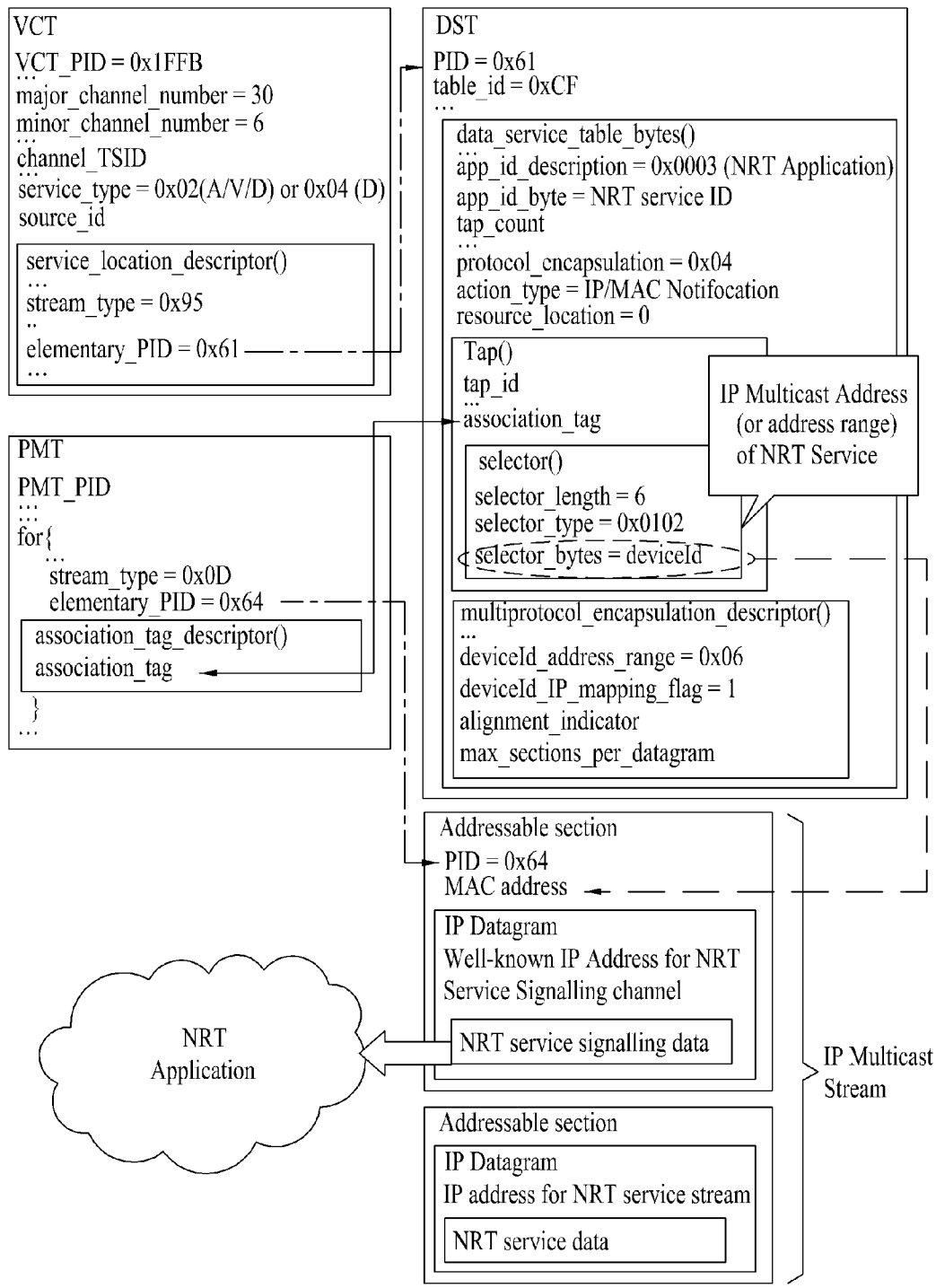
FIG. 8 illustrates an embodiment of a procedure for obtaining access information of an IP stream that carries an NRT service signaling channel using a PSI/PSIP table according to the present invention.

FIG. 8 illustrates a method in which an NRT service is received and provided using an ATSC A/90 standard for carrying (or transmitting) a data broadcast stream and an ATSC A/92 standard for transmitting an IP multicast stream in a reception system according to the present invention.

That is, information of a stream that constitutes each virtual channel is signaled in an ES_loop of a PMT or a service location descriptor of a VCT. For example, an NRT service stream can be transmitted through the virtual channel in the case where the service type of the VCT is 0x02 (i.e., digital A/V/Data), 0x04 (i.e., data only), or 0x05 (i.e., NRT only service only), or as shown in FIG. 5 or FIG. 6. Here, when the stream_type field included in the service location descriptor (or the ES loop of the PMT) has been allocated 0x95 (i.e., DST transmission), this indicates that a data broadcast is transmitted. General A/V alone is transmitted if the service location descriptor includes no stream_type field or is not 0x95. That is, if the stream_type field included in the service location descriptor has a value of 0x95, the Elementary_PID field value is a PID of a Data Service Table (DST). Thus, the DST can be received through the Elementary_PID field.

The type of the application and details of a data broadcast stream transmitted through this channel can be determined through the DST. In the present invention, an NRT application (i.e., an NRT service) is identified using the DST.

That is, an App_id_description field of the DST specifies the format and analysis of application identification bytes subsequent to this field. In an embodiment of the present invention, '0x0003' is allocated to the App_id_description field in order to identify the NRT application. The illustrated number is only an example and does not limit the scope of the present invention.

If the App_id_description field value is '0x0003', an Application_id_byte value subsequent to this field is a service ID of the NRT application. A service ID of the NRT application may have a URI value that globally and uniquely identifies the corresponding service.

After the NRT application is identified as described above, a PID of an MPEG-2 TS packet separated from the IP datagram of the NRT service signaling channel is searched for through Tap information. Then, an IP datagram that carries the NRT service signaling channel can be obtained from MPEG-2 TS packets having the PID found through the tap information and NRT service signaling data can be obtained from the obtained IP datagram. Herein, well-known IP access information, i.e., a well-known IP address and a well-known UDP port number can be used as the IP access information of the NRT service signaling channel.

That is, an asynchronous IP stream is transmitted if a Protocol_encapsulation field value in the DST is 0x04 and a device_id value indicating the destination address is transmitted through a selector_bytes value if a Selector_type field value is 0x0102. A multiprotocol_encaplsulation_descriptor is used in order to accurately analyze the selector_bytes value and signals the number of valid bytes included in the device_id value. As a result, an IP multicast address (or address range) of the NRT service signaling channel transmitted through the PID can be determined through the Tap information.

Accordingly, the IP multicast address (or address range) is accessed to receive an IP stream, i.e., an IP packet, and NRT service signaling data is extracted from the received IP packet.

NRT service data, i.e., NRT content/files, is received based on the extracted NRT service signaling data and the received data can be stored in a storage medium or can be displayed on a display.

In another embodiment of the present invention, the NRT service can be signaled using a new value, for example, 0x96 instead of 0x95 as the stream type field value of the DST. This embodiment aims to eliminate the risk that the conventional receiver may malfunction with the NRT service which is a new application, in the case where the conventional receiver operates by determining whether or not a data broadcast stream is present based only on whether or not a stream having a stream type value of 0x95 is present. In this case, if a new stream type is defined, it will be possible to allow the conventional receiver to ignore this stream type, thereby guaranteeing backward compatibility.

On the other hand, in an embodiment, NRT service signaling data transmitted through the NRT service signaling channel includes an NRT service map table (or Service Table) (NST) that provides access information of the NRT service. In an embodiment, the NST has a table format similar to the MPEG-2 private section format.

The NST can provide access information of IP-based NRT services included in one virtual channel. For example, the NST can provide access information of each of the FLUTE sessions configuring one NRT service.

In addition, the NST can provide information that is necessary for rendering content/files of an NRT service that is transmitted through each FLUTE session. In an embodiment, the NST can provide container information required to perform rendering of content/files that are transmitted through each FLUTE session. In another embodiment, the NST can provide encoding information (for example, media/codec type) required to perform rendering of content/files that are transmitted through each FLUTE session. The NST can provide media decoding parameters required to perform rendering of content/files that are transmitted through each FLUTE session.

The NRT service signaling data may further include a signaling table other than the NST. In an embodiment, IP datagrams of the NRT service signaling channel have the same well-known IP address and well-known UDP port number. Therefore, the NST included in the NRT service signaling data is identified through a table identifier. That is, the table identifier may be a table_id included in a header of the corresponding table session or the corresponding table and the NST may be identified by further referring to a table_id_extension when needed.

Furthermore, whether one NST includes one session or a plurality of sessions can be determined through a table_id field, a section_number field, and a last_section_field in the NST section. Then, the corresponding table can be completed by combining sections having the same table identifier after removing IP headers and UDP headers of IP datagrams of the NRT service signaling channel. For example, the NST can be completed by combining sections having a table identifier allocated to the NST.

FIG. 9 illustrates an embodiment of a bitstream syntax structure of an NST section according to the present invention. The following is a detailed description of each field of the NST section.

In FIG. 9, a table_id field (8 bits) is a table identifier and an identifier of the NST can be set in this field. In an embodiment, 0xDF is allocated to the table_id field in order to identify the NST.

A section_syntax_indicator field (1 bit) is an indicator that defines a session type (or format) of the NST.

A private_indicator field (1 bit) indicates whether or not the NST complies with the private section.

A section_length field (12 bits) indicates a section length of the NST.

In addition, a source_id field of 16 bits may be allocated to the position of the table_id_extension field and may then be used as one table identifier that identifies the NST when the NST has been received through the NRT service signaling channel.

A version_number field (5 bits) indicates a version number of the NST.

A current_next_indicator field (1 bit) indicates whether information included in the corresponding NST section is applicable currently or in the future.

A section_number field (8 bits) indicates a current section number of the NST section.

A last_section_number field (8 bits) indicates a last section number of the NST.

An NST_protocol_version field (8 bits) indicates a protocol version for allowing an NST that transmits parameters having a different structure from those defined in the current protocol. (That is, this field is an 8-bit unsigned integer field whose function is to allow, in the future, this NRT service Map Table to carry parameters that may be structured differently than those defined in the current protocol. At present, the value for the NST_protocol_version shall be zero. Non-zero values of NST_protocol_version may be used by a future version of this standard to indicate structurally different tables.)

A transport_stream_id field (16 bit) indicates a unique identifier of a broadcast stream in which the corresponding NST section is being transmitted.

A Num_NRT_services field (8 bits) indicates the number of NRT services included in the NRT section. (That is, this 8-bit field shall specify the number of NRT services in this NST section).

Thereafter, the 'for' loop, which is also referred to as an "NRT service loop", is executed the same number of times as the number of NRT services corresponding to the num_NRT_services field value to provide signaling information of a plurality of NRT services. That is, signaling information of the corresponding NRT service is indicated for each of the NRT services included in the NST section. Herein, it is possible to provide the following field information for each NRT service.

An NRT_service_id field (16 bits) indicates a value that can uniquely identify the corresponding NRT service. (That is, this field indicates a 16-bit unsigned integer that shall uniquely identify this NRT service within the scope of this NRT section.) The NRT_service_id field value of one service does not vary while the service is maintained. (That is, the NRT_service_id of a service shall not change throughout the life of the service.) Here, in order to avoid confusion, when a service is terminated, an NRT_service_id field value of the service may remain unused until a specific time elapses. (That is, to avoid confusion, it is recommended that if a service is terminated, then the NRT_service_id for the service should not be used for another service until a suitable interval of time elapses.)

An NRT_service_category field (5 bits) indicates a service type of the corresponding NRT service.

An NRT_service_status field (2 bits) indicates the status of the corresponding NRT service. For example, the NRT_service_status field indicates that the corresponding NRT service is in an active state when the most significant bit of the NRT_service_status field is set to "1" and indicates that the corresponding NRT service is in an inactive state when the most significant bit is set to "0". In addition, the NRT_service_status field indicates that the corresponding NRT service is in a hidden state when the least significant bit of the NRT_service_status field is set to "1" and indicates that the corresponding NRT service is not in a hidden state when the least significant bit is set to "0". (That is, the most significant bit shall indicate whether this NRT service is active (when set to 1) or inactive (when set to 0) and the least significant bit shall indicate whether this NRT service is hidden (when set to 1) or not (when set to 0).)

An SP_indicator field (1 bit) indicates whether or not service protection is applied to the corresponding NRT service. If the SP_indicator field value is 1, service protection is applied to at least one of the components that are required to provide meaningful presentation of the corresponding NRT service. (That is, the SP_indicator field is a 1-bit field that indicates, when set to 1, that service protection is applied to at least one of the components needed to provide a meaningful presentation of this NRT service.)

A Short_NRT_service_name field (8*8 bits) indicates a short name of the NRT service. This field may be filled with null data (for example, 0x00) when the NRT service has no short name.

A num_FLUTE_sessions field (8 bits) indicates the number of FLUTE sessions that constitute the NRT service.

Thereafter, the 'for' loop, which is also referred to as a "FLUTE session loop", is executed the same number of times as the number of FLUTE sessions corresponding to the num_FLUTE_sessions field value to provide access information of a plurality of FLUTE sessions. That is, access information of each of the FLUTE sessions included in the NRT service is provided. Here, it is possible to provide the following field information for each FLUTE session.

A FLUTE_session_type field (3 bits) identifies the type of the FLUTE session according to data objects transmitted through the FLUTE session. FIG. 10 illustrates values allocated to the FLUTE_session_type field value and the meanings of the values. For example, when the FLUTE_session_type field value is 000, this indicates that the corresponding FLUTE session is a FLUTE file delivery session that transmits a content/file for the actual NRT service. The remaining values are not used in the present invention. That is, when the FLUTE_session_type field value is 000, a FLUTE file delivery descriptor (NRT_FLUTE_File_Delivery_descriptor( )) as shown in FIG. 11 is transmitted as the FLUTE_session_level_descriptor( ). Details of each field of the FLUTE file delivery descriptor will be described later.

A media_object_association_indicator field (1 bit) indicates whether or not media object association information associated with the FLUTE session is present. For example, when the media_object_association_indicator field is set to 1, this indicates that media object association information that is provided as a stream or file or a descriptor (for example, an NRT_media_object_association_descriptor( )) in association with the FLUTE session is present. (That is, this 1-bit indicator shall indicate, when set, that there is media object association information that is provided associated with this FLUTE session through the media_object_association_descriptor( ) or through a stream or a file.) That is, when this field is 1, an NRT_media_object_association_descriptor( ) is received within the FLUTE session loop (i.e., received while being included in the FLUTE session loop). Here, the media_object_association_indicator field may be omitted from the NST. In this case, when media object association information is present, an NRT_media_object_association_descriptor( ) is received through a FLUTE session level descriptor. The receiver parses all descriptors included in the FLUTE session level descriptor and can identify the NRT_media_object_association descriptor( ) using the identifier of the description.

When an essential_component_delivery_indicator field (1 bit) is set to 1, this indicates that the corresponding FLUTE session transmits essential components (i.e., content/file(s)) for the NRT service. Otherwise, this field indicates that components (i.e., content/files) transmitted through the corresponding FLUTE session are optional. (That is, this field is an one-bit indicator which, when set, shall indicate that this FLUTE session carries an essential component for the NRT service. Otherwise, this field indicates that the components carried through this FLUTE session are optional components.)

An IP_version_flag field (1 bit) indicates that FLUTE_session_source_IP_address and FLUTE_session_destination_IP_address fields are IPv4 addresses when the IP_version_flag field is set to 1 and indicates that FLUTE_session_source_IP_address and FLUTE_session_destination_IP_address fields are IPv6 addresses when the IP_version_flag field is set to 0. (That is, this field is a 1-bit indicator which, when set to zero, shall indicate that FLUTE_session_source_IP_address, FLUTE_session_destination_IP_address fields are IPv4 addresses. Otherwise, this field indicates that FLUTE_session_source_IP_address and FLUTE_session_destination_IP_address fields are IPv6 addresses.)

When a source_specific_multicast_flag field (1 bit) is set to '1', this indicates that the source specific multicast is used for the FLUTE session. Therefore, a FLUTE_session_source_IP_address should be present. (That is, this field is a 1-bit Boolean flag that shall indicate, when set, that the source specific multicast is used for this FLUTE session. Thus, the FLUTE_session_source_IP_address shall be present.)

A FLUTE_session_source_IP_address field (32 or 128 bits) is present when the source_specific_multicast_flag field is set to '1' and is absent when the source_specific_multicast_flag field is set to '0'. If the FLUTE_session_source_IP_address field is present, this field is a source IP address of the same server that transmits all channels of the FLUTE session. (That is, this field shall be present if the source_specific_multicast_flag is set to '1' and shall not be present if the source_specific_multicast_flag is set to '0'. If present, this field shall contain the source IP address of all the IP datagrams carrying the components of this FLUTE session.)

A FLUTE_session_destination_IP_address field ((32 or 128 bits) includes a target (destination) of all IP datagrams that transmit components of the FLUTE session. (That is, this field shall contain the destination of all the IP datagrams carrying the components of this FLUTE session.)

A FLUTE_session_destination_UDP_port_num field (16 bits) indicates a destination UDP port number of a UDP/IP stream that transmits the FLUTE session. (That is, this is a 16-bit unsigned integer field that represents the destination UDP port number for the UDP/IP stream carrying this FLUTE session.)

A Num_FLUTE_session_level_descriptors field (4 bits) indicates the number of descriptors (FLUTE_session_level_descriptor( )) included in the FLUTE session loop.

The same number of FLUTE_session_level_descriptors( ) as a number corresponding to the Num_FLUTE_session_level descriptors field value are included in the FLUTE session loop to provide additional information about the FLUTE session. (That is, one or more descriptors providing additional information for this FLUTE session may be included.)

A Num_NRT_service_level_descriptors field (4 bits) indicates the number of descriptors (NRT_service_level_descriptors( )) included in the NRT service loop.

The same number of NRT_service_level_descriptors( ) as a number corresponding to the Num_NRT_service_level_descriptors field value are included in the NRT service loop to provide additional information about the NRT service. (That is, zero or more descriptors providing additional information for this NRT service may be included.)

FIG. 11 illustrates an example of a bit stream syntax structure of an NRT_FLUTE_File_Delivery_descriptor( ) that is provided as a FLUTE_session_level_descriptor( ) according to the present invention. That is, the NRT_FLUTE_File_Delivery_descriptor( ) is used as a FLUTE_session_level_descriptor( ) of the NST and includes additional signaling information for access to the corresponding FLUTE session. The NRT_FLUTE_File_Delivery_descriptor( ) is received as a FLUTE session level descriptor when the FLUTE_session_type field value is 000. The following is a description of each field of the NRT_FLUTE_File_Delivery_descriptor( ).

In FIG. 11, a descriptor_tag field (8 bits) is a descriptor identifier and an identifier that identifies an NRT FLUTE file delivery descriptor (NRT_FLUTE_File_Delivery_descriptor( )) can be set in this field.

A descriptor_length field (8 bits) represents, in bytes, the remaining length of the descriptor (from a field next to the descriptor_length field to the end of this descriptor).

A FLUTE_session_TSI field (16 bits) indicates a TSI of the FLUTE session. The TSI is an identifier that can uniquely identify the FLUTE session. (That is, this is a 16-bit unsigned integer field, which shall be the Transport Session Identifier (TSI) of the FLUTE session).

A session_start_time field (16 bits) indicates the time at which the FLUTE session starts. If all values of this field are '0', this can be interpreted as indicating that the FLUTE session has already started. (That is, the session_start_time is the time at which the FLUTE session starts. If the value of this field is set to all zeros, then it shall be interpreted to mean that the session has already started).

A session_end_time field (16 bits) indicates the time at which the FLUTE session terminates. If all values of this field are '0', this can be interpreted as indicating that the FLUTE session continues indefinitely. (That is, the session_end_time is the time at which the FLUTE session ends. If the value of this field is set to all zeros, then it shall be interpreted to mean that the session continues indefinitely).

A tias_bandwidth_indicator field (1 bit) indicates whether or not Transport Independent Application Specific (TIAS) bandwidth information is included. The bit of the tias_bandwidth_indicator field will be set to '1' to indicate that the TIAS bandwidth field is present and will be set to '0' to indicate that the TIAS bandwidth field is absent (That is, this is a 1-bit field that flags the inclusion of TIAS bandwidth information. This bit shall be set to '1' to indicate that the TIAS bandwidth field is present, and it shall be set to '0' to indicate that the TIAS bandwidth field is absent.)

An as_bandwidth_indicator field (1 bit) indicates whether or not Application Specific (AS) bandwidth information is included. The bit of the as_bandwidth_indicator field will be set to '1' to indicate that the AS bandwidth information is present and will be set to '0' to indicate that the AS bandwidth information is absent (That is, this is a 1-bit field that flags the inclusion of AS bandwidth information. This bit shall be set to '1' to indicate that the AS bandwidth field is present, and it shall be set to '0' to indicate that the AS bandwidth field is absent).

An FEC_OTI_indicator field (1 bit) indicates whether or not FEC object transmission information (OTI) is provided. (That is, this field is a 1-bit indicator that indicates whether FEC Object Transmission Information is provided).

A tias_bandwidth field (16 bits) is present when the as_bandwidth_indicator field is set to '1' and indicates the maximum TIAS bandwidth. (That is, this value shall be one one-thousandth of the Transport Independent Application Specific maximum bandwidth as defined in RFC 3890, rounded up to the next highest integer if necessary. This gives the TIAS bandwidth in kilobits per second.)

An as_bandwidth field (16 bits) is present when the as_bandwidth_indicator field is set to '1' and indicates the maximum AS bandwidth. (That is, this value shall be the Application Specific maximum bandwidth as defined in RFC 4566. This gives the AS bandwidth in kilobits per second.)

An FEC_encoding_id field is present when the FEC_OTI_indicator field is set to '1' and indicates an FEC encoding ID used in the corresponding FLUTE session. (That is, this field is an FEC encoding ID used in this FLUTE session, as defined in RFC 3926.)

An FEC_instance_id field is present when the FEC_OTI_indicator field is set to '1' and indicates an FEC instance ID used in the corresponding FLUTE session. (That is, this field is an FEC instance ID used in this FLUTE session, as defined in RFC 3926).

The above parameters are signaled through an NRT FLUTE file delivery descriptor NRT_FLUTE_File_Delivery_descriptor( ) in a FLUTE session loop and thus it is possible to provide all information required to receive the FLUTE session.

That is, by opening the corresponding FLUTE session according to time information set by the session_start_time field and the session_end_time field, it is possible to receive files that constitute the NRT service and a File Description Table (FDT) that describes signaling information of the files.

On the other hand, if the media_object_association_indicator field value in the NST is set to '1', media object association information associated with the FLUTE session is signaled using the NRT media object association descriptor. For example, the media object association information is provided in text format expressed by a Multipurpose Internet Mail Extensions (MIME) type.

FIG. 12 illustrates an embodiment of a bit stream syntax structure of an NRT media object association descriptor (NRT_media_object_association_descriptor( )) according to the present invention. The NRT media object association descriptor is used as a FLUTE_session_level_descriptor( ) of the NST. The NRT media object association descriptor signals parameters necessary for rendering content/file(s) (which will also be referred to as a "media object/file") that are transmitted through the corresponding FLUTE session.

The following is a description of each field of the NRT media object association descriptor NRT_media_object_association_descriptor( ).

In FIG. 12, a descriptor_tag field (8 bits) is a descriptor identifier and indicates an identifier that identifies the NRT media object association descriptor NRT_media_object_association_descriptor( ).

A descriptor_length field (8 bits) represents, in bytes, the remaining length of the descriptor (from a field next to the descriptor_length field to the end of this descriptor).

An object_association_type field (3 bits) indicates how the media object association information is signaled. (That is, this 3-bit enumerated field shall indicate how the media object association information is signaled.) In an embodiment, the media object association information may also be signaled through in-line fields of the descriptor in a MIME type text format. In another embodiment, the media object association information may also be signaled through a media object association stream in a MIME type text format. In another embodiment, the media object association information may also be signaled through a media object association file in a MIME type text format. (That is, the media object association can be done through the in-line fields of this descriptor or can be done through the media object association stream or through the media object association file.)

FIG. 13 illustrates an embodiment of values allocated to the object_association_type field and definitions of the values.

For example, if the object_association_type field value is '000', media object association information required for rendering content that carries the association object is provided through in-line text of the descriptor. (That is, the media object association information, which is necessary for rendering the content that the associated object is carrying, is provided as in-line text of this descriptor.)

In another example, if the object_association_type field value is '001', media object association information required for rendering content that carries the association object is provided through a separate UDP/IP stream. The UDP/IP stream transmits an SAP/SDP-like data structure. (That is, the media object association information, which is necessary for rendering the content that the associated object is carrying, is provided by a separated UDP/IP stream, which carries SAP/SDP like data structure.)

In another example, if the object_association_type field value is '010', media object association information required for rendering content that carries the association object is provided through an SDP-like file. The SDP-like file is provided through a separate FLUTE file delivery session. (That is, the media object association information, which is necessary for rendering the content that the associated object is carrying, is provided by an SDP-like file, which is carried through a separated FLUTE file delivery session.)

Accordingly, if the object_association_type field value is '000', the media object association information is described directly using at least one field in the NRT media object association descriptor.

If the object_association_type field value is '001' or '010', the NRT media object association descriptor provides access information of a file or a stream that carries the media object association information. In addition, if the object_association_type field value is '010', the NRT media object association descriptor provides not only the access information of the file but also parameters required to receive a FLUTE session that carries the file.

That is, if the object_association_type field value is '000', the NRT media object association descriptor includes a num_media_objects_in_session field and a 'for' loop statement that is repeated the same number of times as a number corresponding to the num_media_objects_in_session field value.

The for loop statement may include a media_object_TOI field, an object_container_type_text_length field, an object_container_type_text ( ) field, an object_media_type_text_length field, an object_media_type_text ( ) field, an object_decoding_parameters_text_length field, and an object_decoding_parameters_text ( ) field.

The num_media_objects_in_session field (8 bits) indicates the number of media objects that require object association signaling in this FLUTE session. (That is, this 8-bit unsigned integer field specifies the number of media objects that require object association signaling, carried through this FLUTE session.)

The media_object_TOI field (32 bits) indicates an identifier (i.e., Transport Object Identifier (TOI)) of a transport object that is transmitted through the FLUTE session. (That is, this field is a 32-bit unsigned integer field which shall be the Transport Object Identifier, associated with this Transport Object carried through the FLUTE session.) Specifically, the media_object_TOI field indicates a value that identifies content/file(s) that are transmitted through the FLUTE session.

The object_container_type_text_length field (8 bits) indicates the byte length of the object_container_type_text ( ) character string. (That is, this field shall specify the length (in bytes) of the object_container_type_text ( ) character string.)

The object_container_type_text ( ) field indicates the type of a file or object container in which the object is encapsulated. Specifically, the object_container_type_text ( ) field expresses the type in a string that appears as an entry in an SDP to identify the type of the container. (That is, the object_container_type_text ( ) field indicates the file or object container type where this object is encapsulated and is expressed in a string that would normally appear as an entry in an SDP to identify the type of the container.) For example, the object_ontainer_type_text ( ) field represents the file format or the like in text format.

The object_media_type_text_length field (8 bits) indicates the byte length of the object_media_type_text ( ) character string. (That is, this field shall specify the length (in bytes) of the object_media_type_text ( ) character string.)

The object_media_type_text ( ) field indicates a media type that identifies an encoding format of an object that is described in this descriptor. Specifically, the object_media_type_text ( ) field indicates the encoding format of the object in text format. (That is, this field indicates the media type identifying the encoding format of the object that this descriptor describes. This shall be identical to the character string that would normally appear in an "a=rtpmap" entry in an SDP to identify the type of the media.) For example, the object_media_type_text ( ) field provides encoding format information of audio, video, or the like, which is transmitted through the NRT service, in text format.

The object_decoding_parameters_text_length field (8 bits) indicates the byte length of the object_decoding_parameters_text ( ) character string. (That is, this field shall specify the length (in bytes) of the object_decoding_parameters_text ( ) character string.)

The object_decoding_parameters_text ( ) field indicates decoding parameters of an object described in this descriptor in text format. (That is, this field includes a text string that identifies the decoding parameters of the object that this descriptor describes.)

If the object_association_type field value is '001' or '010', the descriptor may include an IP_version_flag field, a source_specific_multicast_flag field, an object_association_stream_source_IP_address field, an object_association_stream_destination_UDP_port_num field, and an object_association_stream_destination_IP_address field. That is, the descriptor provides access information of an IP datagram that carries the file or stream.

The IP_version_flag field (1 bit) indicates that the object_association_stream_source_IP_address and object_association_stream_destination_IP_address fields are IPv4 addresses if this field is set to '0' and indicates that the object_association_stream_source_IP_address and object_association_stream_destination_IP_address fields are addresses if this field is set to '1'. (That is, this field is a 1-bit indicator that shall indicate, when set to zero, that object_association_stream_source_IP_address and object_association_stream_destination_IP_address fields are IPv4 addresses. Otherwise, this field indicates that object_association_stream_source_IP_address and object_association_stream_destination_IP_address fields are IPv6 addresses.)

The source_specific_multicast_flag field (1 bit) indicates that the source specific multicast is used for the FLUTE session if this field is set to '1'. Therefore, in this case, an object_association_stream_source_IP_address needs to be present. (That is, this field is a 1-bit Boolean flag that shall indicate, when set, that the source specific multicast is used for this FLUTE session. Thus, the object_association_stream_source_IP_address shall be present.)

The object_association_stream_IP_address field (32 or 128 bits) is present when the source_specific_multicast_flag field is set to '1' but is absent when the source_specific_multicast_flag field is set to '0'. If the object_association_stream_IP_address field is present, this field includes the source IP address of all IP datagrams that carry the components (i.e., content/file(s)) of the FLUTE session. (That is, this field shall be present if the source_specific_multicast_flag is set to '1' and shall not be present if the source_specific_multicast_flag is set to '0'. If present, this field shall contain the source IP address of all the IP datagrams carrying the components of this FLUTE session.)

The object_association_stream_destination_IP_address field (32 or 128 bits) indicates the destination IP address of all IP datagrams that carry the components (i.e., content/file(s)) of the object association stream. (That is, this field shall contain the destination of all the IP datagrams carrying the components of this object association stream.)

The object_association_stream_destination_UDP_port_num field (16 bits) indicates a destination UDP port number of a UDP/IP stream that carries the object association stream. (That is, this is a 16-bit unsigned integer field that represents the destination UDP port number for the UDP/IP stream carrying this object association stream.)

If the object_association_type field value is '010', the descriptor further includes an object_association_session_TSI field, an object_association_session_start_time field, an object_association_session_end_time field, a tias_bandwidth_indicator field, an as_bandwidth_indicator field, an FEC_OTI_indicator field, a tias_bandwidth field, an as_bandwidth field, an FEC_encoding_id field, and an FEC_instance_id field. That is, the descriptor describes parameters required to receive the corresponding FLUTE session.

The object_association_session_TSI field (16 bits) indicates a TSI of a FLUTE session that carries the object association file. The TSI is an identifier that can uniquely identify the FLUTE session. (That is, this is a 16-bit unsigned integer field which shall be the Transport Session Identifier (TSI) of the FLUTE session that carries the object association file.)

The object_association_session_start_time field (16 bits) indicates the time at which the FLUTE session carrying the object association file starts. If all values of this field are '0', this can be interpreted as indicating that the FLUTE session has already started. (That is, this field indicates the time at which the FLUTE session that carries the object association file starts. If the value of this field is set to all-zero, then it shall be interpreted to mean that the session has already started.)

The object_association_session_end_time field (16 bits) indicates the time at which the FLUTE session carrying the object association file ends. If all values of this field are '0', this can be interpreted as indicating that the FLUTE session continues indefinitely. (That is, this field indicates the time at which the FLUTE session that carries the object association file ends. If the value of this field is set to all-zero, then it shall be interpreted to mean that the session continues indefinitely.)

The tias_bandwidth_indicator field (1 bit) indicates whether or not Transport Independent Application Specific (TIAS) bandwidth information is included. The bit of the tias_bandwidth_indicator field is set to '1' to indicate that the TIAS bandwidth field is present and set to '0' to indicate that the tias_bandwidth_indicator field is absent. (That is, this is a 1-bit field that flags the inclusion of TIAS bandwidth information. This bit shall be set to '1' to indicate that the TIAS bandwidth field is present, and it shall be set to '0' to indicate that the TIAS bandwidth field is absent.)

The as_bandwidth_indicator field (1 bit) indicates whether or not Application Specific (AS) bandwidth information is included. The bit of the as_bandwidth_indicator field is set to '1' to indicate that the AS bandwidth field is present and set to '0' to indicate that the AS bandwidth field is absent. (That is, this is a 1-bit field that flags the inclusion of AS bandwidth information. This bit shall be set to '1' to indicate that the AS bandwidth field is present, and it shall be set to '0' to indicate that the AS bandwidth field is absent.)

The FEC_OTI_indicator field (1 bit) indicates whether or not FEC object transmission information (OTI) is provided. (That is, this field is a 1-bit indicator that indicates whether FEC Object Transmission Information is provided.)

The tias_bandwidth field (16 bits) is present when the as_bandwidth_indicator field is set to set to '1' and indicates the maximum TIAS bandwidth. (That is, this value shall be one one-thousandth of the Transport Independent Application Specific maximum bandwidth as defined in RFC 3890, rounded up to the next highest integer if necessary. This gives the TIAS bandwidth in kilobits per second.)

The as_bandwidth field (16 bits) is present when the as_bandwidth_indicator field is set to '1' and indicates the maximum AS bandwidth. (That is, this value shall be the Application Specific maximum bandwidth as defined in RFC 4566. This gives the AS bandwidth in kilobits per second.)

The FEC_encoding_id field is present when the FEC_OTI_ indicator field is set to '1' and indicates an FEC encoding ID used in the corresponding FLUTE session. (That is, this field includes FEC encoding ID used in this FLUTE session, as defined in RFC 3926.)

The FEC_instance_id field is present when the FEC_OTI_ indicator field is set to '1' and indicates an FEC instance ID used in the corresponding FLUTE session. (That is, this field includes an FEC instance ID used in this FLUTE session, as defined in RFC 3926).

For example, in the case where the media object association information is transmitted in a stream or file format, the stream may be a Session Announcement Protocol (SAP) stream and the file may be a Session Description Protocol (SDP) file. In the case where the media object association information is transmitted in an SAP stream, the IP_version_flag field, the source_specific_multicast_flag field, the object_association_stream_source_IP_address field, the object_association_stream_destination_UDP_port_num field, and the object_association_stream_destination_IP_address field are access information of an IP datagram that carries the SAP stream. Accordingly, the IP datagram of the SAP stream may be received based on the access information of the IP datagram and media object association information may be extracted from the received IP datagram of the SAP stream.

In the case where the media object association information is transmitted in an SDP file, the IP_version_flag field, the source_specific_multicast_flag field, the object_association_stream_source_IP_address field, the object_association_stream_destination_UDP_port_num field, and the object_association_stream_destination_IP_address field are access information of the corresponding FLUTE session or IP datagram that carries the SDP file. Accordingly, the IP datagram of the SDP file may be received based on the access information of the IP datagram and media object association information may be extracted from the received IP datagram of the SDP file.

FIG. 14 and FIG. 15 illustrate another embodiment of a bit stream syntax structure of an NST section according to the present invention.

Herein, although the syntax is written in an MPEG-2 private section for better understanding, the data may be in any format. For example, it is possible to use another method in which the syntax is expressed in a Session Description Protocol (SDP) format and is then signaled through a Session Announcement Protocol (SAP).

In FIG. 14 and FIG. 15, a table_id field (8 bits) identifies the type of the corresponding table section and it can be determined through this field that the corresponding table section is a table section that constitutes the NST. (That is, this field includes an 8-bit unsigned integer that indicates the type of table section defined in an NRT service Table (NST)).

A section_syntax_indicator field (1 bit) is an indicator that defines the section format (or type) of the NST and the section format may be a short-form syntax ('0') of MPEG. (That is, this 1-bit field is a section_syntax_indicator and shall be set to '0' to always indicate that this table is derived from the "short" form of the MPEG-2 private section table.)

A private_indicator field (1 bit) indicates whether or not the section format complies with the private section format. (That is, this 1-bit field is a private_indicator and shall be set to '1'.)

A section_length field (12 bits) indicates the length of the remaining table section subsequent to this field. (That is, this 12-bit section_length field specifies the number of remaining bytes of this table section immediately following this field. The value in this field shall not exceed 4093 (0xFFD).)

A table_id_extension field (16 bits) is dependent on the table and is a logical portion of the table_id field that provides the scope of the remaining fields. (That is, this 16-bit table_id_extension field is table-dependent and shall be considered to be logically part of the table_id field providing the scope for the remaining fields.) Here, the table_id_extension field includes an NST_protocol_version field.

The NST_protocol_version field (8 bits) indicates a protocol version that allows an NST transmitted through parameters having a different structure from those defined in the current protocol. (That is, the NST_protocol_version field is an 8-bit unsigned integer field whose function is to allow, in the future, this NST to carry parameters that may be structured differently than those defined in the current protocol. At present, the value for the NST_protocol_version shall be zero. Non-zero values of NST_protocol_version may be used by a future version of this standard to indicate structurally different tables.)

A version_number field (5 bits) indicates the version number of the NST.

A current_next_indicator field (1 bit) indicates whether or not the transmitted NST section is currently applicable. (That is, the current_next_indicator field is a one-bit indicator, which when set to '1' shall indicate that the sent NST is currently applicable. When the bit is set to '0', it shall indicate that the sent table is not yet applicable and will be the next table to become valid. This standard imposes no requirement that "next" tables (those with current_next_indicator set to '0') be sent. An update to the currently applicable table shall be signaled by incrementing the version_number field.)

A section_number field (8 bits) indicates the current NST section number. (That is, the section_number field is an 8-bit field that shall give the section number of this NST section. The section_number of the first section in an NST shall be '0x00'. The section_number shall be incremented by 1 with each additional section in the NST.)

A last_section_number field (8 bits) indicates the last section number of the NST table. (That is, the last_section_number field is an 8-bit field that shall give the number of the last section (i.e., the section with the highest section_number) of the NST of which this section is a part.)

A carrier_frequency field (32 bits) indicates a transmission frequency corresponding to the channel.

A transport_stream_id field (16 bit) indicates a unique identifier of a broadcast stream in which the corresponding NST section is being transmitted.

A source_id field (16 bits) indicates a programming source associated with the virtual channel.

A num_NRT_services field (8 bits) indicates the number of NRT services in the NST section. (That is, the num_services field is an 8 bit field that specifies the number of services in this NST section.)

Thereafter, a 'for' loop, which is also referred to as an "NRT service loop", is executed the same number of times as the number of NRT services corresponding to the num_NRT_services field value to provide signaling information of a plurality of NRT services. That is, signaling information of the corresponding NRT service is indicated for each of the NRT services included in the NST section. Here, the following field information may be provided for each NRT service.

An NRT_service_status field (2 bits) indicates the status of the corresponding NRT service. Here, the MSB of the NRT_service_status field indicates whether the corresponding NRT service is active (when it is '1') or inactive (when it is '0') and the LSB indicates whether the corresponding NRT service is hidden (when it is '1') or not hidden (when it is '0'). (That is, the NRT_service_status field is a 2-bit enumerated field that shall identify the status of this NRT service. The most significant bit shall indicate whether this NRT service is active (when set to '1') or inactive (when set to '0') and the least significant bit shall indicate whether this NRT service is hidden (when set to '1') or not (when set to '0'). Hidden services are normally used for proprietary applications, and ordinary receiving devices should ignore them.)

An SP_indicator field (1 bit) indicates whether or not service protection is applied to the corresponding NRT service. If the SP_indicator field value is 1, service protection is applied to at least one of the components that are required to provide meaningful presentation of the corresponding NRT service. (That is, this 1-bit field indicates, when set to 1, that service protection is applied to at least one of the components needed to provide a meaningful presentation of this NRT service).

A CP_indicator field (1 bit) indicates whether or not content protection is applied to the corresponding NRT service. If the CP_indicator field value is 1, content protection is applied to at least one of the components that are required to provide meaningful presentation of the corresponding NRT service. (That is, this CP_indicator 1-bit field indicates, when set, that content protection is applied to at least one of the components needed to provide a meaningful presentation of this NRT service).

An NRT_service_id field (16 bits) indicates a value that can uniquely identify the corresponding NRT service. (That is, this field indicates a 16-bit unsigned integer that shall uniquely identify this NRT service within the scope of this NRT section.) The NRT_service_id field value of one service does not vary while the service is maintained. (That is, the NRT_service_id of a service shall not change throughout the life of the service.) Here, in order to avoid confusion, when a service is terminated, an NRT_service_id field value of the service may remain unused until a specific time elapses. (That is, to avoid confusion, it is recommended that if a service is terminated, then the NRT_service_id for the service should not be used for another service until a suitable interval of time elapses.)

A Short_NRT_service_name field (8*8 bits) indicates a short name of the NRT service. This field may be filled with null data (for example, 0x00) when the NRT service has no short name.

An NRT_service_category field (6 bits) identifies the type of a service that is transmitted in the corresponding NRT service as defined in Table 1. (That is, The NRT_service_category field is a 6-bit enumerated type field that shall identify the type of service carried in this NRT service as defined in Table 1).

TABLE 1

| NRT_service_category | Meaning |
| --- | --- |
| 0x00 | [Reserved] |
| 0x0E | NRT_channel_discovery: This carries channel discovery information of NRT service. |
| 0x0F | NRT_content_discovery: This carries content discovery information of NRT service. |
| 0x10 | NRT_SG_data_service: This NRT service includes electronic service guide data. |
| 0x11-0x3F | [Reserved for future ATSC use] |

A num_components field (5 bits) indicates the number of IP stream components included in the NRT service. (That is, this num_components field is a 5-bit field that specifies the number of IP stream components in this NRT service).

An IP_version_flag field (1 bit) indicates that the source_IP_address field, the NRT_service_destination_IP_address field, and the component_destination_IP_address field are IPv4 addresses when this field is set to '0' and indicates that the source_IP_address field, the NRT_service_destination_IP_address field, and the component_destination_IP_address field are IPv6 addresses when this field is set to '1'. (That is, this IP_version_flag field is a 1-bit indicator that, when set to '0', shall indicate that the source_IP_address, NRT_service_destination_IP_address, and component_destination_IP_address fields are IPv4 addresses. The value of '1' for this field is reserved for possible future indication that the source_IP_address, NRT_service_destination_IP_address, and component_destination_IP_address fields are IPv6 addresses).

A source_IP_address_flag field (1 bit) indicates that a source IP address value for the corresponding NRT service is present to indicate a source specific multicast when this flag field is set. (That is, this source_IP_address_flag field is a 1-bit Boolean flag that shall indicate, when set, that a source IP address value for this NRT service is present to indicate a source specific multicast).

An NRT_service_destination_IP_address_flag field (1 bit) indicates that an NRT_service_destination_IP_address value is present to provide a default IP address for the components of the corresponding NRT service when this flag field is set to '1'. (That is, this NRT_service_destination_IP_address_flag field is a 1-bit Boolean flag that indicates, when set to '1', that an NRT_service_destination_IP_address value is present to serve as the default IP address for the components of this NRT service).

A source_IP_address field (128 bits) is present when the source_IP_address_flag is set to '1' while it is absent when the source_IP_address_flag is set to '0'. If this field is present, this field includes the source IP address of all IP datagrams that carry the components of the corresponding NRT service. The conditional use of the 128 bit-long address version of this field is to facilitate possible use of IPv6 in the future although the use of IPv6 is not currently defined. The source_IP_address field is a source IP address of the same server that transmits all channels of the FLUTE session. (That is, this source_IP_address field shall be present if the source_IP_address_flag is set to '1' and shall not be present if the source_IP_address_flag is set to '0'. If present, this field shall contain the source IP address of all the IP datagrams carrying the components of this NRT service. The conditional use of the 128 bit-long address version of this field is to facilitate possible use of IPv6 in the future, although use of IPv6 is not currently defined)

In an NRT_service_destination_IP_address field (128 bits), a corresponding source_IP_address field is present if the source_IP_address_flag is set to '1' while it is absent if source_IP_address_flag is set to '0'. If the corresponding source_IP_address field is absent, a component_destination_IP_address field will be present for each component in the num_components loop. The conditional use of the 128 bit-long address version of this source_IP_address field is to facilitate possible use of IPv6 in the future although the use of IPv6 is not currently defined. The NRT_service_destination_IP_Address field is signaled if a destination IP address of the session level of the FLUTE session is present. (That is, this NRT_service_destination_IP_address field shall be present if the NRT_service_destination_IP_address_flag is set to '1' and shall not be present if the NRT_service_destination_IP_address_flag is set to '0'. If this NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined).

Thereafter, a 'for' loop, which will also be referred to as a "component loop", is executed the same number of times as the number of components corresponding to the num_components field value to provide access information of a plurality of components. That is, this provides access information of each component included in the NRT service. Here, the following field information may be provided for each component. Here, in an embodiment, one component corresponds to one FLUTE session.

An essential_component_indicator field (1 bit) indicates that the corresponding component is an essential component for the NRT service if this field value is set to '1'. Otherwise, this field indicates that the corresponding component is optional. (That is, this essential_component_indicator field is a one-bit indicator which, when set to '1', shall indicate that this component is an essential component for the NRT service. Otherwise, this field indicates that this component is an optional component)

A port_num_count field (6 bits) indicates the number of UDP ports associated with the corresponding UDP/IP stream component. The destination UDP port number value starts from the component_destination_UDP_port_num field value and increments by 1. (That is, the port_num_count field shall indicate the number of destination UDP ports associated with this UDP/IP stream component. The values of the destination UDP port numbers shall start from the component_destination_UDP_port_num field and shall be incremented by one).

A component_destination_IP_address_flag field (1 bit) is a flag that indicates that a component_destination_IP_address field is present for the corresponding component if the flag is set to '1'. (That is, this component_destination_IP_address_flag is a 1-bit Boolean flag that shall indicate, when set to '1', that the component_destination_IP_address is present for this component).

A component_destination_IP_address field (128 bits) will be present when the component_destination_IP_address_flag is set to '1' while it will be absent when the component_destination_IP_address_flag is set to '0'. If the component_destination_IP_address field is present, this field will include the source IP address of all IP datagrams that carry the components of the corresponding NRT service. The conditional use of the 128 bit-long address version of this field is to facilitate possible use of IPv6 in the future although the use of IPv6 is not currently defined. (That is, this component_destination_IP_address field shall be present if the component_destination_IP_address_flag is set to '1' and shall not be present if the component_destination_IP_address_flag is set to '0'. When this field is present, the destination address of the IP datagrams carrying this component of the NRT service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined).

A component_destination_UDP_port_num field (16 bits) indicates a destination UDP port number for the corresponding UDP/IP stream component. (That is, the component_destination_UDP_port_num field is a 16-bit unsigned integer field that represents the destination UDP port number for this UDP/IP stream component).

A num_component_level_descriptors field (4 bits) indicates the number of descriptors that provide additional information about the component level.

The same number of descriptors component_level_descriptor( ) as a number corresponding to the num_component_level_descriptors field value are included in the component loop to provide additional information about the component.

A num_NRT_service_level_descriptors field (4 bits) indicates the number of descriptors that provide additional information about the NRT service level.

The same number of descriptors NRT_service_level_descriptor( ) as a number corresponding to the num_NRT_service_level_descriptors field value are included in the NRT service loop to provide additional information about the NRT service.

A num_virtual_channel_level_descriptors field (4 bits) indicates the number of descriptors that provide additional information about the virtual channel level.

The same number of descriptors virtual_channel_level_descriptor( ) as a number corresponding to the num_virtual_channel_level_descriptors field value are included in the virtual channel loop to provide additional information about the virtual channel.

FIG. 16 illustrates an embodiment of a bit stream syntax structure of a component_descriptor( ) that is provided as a component_level_descriptors ( ). That is, the component_descriptor( ) is used as one of the component level descriptor component_level_descriptors ( ) of the NST and describes additional signaling information of the corresponding component.

The following is a description of each field of the component_descriptor( ).

In FIG. 16, a descriptor_tag field (8 bits) is a descriptor identifier and an identifier that identifies the component_descriptor( ) can be set in this field.

A descriptor_length field (8 bits) represents, in bytes, the remaining length of the descriptor (from a field next to the descriptor_length field to the end of this descriptor).

A component_type field (7 bits) indicates a value that identifies an encoding format of the component. The identification value may be one of the values allocated for the payload_type of the RTP/AVP stream. Alternatively, the identification value may be one of the values predetermined through agreement between the transmitting and receiving sides or may be a dynamic value between 96 and 127. For the components that constitute media transmitted through the RTP, the value of the component_type field should match the value in the payload_type field in the RTP header of the IP stream carrying the corresponding component. (That is, the component_type field is a 7-bit field that shall identify the encoding format of the component. The value may be any of the values assigned by IANA for the payload_type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component. Note that additional values of the component_type field in the range of 43-71 can be defined in future versions of this standard).

A component_data (component_type) field provides encoding parameter required for rendering the corresponding component and/or other parameters. Here, the structure of a component_data element is determined by the value of the component_type field. (That is, in the component_data (component_type) field, the component_data ( ) element provides the encoding parameters and/or other parameters necessary for rendering this component. The structure of the component_data is determined by the value of the component_type field).

For example, if the component_type field value is 35, the component_data (component_type) field provides component data for an H.264/AVC video stream.

In another example, if the component_type field value is 38, the component_data (component_type) field provides data for FLUTE file delivery as shown in FIG. 17. A description of each field of FIG. 17 is omitted herein since reference can be made to FIG. 11.

That is, signaling information required to receive the corresponding FLUTE session may be provided using the NRT_FLUTE_File_Delivery_descriptor( ) of FIG. 11 or may be provided using the component_descriptor( ) descriptor of FIG. 16.

In FIG. 16, a component_encryption_flag field (1 bit) indicates whether or not the corresponding component has been encrypted.

A Num_STKM_streams field (8 bits) indicates the number of STKM streams associated with the corresponding component if the component_encryption_flag field indicates that the corresponding component has been encrypted. (That is, the num_STKM_streams field is an 8-bit unsigned integer field that shall identify the number of STKM streams associated with this component).

An STKM_stream_id field (8 bits) is repeated the same number of times as a number corresponding to the Num_STKM_streams field value and indicates a value that identifies a SKTM stream that can acquire a key required for decryption.

On the other hand, the NST of FIG. 14 and FIG. 15 may also provide media object association information.

In an embodiment, if media object association information is present, an NRT_media_object_association_descriptor( ) as shown in FIG. 12 is provided as a component level descriptor. In this case, the receiver parses all descriptors included in the component level descriptor. Herein, the receiver can identify an NRT_media_object_association_descriptor( ) using the identifier of the descriptor. A description of each field of the NRT_media_object_association_descriptor( ) and a procedure for extracting media object association information of the text format from the NRT_media_object_association_descriptor( ) is omitted herein since reference can be made to the above description of the NST of FIG. 12. Herein, a media_object_association_indicator field (1 bit) may also be allocated to the NST of FIGS. 14 and 15 in order to determine whether or not an NRT_media_object_association_descriptor( ) is present in the component loop.

In another embodiment, media object association information may also be provided using a component_descriptor( ) as shown in FIG. 16. Herein, the component_type field value may use a value between 43 and 71. In an embodiment of the present invention, 43 is allocated to the component_type field value to provide the media object association information as component data. The illustrated number is only an example and does not limit the scope of the present invention. That is, if the component_type field value is 43, the component_data (component_type) field provides component data for media object association information as shown in FIG. 18. A description of each field of FIG. 17 is omitted herein since reference can be made to FIG. 12.

In another embodiment, when media object association information is provided using the component_descriptor( ) as shown in FIG. 16, one of the values in a dynamic range of 96-127 may also be allocated to the component_type field value. In this case, the media object association information may be provided using the component data as shown in FIG. 19.

FIG. 19 illustrates an embodiment of a bit stream syntax structure when one value in a dynamic range of 96-127 is allocated to the component_type field value.

In FIG. 19, a general_media_type field (4 bits) indicates a general media type of the component. For example, if the general_media_type field value is 0x0, a decoding parameter and an encoding format applied to a video stream is provided in text format using subsequent media_type_text ( ) and decoding_parameters_text ( ) fields. In one example, the media_type_text ( ) field and the decoding_parameters_text ( ) field provide the encoding format and the decoding parameter in text format expressed in a Multipurpose Internet Mail Extensions (MIME) type.

The present invention may also allocate a value of 0x2 or a value in a range of 0x4-0xF to the general_media_type field value and provide media object association information in text format using the media_type_text ( ) field and the decoding_parameters_text ( ) field.

In FIG. 19, an ISO_639_language_code field (24 bits) indicates language used when 0x1 is allocated to the general_media_type field value, i.e., language used in an audio stream.

A media_type_text_length field (8 bits) indicates the byte length of a subsequent media_type_text ( ) character string. (That is, this field shall specify the length (in bytes) of the media_type_text ( ) character string.)

The media_type_text ( ) field indicates a media type that identifies the encoding format. That is, this field indicates, in text format, the encoding format of a stream corresponding to the general media type.

A decoding_parameters_text_length field (8 bits) indicates the byte length of a subsequent decoding_parameters_text ( ) character string. (That is, this field shall specify the length (in bytes) of the decoding_parameters_text ( ) character string.)

The decoding_parameters_text ( ) field indicates, in text format, decoding parameters of a stream corresponding to the general media type.

Figure 20:
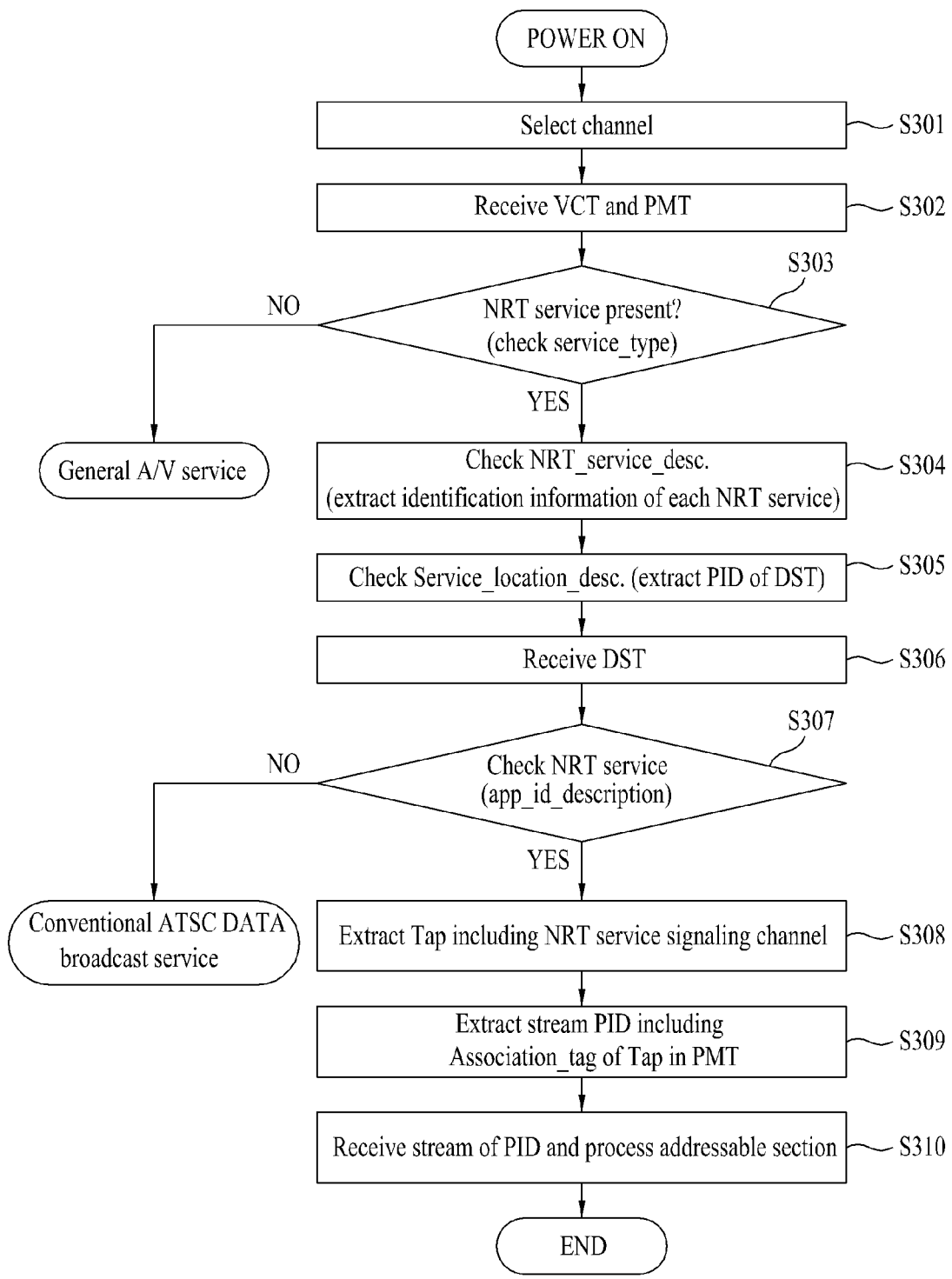
FIG. 20 is a flow chart illustrating an embodiment of a procedure for receiving an IP stream that carries an NRT service signaling channel according to the present invention.

FIG. 20 is a flow chart illustrating a procedure for extracting NRT service signaling data and NRT service data according to the present invention described above. In FIG. 20, in an embodiment, a value of 0x05 is allocated to the service_type field value in the VCT as shown in FIG. 6 to indicate that one or more NRT services are transmitted through the corresponding virtual channel.

That is, when a physical transmission channel is tuned (i.e., selected) (S301), a VCT and a PMT are obtained from a broadcast signal received through the tuned physical transmission channel (S302). Then, the obtained VCT is parsed to determine whether or not an NRT service is present (S303). Whether or not an NRT service is present can be determined by checking a service_type field value in a virtual channel loop in the VCT. Step S301 is performed at a tuner and steps S302 and 303 are performed at a PSI/PSIP section handler.

For example, if the service_type field value is not 0x05, the virtual channel carries no NRT service. Since the virtual channel carries a conventional service (i.e., a legacy ATSC service), the receiver performs an appropriate operation according to information included in the virtual channel.

If the service_type field is 0x05, the virtual channel carries an NRT service. In this case, since an NRT service descriptor (NRT_service_descriptor( )) as shown in FIG. 7 is received within the virtual channel loop, identification information of each NRT service is extracted from the NRT service descriptor and the extracted identification information is stored (S304). That is, identifier, short name, service type, and service status information (NRT_service_id, NRT_service_short_name, NRT_service_category, and NRT_service_status) of each NRT service transmitted through the virtual channel is extracted from the NRT service descriptor. Step S301 is performed at the tuner and steps S302 to S304 are performed at the service manager or PSI/PSIP section handler.

If the stream_type field value included in the service location descriptor (or ES loop of the PMT) of the VCT is 0x95 (i.e., if this field indicates DST transmission), a DST is received using the Elementary_PID field value (S305, S306).

Steps S305 and S306 are performed at a demultiplexer under control of the service manager.

An NRT service is identified from the received DST (S307) and signaling data of the identified NRT service (for example, a PID of an MPEG-2 TS packet separated from an IP datagram of an NRT service signaling channel carrying the NST) is obtained. The NRT service can be identified from an App_id_description field value.

In an embodiment of the present invention, '0x0003' is allocated to the App_id_description field in order to identify the NRT application (i.e., the NRT service). The illustrated number is only an example and does not limit the scope of the present invention.

If the App_id_description field value is '0x0003', an Application_id_type value subsequent to the App_id_description field value is a service ID value of the NRT application (i.e., the NRT service). Therefore, after the NRT application (i.e., the NRT service) is identified as described above, a Tap is extracted in order to search for the PID of the MPEG-2 TS packet separated from the IP datagram of the NRT service signaling channel (S308). Then, a stream PID including an association_tag of the extracted Tap is extracted from the PMT (S309). Steps S307 to S309 are performed at the service manager or the PSI/PSIP section handler.

Then, MPEG-2 TS packets corresponding to the extracted stream PID are received and decapsulation is performed on the received MPEG-2 TS packets (i.e., MPEG-2 headers are removed therefrom) to restore a DSM-CC addressable section (S310). Step S310 is performed at an addressable section handler.

An IP datagram that carries the NRT service signaling channel can be restored by removing a section header and a CRC checksum from the DSM-CC addressable section. Herein, in an embodiment, access information of the IP datagram that carries the NRT service signaling channel includes a well-known destination IP address and a well-known destination UDP port number.

Figure 21:
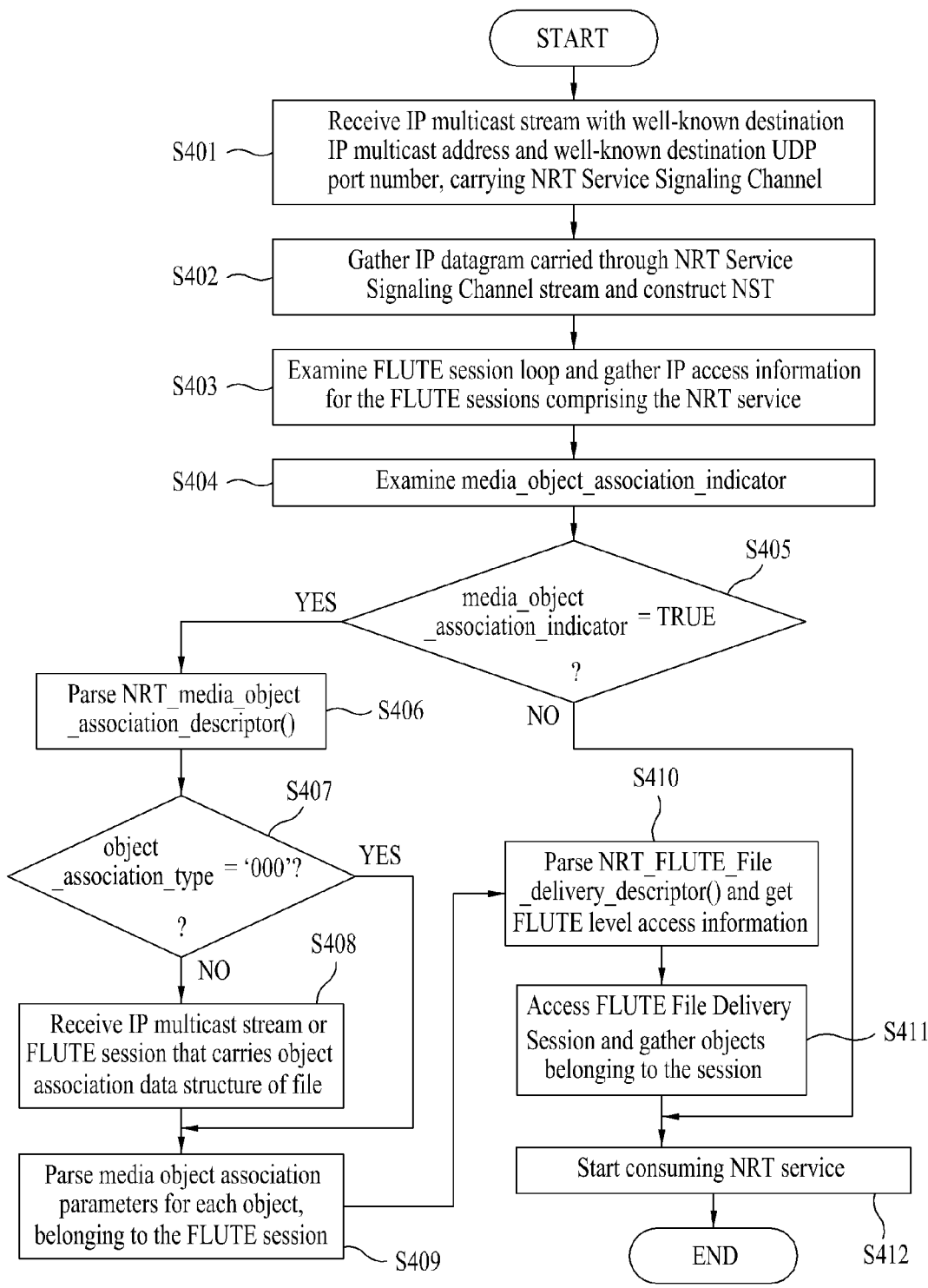
FIG. 21 is a flow chart illustrating an embodiment of a procedure for receiving an NRT service according to the present invention.

FIG. 21 is a flow chart illustrating an embodiment of a procedure in which an NST as shown in FIG. 9 is obtained from the restored IP datagram in FIG. 20 and an NRT service is received based on the obtained NST.

An IP multicast stream, which has a well-known destination IP multicast address and a well-known destination UDP port number and carries an NRT service signaling channel, is received through the procedure of FIG. 20 (S401).

Then, IP datagrams carried through the IP multicast stream are collected to construct an NST (S402). That is, an NST is identified from NRT service signaling data included in the IP datagrams using a table identifier. Steps S401 and S402 are performed at an IP datagram handler and a UDP datagram handler.

By parsing the NST, it is possible to extract signaling information required for rendering the NRT service and access information of a FLUTE session carrying content/files that constitute the NRT service. For example, information necessary for rendering content/files of the NRT service carried in each FLUTE session can be extracted from the NST. Necessary information for rendering of the content/files of the NRT service may be container information, encoding information, or a media object decoding parameter.

That is, IP access information of a FLUTE session carrying the content/files that constitute the NRT service is obtained from the FLUTE session loop of the NST (S403).

Then, a media_object_association_indicator field in the FLUTE session loop is checked (S404) to determine whether or not the media_object_association_indicator field is true (i.e., "1") (S405). If the media_object_association_indicator field indicates true, an NRT_media_object_association_descriptor( ) received as one FLUTE_session_level_descriptor of the NST is parsed (S406). That is, if the media_object_association_indicator field value is true, media object association information associated with the FLUTE session is signaled directly in text format in the NRT_media_object_association_descriptor( ) or provided in a stream or file format. In the case where the media object association information is transmitted in a stream or file format, the NRT_media_object_association_descriptor( ) provides access information used to receive the stream or file. In the case where the media object association information is transmitted in a file format, the NRT_media_object_association_descriptor( ) signals parameters required to receive a FLUTE session that carries the file.

Accordingly, whether or not the object_association_type field value of the NRT_media_object_association_descriptor( ) parsed at step S406 is '000' is determined in order to identify whether the media object association information is transmitted through a descriptor, a stream, or a file (S407).

If the object_association_type field value is '000', container information, encoding information, or a media object decoding parameter, which are necessary for rendering the content/files of the NRT service, are obtained from the NRT_media_object_association_descriptor( ) (S409).

If the object_association_type field value is '001' or '010', IP access information is obtained from the NRT_media_object_association_descriptor( ) to receive an IP multicast stream carrying the media object association information or to receive a FLUTE session carrying an object association data structure of the file (S408). Then, container information, encoding information, or a media object decoding parameter, which are necessary for rendering the content/files of the NRT service, are obtained from the received IP multicast stream or FLUTE session (S409).

When step S409 has been performed or when the media_object_association_indicator field value indicates "false" at step S405, an NRT_FLUTE_File_delivery_descriptor( ) received as a FLUTE_session_level_descriptor of the NST is parsed to obtain FLUTE level access information (S410). Then, the FLUTE level access information obtained at step S410 is used to access the FLUTE file delivery session to collect files belonging to the session (S411). The files are collected to construct one NRT service and the NRT service is stored in a storage medium or displayed on a display (S412). The above steps S403-S407, S409, and S410 are performed at the service signaling section handler, and the above step S408 is performed at the IP datagram handler, the UDP datagram handler, and the ALC/LCT stream handler. The above step S411 is performed at the ALC/LCT stream handler.

In the case where no object_association_type field is allocated to the NST as in FIGS. 14 and 15, the above steps S404 and S405 are omitted.

At least container information, encoding information, or a media object decoding parameter, which are necessary for rendering the content/files of the NRT service according to the present invention, are signaled in the corresponding NST for each FLUTE session or each component.

The NRT service signaling data transmitted through the NRT service signaling channel according to the present invention may further include an NRT Content Table (NCT). In an embodiment, the NCT is used for signaling/announcing NRT content signaled through the NST. Here, the NST included in the NRT service signaling data is identified through the table identifier since IP datagrams of the NRT service signaling channel have the same well-known IP address and the same well-known UDP port number. Similarly, whether one NCT includes one section or a plurality of sections can be determined through a table_id field, a section_number field, a last_section_number field, or the like in the NCT section. A corresponding table can be completed by collecting sections having the same table identifier after removing IP headers and UDP headers of IP datagrams of the NRT service signaling channel. For example, the NCT can be completed by collecting sections having the table identifier allocated to the NCT.

FIG. 22 illustrates an embodiment of a bit stream syntax structure of an NCT section according to the present invention. The following is a detailed description of each field of the NCT section.

In FIG. 22, a table_id field (8 bits) is a table identifier and an identifier that identifies an NCT can be set in this field.

A section_syntax_indicator field (1 bit) is an indicator that defines the section type (or format) of the NCT.

A private_indicator field (1 bit) indicates whether or not the NCT complies with the private section.

A section_length field (12 bits) indicates the section length of the NST.

An NRT_service_id field (16 bits) indicates a value that uniquely identifies an NRT service including content described in the NCT.

A version_number field (5 bits) indicates the version number of the NCT.

A current_next_indicator field (1 bit) indicates whether information included in the corresponding NCT section is applicable currently or in the future.

A section_number field (8 bits) indicates a current section number of the NCT section.

A last_section_number field (8 bits) indicates a last section number of the NCT.

A protocol_version field (8 bits) indicates a protocol version for allowing an NCT that transmits parameters having a different structure from those defined in the current protocol. (That is, this is an 8-bit unsigned integer field whose function is to allow, in the future, this NRT content Table to carry parameters that may be structured differently than those defined in the current protocol. At present, the value for the protocol_version shall be zero. Non-zero values of protocol_version may be used by a future version of this standard to indicate structurally different tables.)

A num_contents_in_section field (8 bits) indicates the number of contents described in the NCT. Herein, the number of contents is the number of contents or files transmitted through a virtual channel specified by the source_id.

Thereafter, a 'for' loop, which will also be referred to as a "content loop", is executed the same number of times as a number corresponding to the num_contents_in_section field value to provide detailed information about each content.

A content_version field (32 bits) indicates the version number of a content or file having a specific content_id value. Here, let us assume that a content having a content_id value of 0x0010 has been received by a receiver that has previously received and stored a content having the same content_id value of 0x0010. In this case, if the content_version field value is changed, a content newly announced through the NCT is received and the previously stored content is updated or replaced using the received content. Although the content_version field value indicates a serial number representing this release version in this embodiment, it may also directly express the published (or released) time. Here, a new field that can express the published (or released) time can be used when it is difficult to represent the published time using the content_version field.

A content_id field (16 bits) indicates an identifier that can uniquely identify the content (or file).

A content_available_start_time field (32 bits) and a content_available_end_time field (32 bits) indicate the start and end times of the FLUTE session that carries the content.

A content_length_in_seconds field (30 bits) indicates the actual playback time of the corresponding content in seconds in the case where the content (or file) is an A/V file.

A content_size field (48 bits) indicates the length of the content (or file) in bytes.

A content_delivery_bit_rate field (32 bits) indicates a target transfer rate (i.e., bit rate) of the content (or file) and specifically indicates the target bit rate. That is, when a service provider or broadcast station transmits a content, this field is used to indicate a bandwidth which is to be allocated to the content. Accordingly, the receiver can determine the minimum time required to receive the corresponding content or file using the content_size and content_delivery_bit_rate fields. That is, the receiver can estimate the time required to receive the content and provide the time information to the user. The minimum time required to receive the content is obtained by calculating "(conent_size*8)/(content_delivery_bit_rate)" and is represented in seconds.

A content_title_length field (8 bits) indicates the length of the content_title_text ( ) in bytes. Using this field, the receiver can accurately determine the number of bytes of data which it needs to read in order to obtain the content_title_text ( ) information.

A content_title_text ( ) field indicates a content title in the format of a multiple string structure.

That is, the receiver can obtain configuration information of the NRT content/file(s) using the NCT and can provide a guide for the NRT content/file(s) based on the obtained configuration information. Then, the receiver can obtain, from the NST, access information of a FLUTE session that carries content/file(s) selected from the guide and can receive the selected content using the obtained FLUTE session access information.

On the other hand, in the present invention, container information, encoding information, or a media object decoding parameter, which are necessary for rendering the content/files of the NRT service, can be transmitted within the NCT (i.e., transmitted while being included in the NCT). Accordingly, for each contents, the reception system can extract container information, encoding information, or a media object decoding parameter, which are necessary for rendering the content, and use the extracted information to perform rendering of the content.

Figure 23:
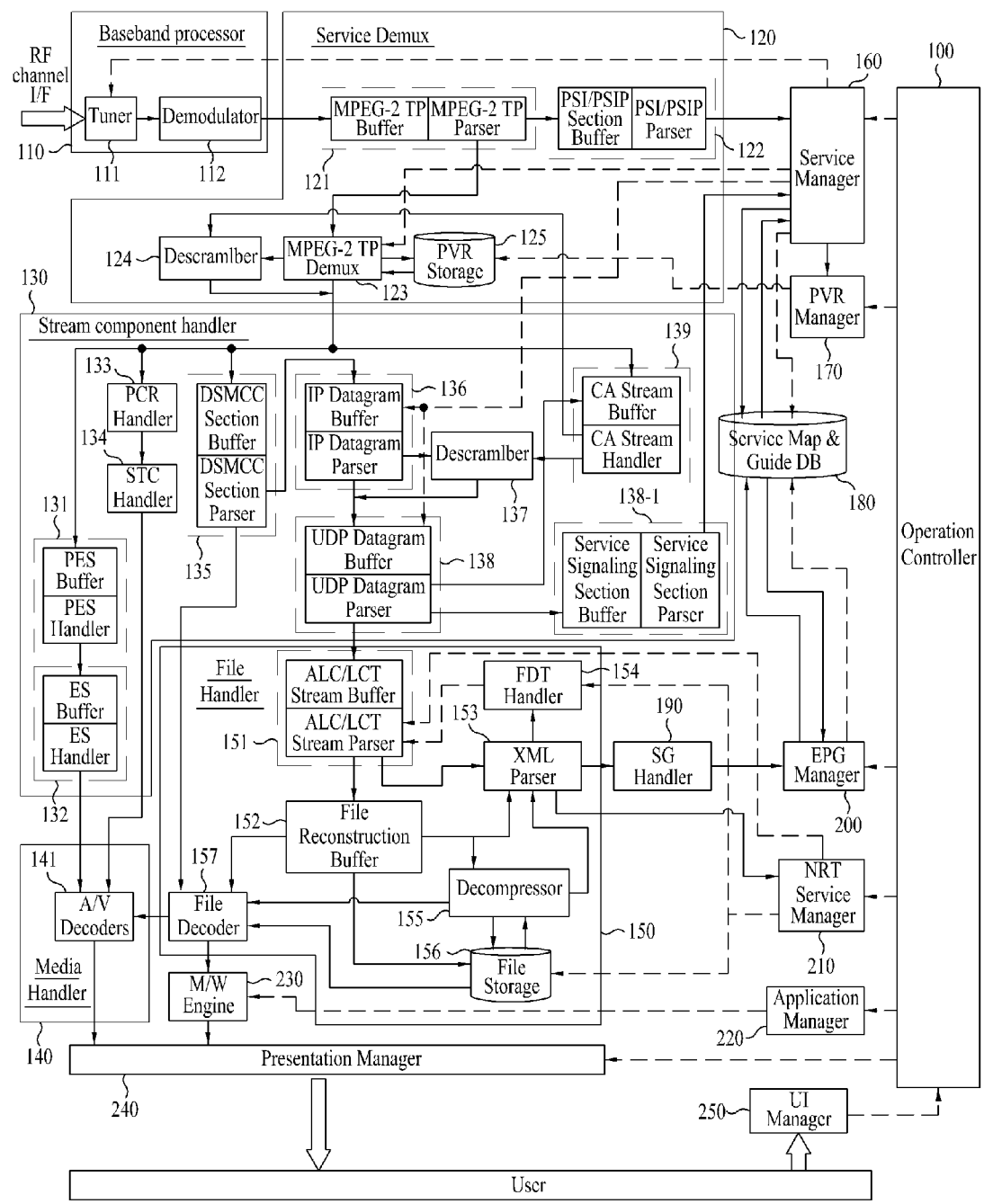
FIG. 23 is a block diagram illustrating an embodiment of a reception system that provides a fixed NRT service according to the present invention.

FIG. 23 illustrates an embodiment of a reception system that can receive, store, and present NRT content for a fixed NRT service.

The reception system of FIG. 23 may include an operation controller 100, a baseband processor 110, a service demultiplexer 120, a stream component handler 130, a media handler 140, a file handler 150, a service manager 160, a PVR manager 170, a first storage unit 180, an SG handler 190, an EPG handler 200, an NRT service manager 210, an application manager 220, a middleware engine 230, a presentation manager 240, and a User Interface (UI) manager 250.

The baseband processor 110 may include a tuner 111 and a demodulator 112. The service demultiplexer 120 may include an MPEG-2 TP handler 121, a PSI/PSIP handler 122, an MPEG-2 TP demultiplexer 123, a descrambler 124, and a second storage unit 125.

The stream component handler 130 may include a Packetized Elementary Stream (PES) decoder 131, an Elementary Stream (ES) decoder 132, a PCR handler 133, an STC handler 134, a DSM-CC addressable section handler 135, an IP datagram handler 136, a descrambler 137, a UDP handler 138, a service signaling section handler 138-1, and a Conditional Access System (CAS) 139.

The media handler 140 may include an A/V decoder 141. The file handler 150 may include an ALC/LCT stream handler 151, a file reconstruction buffer 152, an XML parser 153, an FDT handler 154, a decompressor 155, and a third storage unit 156, and a file decoder 157.

In the broadcast reception device configured as described above with reference to FIG. 23, the tuner 111 tunes to a broadcast signal of a desired channel among broadcast signals received through, for example, a terrestrial wave under control of the service manager 160 and down-converts the tuned signal into an Intermediate Frequency (IF) signal and outputs the IF signal to the demodulator 112. The tuner 111 can receive a real-time stream and a non-real-time stream. In the present invention, the non-real-time stream is referred to as an "NRT stream".

The demodulator 112 performs automatic gain control, carrier reconstruction, timing reconstruction, and the like on a digital IF signal in a passband received from the tuner 111 to convert the digital IF signal into a baseband signal and performs channel equalization on the baseband signal. For example, in the case where the broadcast signal is a VSB modulation signal, the demodulator 112 performs a VSB demodulation procedure to perform automatic gain control, carrier reconstruction, timing reconstruction, and the like. The data that has been demodulated and channel-equalized by the demodulator 112 is output in an MPEG-2 Transport Stream (TS) packet format to the MPEG-2 TP handler 121.

The MPEG-2 TP (Transport Stream Packet) handler 121 includes an MPEG-2 TP buffer and an MPEG-2 TP parser and temporarily stores the output of the demodulator 112 and then analyzes a TS header and outputs the output of the demodulator 112 to the demultiplexer 123 if the output of the demodulator 112 is an RT A/V TS packet or an NRT TS packet and outputs the output of the demodulator 112 to the PSI/PSIP handler 122 if the output of the demodulator 112 is a TS packet for a PSI/PSIP table.

The PSI/PSIP handler 122 includes a PSI/PSIP section buffer and a PSI/PSIP parser. The PSI/PSIP handler 122 temporarily stores the TS packet output from the MPEG-2 TP handler 121 and restores and parses a corresponding table from PSI/PSIP section data included in a payload in the TS packet with reference to the table identifier or the like. Herein, whether one table includes one section or a plurality of sections can be determined through a table_id field, a section_number field, a last_section_number field, or the like in the corresponding section. Then, the corresponding table can be completed by collecting sections having the same table identifier. For example, a VCT can be completed by collecting sections having a table identifier allocated to the VCT. Then, information of each parsed table is collected by the service manager 160 and is then stored in the first storage unit 180. Information of tables such as a VCT, a PAT, a PMT, and a DST according to the present invention is stored in the first storage unit 180 via the above procedure. The service manager 160 stores the table information in a service map and guide data format in the first storage unit 180.

If the received TS packet is an RT A/V TS packet, the demultiplexer 123 separates the TS packet into an audio TS packet and a video TS packet and outputs the packets to the PES decoder 131. If the received TS packet is an NRT TS packet, the demultiplexer 123 outputs the TS packet to the DSM-CC handler 135. If the received TS packet is a TS packet including a Program Clock Reference (PCR), the demultiplexer 123 outputs the TS packet to the PCR handler 133, and, if the received TS packet is a TS packet including Conditional Access (CA) information, the demultiplexer 123 outputs the TS packet to the CAS 139. The NRT TS packet is classified into a TS packet including NRT service data and a TS packet including an NRT service signaling channel. A unique PID for identifying the NRT service is allocated to the TS packet including NRT service data. On the other hand, a PID of the TS packet including an NRT service signaling channel is extracted using the DST and the PMT.

If the payload of the received TS packet has been scrambled, the demultiplexer 123 outputs the TS packet to the descrambler 124 and receives information required for descrambling (for example, a control word used for scrambling) from the CAS 139 and performs descrambling on the TS packet.

The demultiplexer 123 stores an RT A/V packet, which is received at one of the requests "temporary recording", "programmed recording", and "time shift", in the second storage unit 125. The second storage unit 125 is a large-capacity storage medium and may include, for example, an HDD. Downloading (storage) to and uploading (read or reproduction) from the second storage unit 125 are performed under control of the PVR manager 170.

At a reproduction request, the demultiplexer 123 separates an A/V TS packet uploaded from the second storage unit 125 into an audio TS packet and a video TS packet and outputs the TS packets to the PES decoder 131.

The demultiplexer 123 performs the above operations under control of the service manager 160 and/or the PVR (Personal Video Recorder) manager 170.

That is, if the service_type field value in the VCT indicates that an NRT service is carried, the service manager 160 extracts and stores identification information of each NRT service from an NRT service descriptor (NRT_service_descriptor( )) as shown in FIG. 7 received within the virtual channel loop of the VCT and extracts a PID of a DST from the service location descriptor (or the ES loop of the PMT) of the VCT and receives the DST.

Then, the service manager 160 identifies an NRT service from the received DST and extracts the PID of an MPEG-2 TS packet including the NRT service signaling channel using the DST and the PMT in order to receive the identified NRT service. The extracted PID is output to the demultiplexer 123. The demultiplexer 123 outputs MPEG-2 TS packets corresponding to the PID output from the service manager 160 to the addressable section handler 135.

The PCR is a time reference value that the A/V decoder 141 uses for audio ES and video ES time synchronization. The PCR handler 133 restores a PCR included in the payload of the received TS packet and outputs the PCR to the STC handler 134. The STC handler 134 restores a System Time Clock (STC), which is a reference clock of the system, from the PCR and outputs the STC to the A/V decoder 141.

The PES decoder 131 includes a PES buffer and a PES handler. The PES decoder 131 temporarily stores an audio TS packet and a video TS packet and then removes a TS header from each TS packet to restore an audio PES and a video PES. The restored audio PES and video PES are output to the ES decoder 132. The ES decoder 132 includes an ES buffer and an ES handler. The ES decoder 132 removes a PES header from each of the audio PES and the video PES and restores audio and video ESs which are pure data. The restored audio ES and video ES are output to the A/V decoder 141.

The A/V decoder 141 decodes the audio ES and the video ES using respective decoding algorithms to restore corresponding data prior to compression and then outputs the restored data to the presentation manager 240. Here, time synchronization is performed during decoding of the audio ES and the video ES according to the STC. For example, the audio decoding algorithm may use at least one of an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, a BSAC decoding algorithm, and the video decoding algorithm may use at least one of an MPEG 2 video decoding algorithm, an MPEG 4 video decoding algorithm, an H.264 decoding algorithm, an SVC decoding algorithm, and a VC-1 decoding algorithm.

The CAS 139 includes a CA stream buffer and a CA stream handler. The CAS 139 temporarily stores the restored service protection data output from the CAS 139 or the TS packet output from the MPEG-2 TP handler 121 and then restores information required for descrambling (for example, a control word used for scrambling) from the stored TS packet or service protection data. That is, the CAS 139 extracts an Entitlement Management Message (EMM), Entitlement Control Message (ECM), and the like included in the payload of the TS packet and analyzes the extracted EMM and ECM to obtain information required for descrambling. The ECM may include a control word (CW) used for scrambling. Here, the control word may have been encrypted with an authentication key. The EMM may include an authentication key and certificate information of the corresponding data. The information required for descrambling obtained by the CAS 139 is output to the descramblers 124 and 137.

The DSM-CC section handler 135 includes a DSM-CC section buffer and a DSM-CC section parser. The DSM-CC section handler 135 temporarily stores the TS packet output from the demultiplexer 123 and restores an addressable section included in the payload of the TS packet and removes the header and CRC checksum of the addressable section to restore an IP datagram and outputs the IP datagram to the IP datagram handler 136. The IP datagram handler 136 includes an IP datagram buffer and an IP datagram parser. The IP datagram handler 136 buffers the IP datagram received from the DSM-CC section handler 135 and extracts and analyzes a header of the buffered IP datagram and restores a UDP datagram from the payload of the IP datagram and outputs the UDP datagram to the UDP datagram handler 138.

More specifically, when the IP datagram has been scrambled, the scrambled UDP datagram is descrambled by the descrambler 137 and the descrambled datagram is output to the UDP datagram handler 138. For example, the descrambler 137 receives information required for descrambling (for example, a control word used for scrambling) from the CAS 139 and performs descrambling upon the UDP datagram and then outputs the descrambled datagram to the UDP datagram handler 138.

The UDP datagram handler 138 includes a UDP datagram buffer and a UDP datagram parser. The UDP datagram handler 138 buffers the UDP datagram output from the IP datagram handler 136 or the descrambler 137 and extracts and analyzes a header of the buffered UDP datagram and restores data included in a payload of the UDP datagram. Here, the UDP datagram handler 138 outputs the restored data to the CAS 139 if the restored data is service protection data, outputs the restored data to the service signaling section handler 138-1 if the restored data is NRT service signaling data, and outputs the restored data to the ALC/LCT stream handler 151 if the restored data is NRT service data.

In an embodiment, access information of the IP datagram that carries the NRT service signaling channel includes a well-known destination IP address and a well-known destination UDP port number.

Accordingly, the IP datagram handler 136 and the UDP datagram handler 138 extract an IP multicast stream (i.e., NRT service signaling data), which has a well-known destination IP multicast address and a well-known destination UDP port number and carries an NRT service signaling channel, and outputs the extracted IP multicast stream to the service signaling section handler 138-1.

The service signaling section handler 138-1 includes a service signaling section buffer and a service signaling section parser. The service signaling section handler 138-1 restores and pareses an NST as shown in FIG. 9, FIG. 14, or FIG. 15 from the NRT service signaling data and outputs the NST to the service manager 160. By parsing the NST, it is possible to extract, from the NST, signaling information required to perform rendering of the NRT service and access information of a FLUTE session that carries the content/files of the NRT service. For example, it is possible to extract information necessary for rendering the content/files of an NRT service that is transmitted through each FLUTE session from the NST. The information necessary for rendering the content/files of the NRT service may be container information, encoding information, or a media object decoding parameter.

The information parsed from the NST is collected by the service manager 160 and the collected information is stored in the first storage unit 180. The service manager 160 stores the information extracted from the NST in a service map and guide data format in the first storage unit 180. In another embodiment, the function of the service manager 160 may be performed by the NRT service manager 210. That is, the information parsed from the NST may be collected by the NRT service manager 210 and the collected information may then be stored in the first storage unit 180.

The ALC/LCT stream handler 151 includes an ALC/LCT stream buffer and an ALC/LCT stream parser. The ALC/LCT stream handler 151 buffers data having an ALC/LCT structure output from the UDP datagram handler 138 and then analyzes a header and a header extension of an ALC/LCT session from the buffered data. If the result of analysis of the header and header extension of the ALC/LCT session is that data transmitted in the ALC/LCT session has an XML structure, the ALC/LCT stream handler 151 outputs the data to the XML parser 153. If the result of analysis is that the data transmitted in the ALC/LCT session has a file structure, the ALC/LCT stream handler 151 temporarily stores the data in the file reconstruction buffer 152 and then outputs the data to the file decoder 157 or stores the data in the third storage unit 156. If the data transmitted in the ALC/LCT session is data for an NRT service, the ALC/LCT stream handler 151 is controlled by the NRT service manager 210. Here, if the data transmitted in the ALC/LCT session has been compressed, the data is decompressed by the decompressor 155 and the decompressed data is output to at least one of the XML parser 153, the file decoder 157, and the third storage unit 156.

The XML parser 153 analyzes XML data transmitted through the ALC/LCT session and outputs the analyzed XML data to the FDT handler 154 if the analyzed data is data for a file-based service and outputs the analyzed XML data to the SG handler 190 if the analyzed data is service guide data.

The FDT handler 154 analyzes and processes the file description table of the FLUTE protocol through the ALC/LCT session. The FDT handler 154 is controlled by the NRT service manager 210 if the received file is a file for an NRT service.

The SG handler 190 collects and analyzes data for a service guide transmitted in an XML structure and outputs the data to the EPG manager 200.

The file decoder 157 decodes a file output from the file reconstruction buffer 152, a file output from the decompressor 155, or a file uploaded from the third storage unit 156 using a preset algorithm and outputs the decoded file to the middleware engine 230 or outputs the decoded file to the A/V decoder 141.

The middleware engine 230 analyzes and executes the data having a file structure (i.e., application). The middleware engine 230 may then output the application to an output device such as a screen or speaker through the presentation manager 240. In an embodiment, the middleware engine 230 is a Java-based middleware engine.

The EPG manager 200 receives service guide data from the SG handler 190 according to a user input and converts the received service guide data into a display format and outputs the data to the presentation manager 240. The application manager 220 performs overall management associated with processing of the application data received in a file format or the like.

The service manager 160 collects and analyzes NRT service signaling data transmitted through an NRT service signaling channel or PSI/PSIP table data and creates a service map and then stores the map in the first storage unit 125. The service manager 160 controls access information of an NRT service desired by the user and controls the tuner 111, the demodulator 112, the IP datagram handler 136, etc.

The operation controller 100 controls at least one of the service manager 160, the PVR manager 170, the EPG manager 200, the NRT service manager 210, the application manager 220, and the presentation manager 240 according to a user command received through the UI manager 250 and performs a function according to the user command.

The NRT service manager 210 performs overall management of the NRT service transmitted in a content/file(s) format through the FLUTE session in the IP layer.

The UI manager 250 transfers the user input to the operation controller 100 through a UI.

The presentation manager 240 provides at least one of the audio and video data output from the A/V decoder 141, the file data output from the middleware engine 230, and the service guide data output from the EPG manager 210 to the user through a speaker and/or screen.

On the other hand, one of the service signaling section handler 138-1, the service manager 160, and the NRT service manager 210 obtains IP access information associated with a FLUTE session that carries the content/files of the NRT service from the FLUTE session loop (or the component loop of the NST of FIGS. 14 and 15) of the NST of FIG. 9. In addition, when an NRT_media_object_association_descriptor( ) is received within the FLUTE session loop (or the component loop of the NST of FIGS. 14 and 15), media object association information associated with the FLUTE session is extracted from the NRT_media_object_association_descriptor( ). In an embodiment, the media object association information is provided in a MIME type text format. Here, the media object association information is directly described in text format in the NRT_media_object_association_descriptor( ) or is provided in text format within a stream or file. In the case where the media object association information is transmitted in a stream or file format, the NRT_media_object_association_descriptor( ) provides access information used to receive the stream or file. In addition, in the case where the media object association information is transmitted in a file format, the NRT_media_object_association_descriptor( ) signals parameters required to receive the FLUTE session that carries the file. The media object association information includes container information, encoding information, a media object decoding parameter, or the like that are necessary for rendering the content/files of the NRT service. In addition, FLUTE level access information is obtained from an NRT_FLUTE_File_delivery_descriptor( ) that is received within the FLUTE session loop of the NST of FIG. 9. FLUTE level access information is also obtained from a component_descriptor( ) that is received within the component loop of the NST of FIG. 14 or 15.

Then, the ALC/LCT stream handler 151 and the file decoder 157 access the FLUTE file delivery session using the obtained FLUTE level access information to collect files belonging to the session. The files are collected to construct one NRT service. This NRT service is stored in the third storage unit 156 or is output to the middleware engine 230 or the A/V decoder 141 to be displayed on the display.

The third storage unit 156 is a storage medium that stores files such as NRT service data and may be used while being shared with the second storage unit 125 and may also be used separately.

Mobile NRT Service

"Main service data" among the terms used in association with the mobile NRT service according to the present invention refers to data that can be received by a fixed (or stationary) reception system and may include Audio/Video (A/V). That is, the main service data may include High Definition (HD) or Standard Definition (SD) A/V data and may also include a variety of data for data broadcasting. In addition, the term "known data" refers to data that is already known through agreement between the transmitting and receiving sides.

"M/H (or MH)" among the terms used in the present invention are the initials of Mobile and Handheld and refers to a concept opposite to "fixed". In addition, M/H service data includes at least one of mobile service data and handheld service data. For ease of explanation, in the present invention, M/H service data is also referred to as "mobile service data". Here, the mobile service data may include not only M/H service data but also any service data associated with a mobile or portable service. Thus, the mobile service data is not limited to the M/H service data.

The mobile service data defined as described above may be data having information such as stock information or a program execution file and may also be A/V data. The mobile service data, which is service data for a portable or mobile terminal (or broadcast receiver), may be A/V data having a lower data rate and lower resolution than those of the main service data. For example, if an A/V codec used for a conventional main service is an MPEG-2 codec, a scheme such as MPEG-4 Advance Video Coding (AVC) or scalable Video Coding which has a higher image compression efficiency may be used for an A/V codec for a mobile service. In addition, any type of data can be transmitted as the mobile service data. For example, Transport Protocol Expert Group (TPEG) data for broadcasting traffic information in real time may be transmitted as mobile service data.

Data services using the mobile service data may include a weather service, a traffic service, an interactive quiz program, a real time survey of public opinion, an interactive education broadcast, a game service, an information provision service that provides drama information such as plot, characters, background music, and shoot location, an information provision service that provides sports information such as past game records and players' profiles and scores, and an information provision service that provides information of programs categorized by service, media, time, or subject and which provides product information while enabling the user to order corresponding products. However, the present invention is not limited to these services.

FIG. 24 illustrates an example of a protocol stack for providing a mobile NRT service. In the example of FIG. 24, an adaptation layer is provided between the IP layer and the physical layer to make it possible to transmit an IP datagram of signaling information and an IP datagram of mobile service data without using the MPEG-2 TS format.

Specifically, in the broadcast station, NRT content/files are packetized according to a file transfer protocol scheme and are again packetized according to an Asynchronous Layered Coding/Layered Coding Transport (ALC/LCT) scheme as shown in FIG. 24. The packetized ALC/LCT data is again packetized according to a UDP scheme and the packetized ALC/LCT/UDP data is again packetized into ALC/LCT/UDP/IP data according to an IP scheme. In the present invention, the packetized ALC/LCT/UDP/IP data is referred to as an "IP datagram" for ease of explanation. Here, OMA BCAST service guide information may also be constructed into an IP datagram via the same procedure as that of the NRT content/file(s).

In addition, NRT service signaling information required to receive the NRT content/files is transmitted through a service signaling channel. Here, the service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, the service signaling channel is multicast after being encapsulated in an IP datagram having a well-known IP destination address and a well-known destination UDP port number.

In the case of A/V streaming for a mobile service, an RTP header, a UDP header, and an IP header are sequentially added to construct one IP datagram.

In the adaptation layer, IP datagrams of the mobile service data, the NRT service signaling channel, and the NRT service are collected to generate an RS frame. An IP datagram of the OMA BCAST service guide may be included in the RS frame.

The column length (i.e., the number of rows) of the RS frame is determined to be 187 bytes and the row length thereof is N bytes where N may vary signaling information such as a transmission parameter (or TPC data).

The RS frame is modulated according to a preset transmission scheme (for example, a VSB transmission scheme) in the mobile physical layer and the modulated RS frame is then transmitted to the reception system.

Figure 25:
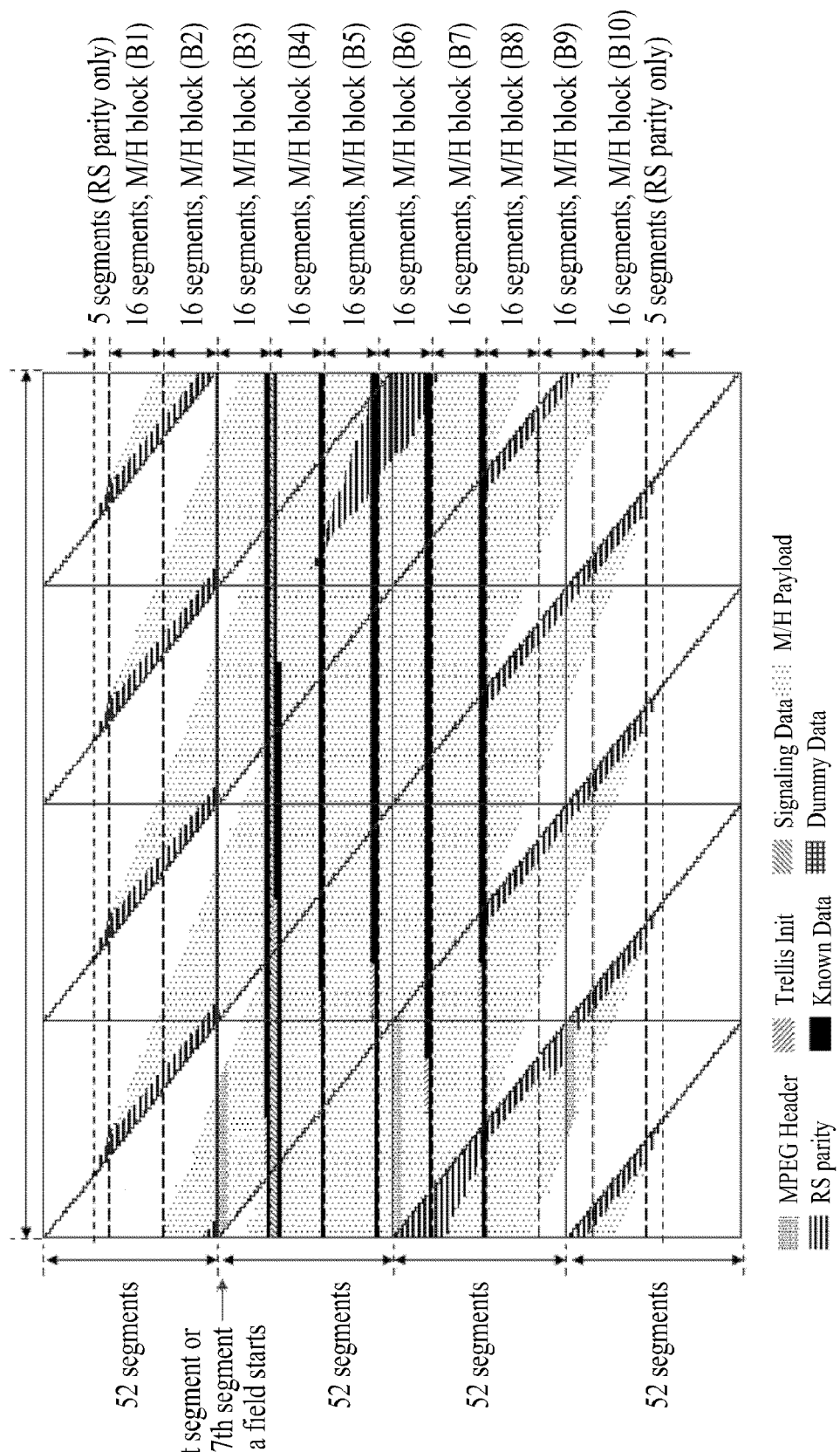
FIG. 25 illustrates an embodiment of a data group structure according to the present invention.

FIG. 25 illustrates an exemplary structure of a data group according to the present invention. FIG. 25 shows an example of dividing a data group according to the data structure of the present invention into 10 M/H blocks (i.e., M/H block 1 (B1) to M/H block 10 (B10)). In this example, each M/H block has the length of 16 segments. Referring to FIG. 25, only the RS parity data are allocated to portions of the 5 segments before the M/H block 1 (B1) and the 5 segments following the M/H block 10 (B10). The RS parity data are excluded in regions A to D of the data group. More specifically, when it is assumed that one data group is divided into regions A, B, C, and D, each M/H block may be included in any one of region A to region D depending upon the characteristic of each M/H block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

In the data group, the data included in a RS frame will be referred to as "mobile service data" for simplicity. The RS frame data (or the data of the RS frame) will be described in more detail in a later process.

Referring to FIG. 25, M/H block 4 (B4) to M/H block 7 (B7) correspond to regions without interference of the main service data. M/H block 4 (B4) to M/H block 7 (B7) within the data group shown in FIG. 25 correspond to a region where no interference from the main service data occurs. In this example, a long known data sequence is inserted at both the beginning and end of each M/H block. In the description of the present invention, the region including M/H block 4 (B4) to M/H block 7 (B7) will be referred to as "region A (=B4+B5+B6+B7)". As described above, when the data group includes region A having a long known data sequence inserted at both the beginning and end of each M/H block, the receiving system is capable of performing equalization by using the channel information that can be obtained from the known data. Therefore, the strongest equalizing performance may be yielded (or obtained) from one of region A to region D.

In the example of the data group shown in FIG. 25, M/H block 3 (B3) and M/H block 8 (B8) correspond to a region having little interference from the main service data. Herein, a long known data sequence is inserted in only one side of each M/H block B3 and B8. More specifically, due to the interference from the main service data, a long known data sequence is inserted at the end of M/H block 3 (B3), and another long known data sequence is inserted at the beginning of M/H block 8 (B8). In the present invention, the region including M/H block 3 (B3) and M/H block 8 (B8) will be referred to as "region B (=B3+B8)". As described above, when the data group includes region B having a long known data sequence inserted at only one side (beginning or end) of each M/H block, the receiving system is capable of performing equalization by using the channel information that can be obtained from the known data. Therefore, a stronger equalizing performance as compared to region C/D may be yielded (or obtained).

Referring to FIG. 25, M/H block 2 (B2) and M/H block 9 (B9) correspond to a region having more interference from the main service data as compared to region B. A long known data sequence cannot be inserted in any side of M/H block 2 (B2) and M/H block 9 (B9). Herein, the region including M/H block 2 (B2) and M/H block 9 (B9) will be referred to as "region C (=B2+B9)". Finally, in the example shown in FIG. 25, M/H block 1 (B1) and M/H block 10 (B10) correspond to a region having more interference from the main service data as compared to region C. Similarly, a long known data sequence cannot be inserted in any side of M/H block 1 (B1) and M/H block 10 (B10). Herein, the region including M/H block 1 (B1) and M/H block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the $1^{st}$ segment of the $4^{th}$ M/H block (B4) to a portion of the $2^{nd}$ segment. According to an embodiment of the present invention, the signaling information area for inserting signaling information may start from the $1^{st}$ segment of the $4^{th}$ M/H block (B4) to a portion of the $2^{nd}$ segment. More specifically, 276(=207+69) bytes of the $4^{th}$ M/H block (B4) in each data group are assigned as the signaling information area. In other words, the signaling information area consists of 207 bytes of the $1^{st}$ segment and the first 69 bytes of the $2^{nd}$ segment of the $4^{th}$ M/H block (B4). The $1^{st}$ segment of the $4^{th}$ M/H block (B4) corresponds to the $17^{th}$ or $173^{rd}$ segment of a VSB field.

Herein, the signaling data transmitted through the signaling information area may be identified by two different types of channel data: a transmission parameter channel (TPC) data and a fast information channel (FIC) data.

Also, the TPC data includes parameters that are mostly used in a physical layer module. And, since the TPC data are transmitted without being interleaved, the TPC data may be accessed by slot unit in the receiving system. The FIC data are provided in order to enable the receiving system to perform fast service acquisition. Herein, the FIC data include cross layer information between a physical layer and an upper layer. The FIC data are interleaved in sub-frame units and then transmitted.

For example, when the data group includes 6 known data sequences, as shown in FIG. 25, the signaling information area is located between the first known data sequence and the second known data sequence. More specifically, the first known data sequence is inserted in the last 2 segments of the $3^{rd}$ M/H block (B3), and the second known data sequence in inserted in the $2^{nd}$ and $3^{rd}$ segments of the $4^{th}$ M/H block (B4). Furthermore, the $3^{rd}$ to $6^{th}$ known data sequences are respectively inserted in the last 2 segments of each of the $4^{th}$, $5^{th}$, $6^{th}$, and $7^{th}$ M/H blocks (B4, B5, B6, and B7). The $1^{st}$ and $3^{rd}$ to $6^{th}$ known data sequences are spaced apart by 16 segments.

Figure 26:
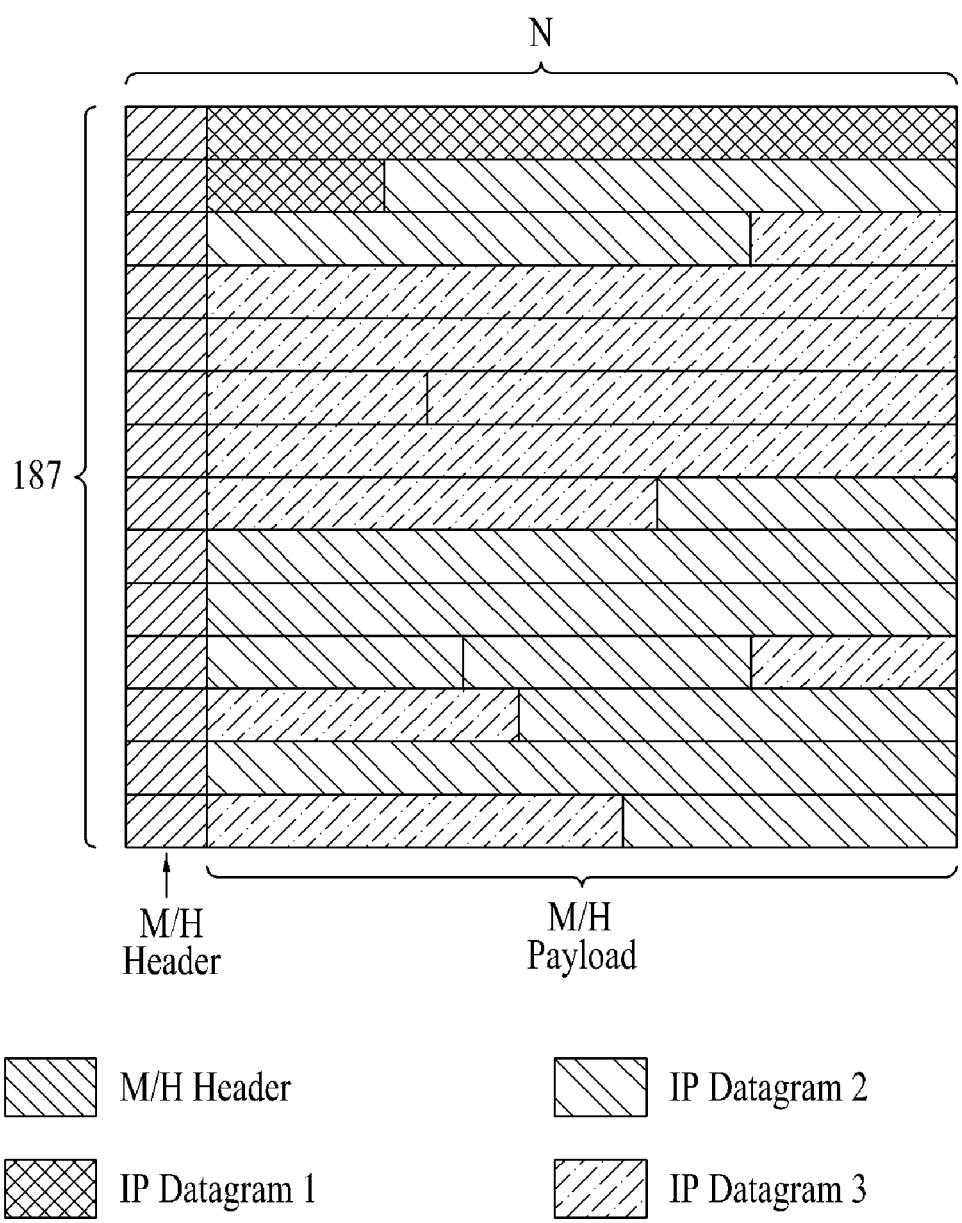
FIG. 26 illustrates a structure of an RS frame including a mobile NRT service according to an embodiment of the present invention.

FIG. 26 illustrates an RS frame according to an embodiment of the present invention.

The RS frame is received for each M/H frame in a condition where the receiving system is switched to a time-slicing mode.

The RS frame according to an embodiment of the present invention is configured of multiple M/H transport packets (TPs). Each M/H TP consists of a 2-byte M/H header and a (N−2)-byte M/H payload. The M/H payload may include at least one of an IP datagram of mobile service data, an IP datagram of an SMT, and an IP datagram of an SGDD.

More specifically, one RS frame includes an IP datagram of each mobile service data set. Also, an IP datagram of an SMT section is included in each of the RS frames. According to an embodiment of the present invention, the IP datagram of the SMT or the IP datagram of a service signaling channel transmitting the SMT comprises a well-known IP destination address and a well-known destination UDP port number. And, the IP datagram is included in the RS frame so as to be received.

Furthermore, an IP datagram of the SGDD may be included in the RS frame. According to an embodiment of the present invention, the access information of the SGDD or the access information of the service guide announcement channel transmitting the SGDD is signaled to the SMT. The access information of the service guide announcement channel includes service guide bootstrap information.

Three types of IP datagrams (IP datagram 1, IP datagram 2, and IP datagram 3) are included in the RS frame shown in FIG. 26, one of the three IP datagrams is designated for the SMT. The remaining IP datagrams may correspond to IP datagrams of mobile service data or IP datagrams designated for the SGDD. In the transmitting system, RS-encoding is performed on the RS frame in a column direction, and CRC-encoding is performed on the RS frame in a row direction. Then, the processed RS frame is allocated to the corresponding regions within multiple data groups, thereby being transmitted. In the description of the present invention, all of the data included in the RS frame will be referred to as mobile service data for simplicity.

Data Transmission Structure

Figure 27:
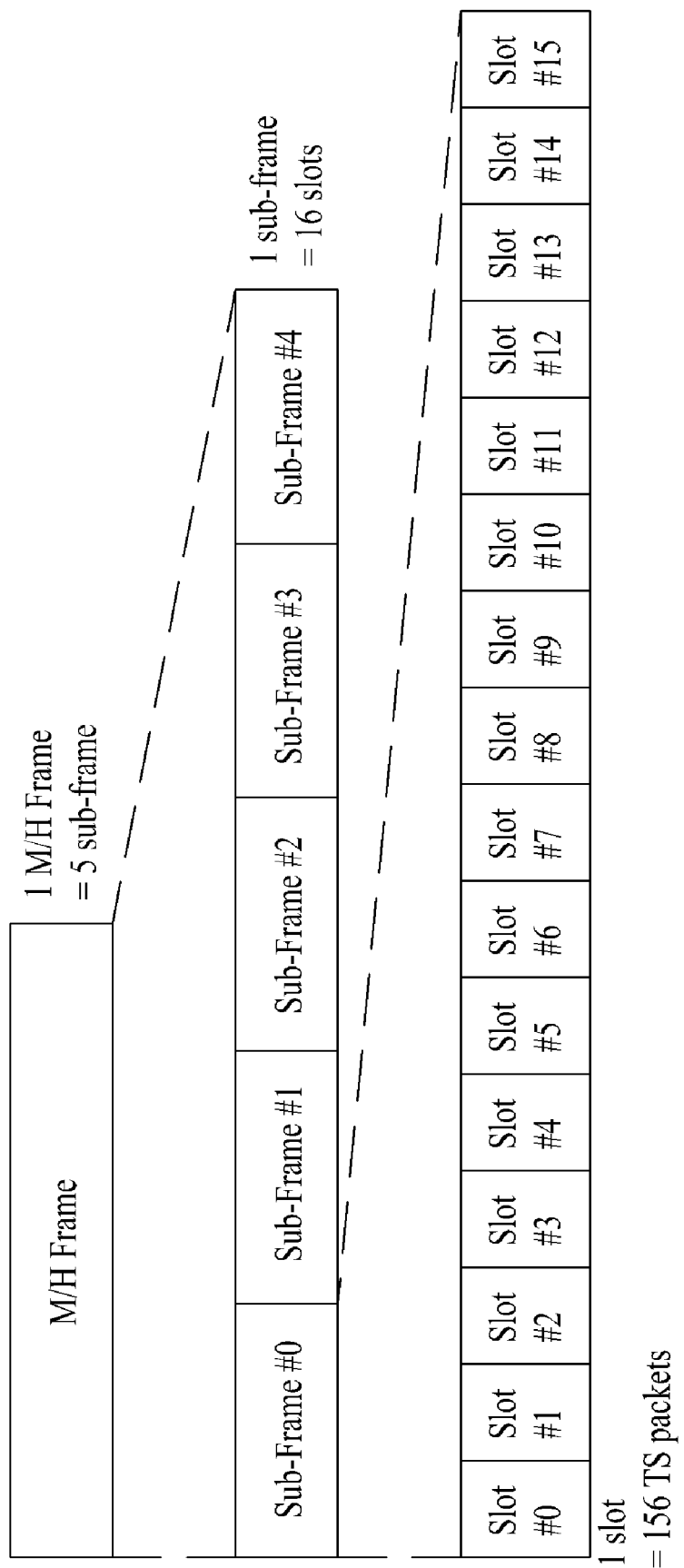
FIG. 27 illustrates an embodiment of an M/H frame structure for transmitting and receiving mobile service data according to the present invention.

FIG. 27 illustrates a structure of an M/H frame for transmitting and receiving mobile service data according to the present invention. In the example shown in FIG. 27, one M/H frame consists of 5 sub-frames, wherein each sub-frame includes 16 slots. In this case, the M/H frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

One VSB frame consists of 2 VSB fields (i.e., an odd field and an even field). Herein, each VSB field includes a field synchronization segment and 312 data segments. The slot corresponds to a basic time unit for multiplexing the mobile service data and the main service data.

Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets.

Meanwhile, the data within one RS frame may be assigned either to all of regions A/B/C/D within the corresponding data group, or to at least one of regions A/B/C/D. In the embodiment of the present invention, the data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the data within one RS frame are assigned either to all of regions A/B/C/D within the corresponding data group, one parade transmits one RS frame.

Conversely, when the data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the TPC data. Table 2 below shows an example of the RS frame mode.

TABLE 2

| RS frame mode (2 bits) | Description |
|---|---|
| 00 | There is only one primary RS frame for all group regions |
| 01 | There are two separate RS frames. Primary RS frame for group regions A and B Secondary RS frame for group regions C and D |
| 10 | Reserved |
| 11 | Reserved |

Table 2 illustrates an example of allocating 2 bits in order to indicate the RS frame mode. For example, referring to Table 2, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame.

Furthermore, the method of assigning parades may be identically applied to all M/H frames or differently applied to each M/H frame. According to the embodiment of the present invention, the parades may be assigned differently for each M/H frame and identically for all sub-frames within an M/H frame. More specifically, the M/H frame structure may vary by M/H frame units. Thus, an ensemble rate may be adjusted on a more frequent and flexible basis.

That is, the concept of an M/H ensemble is applied in the embodiment of the present invention, thereby defining a collection (or group) of services. Each M/H ensemble carries the same QoS and is coded with the same FEC code. Also, each M/H ensemble has the same unique identifier (i.e., ensemble ID) and corresponds to consecutive RS frames.

Figure 28:
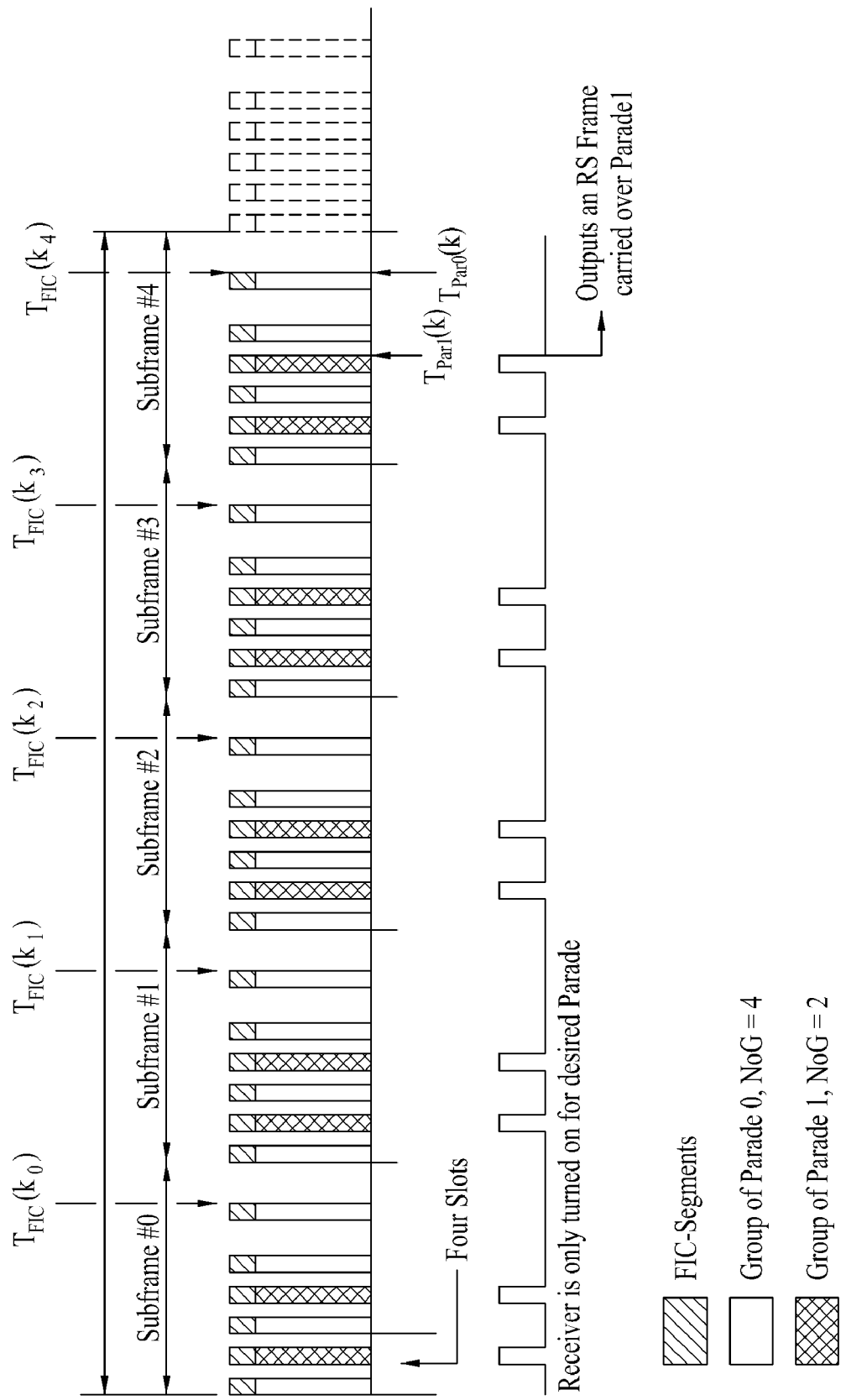
FIG. 28 illustrates a data transmission structure in a physical layer according to an embodiment of the present invention in an example where FIC data is included in each data group.

FIG. 28 illustrates a data transmission structure in a physical layer according to an embodiment of the present invention. More specifically, FIG. 28 shows an example of FIC data being included in each data group and transmitted. As described above, an M/H frame for approximately 0.968 seconds is divided into 5 sub-frames, wherein data groups corresponding to multiple ensembles exist in combination within each sub-frame. Also, the data groups corresponding to each ensemble are interleaved in M/H frame units, so as to configure an RS frame belonging to one ensemble. In FIG. 28, 2 ensembles (wherein NoG=4 and NoG=3) exist in each sub-frame. Furthermore, a predetermined portion (e.g., 37 bytes/data group) of each data group is used for the purpose of separately delivering encoded FIC data apart from the RS frame data channel. The FIC region assigned to each data group consists of one FIC segment. Herein, each of the FIC segments is interleaved in sub-frame units. For example, RS-encoding and SCCC encoding processes are applied to the RS frame data, and RS encoding and PCCC encoding processes are applied to the FIC data. Also, as well as the FIC data, the RS encoding and PCCC encoding processes are applied to the TPC data. More specifically, (187+P,187)-RS encoding process is applied to the RS frame data, (51,37)-RS encoding process is applied to the FIC data, and (18,10)-RS encoding process is applied to the TPC. Herein, P is the number of parity bytes.

Hierarchical Signaling Structure

Figure 29:
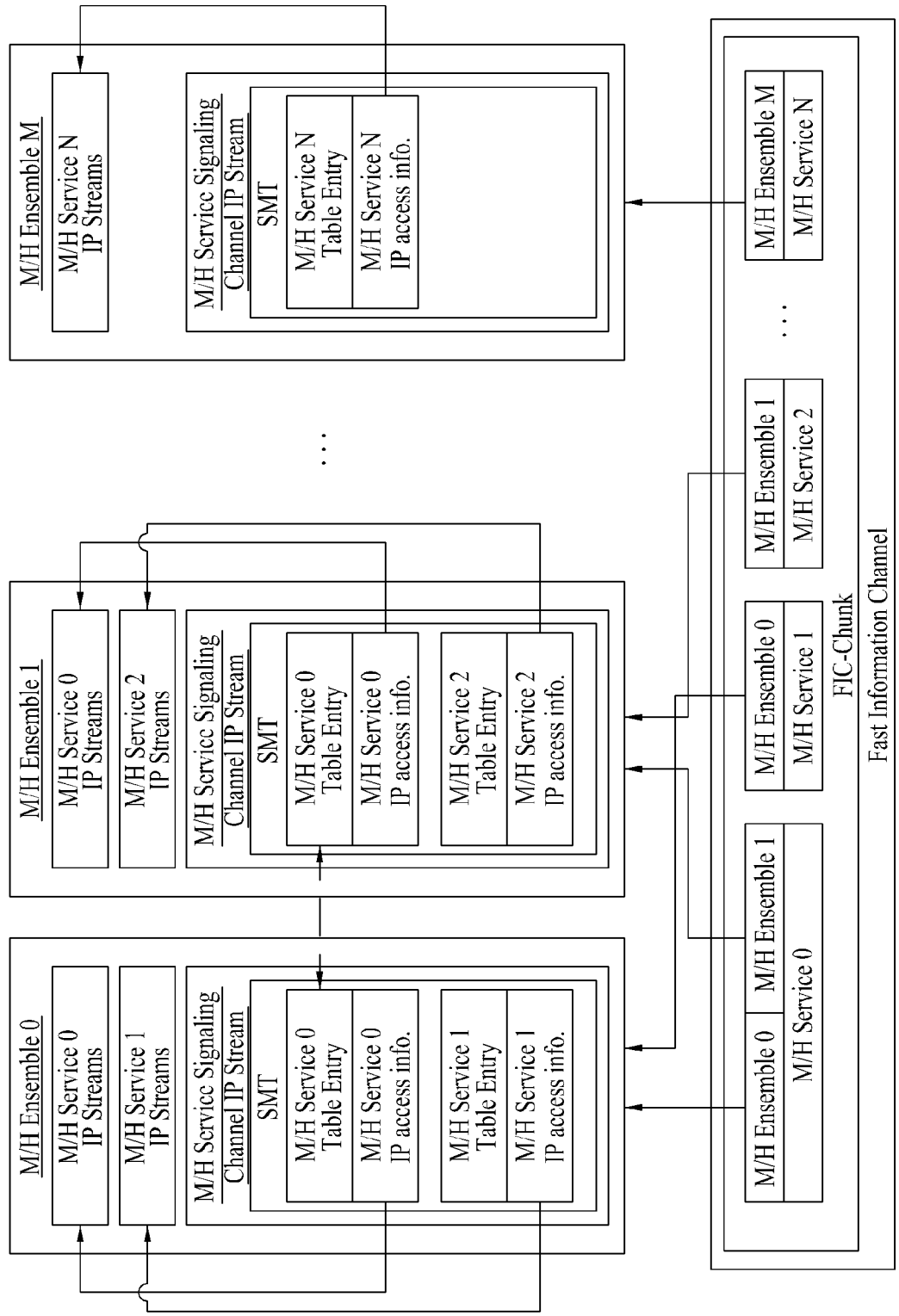
FIG. 29 illustrates a hierarchical signaling structure according to an embodiment of the present invention.

FIG. 29 illustrates a hierarchical signaling structure according to an embodiment of the present invention. As shown in FIG. 29, the mobile broadcasting technology according to the embodiment of the present invention adopts a signaling method using FIC and SMT (Service Map Table). In the description of the present invention, the signaling structure will be referred to as a hierarchical signaling structure. More specifically, FIG. 29 illustrates a hierarchical signaling structure that provides data required for service acquisition through an FIC chunk and a service map table (SMT), among IP-level mobile service signaling channels. As shown in FIG. 29, the FIC chunk uses its fast characteristic, so as to deliver a mapping relation between a service and an ensemble to the receiving system. More specifically, the FIC chunk quickly locates (or finds) an ensemble that can deliver a service requested by the receiving system, thereby providing the receiving system with signaling data that can enable the receiving system to swiftly receive RS frames of a respective ensemble.

FIG. 30 illustrates an embodiment of a bit stream syntax structure of an SMT section that provides signaling information of NRT service data that is transmitted within the RS frame of FIG. 26.

Herein, although the syntax is written in an MPEG-2 private section for better understanding, the syntax data may be in any other format.

The SMT describes IP access information and signaling information of a mobile service (or signaling information of an NRT service) in an ensemble in which the SMT is transmitted. The SMT also provides broadcast stream information of each service using a Transport_Stream_ID, which is an identifier of a broadcast stream to which the service belongs. Then, the SMT according to the embodiment of the present invention includes description information of each mobile service (or NRT service) in one ensemble and other additional information may be included in the descriptor region.

As shown in FIG. 30, the SMT section may be transmitted in an IP stream format within an RS frame. In this case, each RS frame decoder, which will be described later, decodes a received RT service and outputs the decoded RS frame to a corresponding RS frame handler. Each frame handler divides the received RT service into row units to create an M/H TP and outputs the M/H TP to an M/H TP handler.

On the other hand, the following are example fields that can be transmitted through the SMT.

A table_id field (8 bits) is a field for identifying the type of a table and it can be determined through this field that this table section is a table section in the SMT. (That is, this table_id field includes an 8-bit unsigned integer that indicates the type of a table section defined in a Service Map Table (SMT)).

A section_syntax_indicator field (1 bit) corresponds to an indicator defining the section format of the SMT. For example, the section_syntax_indicator field shall be set to '0' to always indicate that this table is derived from the "short" form of the MPEG-2 private section table format may correspond to MPEG long-form syntax. (That is, this 1-bit field shall be set to '0' to always indicate that this table is derived from the "short" form of the MPEG-2 private section table).

A private_indicator field (1 bit) indicates whether or not the SMT follows (or is in accordance with) a private section. (That is, this 1-bit field shall be set to '1').

A section_length field (12 bits) specifies the section length of the remaining SMT data bytes immediately following the section_length field. (That is, it specifies the number of remaining bytes this table section immediately following this field. The value in this field shall not exceed 4093 (0xFFD)).

A table_id_extension field (16 bits) corresponds to a table-dependent. Herein, the table_id_extension field corresponds to a logical portion of the table_id field providing the scope for the remaining fields. (That is, this is a 16-bit field and is table-dependent. It shall be considered to be logically part of the table_id field providing the scope for the remaining fields). The table_id_extension field includes an SMT_protocol_version field.

An SMT_protocol_version field (8 bits) indicates a protocol version for allowing the corresponding SMT to carry, in a future process, parameters that may be structure differently from those defined in the current protocol. (That is, the 8-bit unsigned integer field whose function is to allow, in the future, this SMT to carry parameters that may be structured differently than those defined in the current protocol. At present, the value for the SMT_protocol_version shall be zero. Non-zero values of SMT_protocol_version may be used by a future version of this standard to indicate structurally different tables).

An ensemble_id field (8 bits) indicates the ID values associated with the corresponding ensemble that can be assigned to the ensemble_id field may range from '0x00' and '0x3F'. It is preferable that the value of the ensemble_id field is derived from the TPC data of the parade_id field. When the corresponding ensemble is transmitted through a primary RS frame, the most significant bit (MSB) is set to '0', and the remaining 7 bits are used as the parade_id field value of the corresponding parade. Meanwhile, when the corresponding ensemble is transmitted through a primary RS frame, the most significant bit (MSB) is set to '1', and the remaining 7 bits are used as the parade_id field value of the corresponding parade.

A version_number field (5 bits) specifies the version number of the SMT.

A current_next_indicator field (1 bit) indicates whether or not the SMT section is currently applicable. (That is, the one-bit indicator, which when set to '1' shall indicate that the Service Map Table sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field (8 bits) specifies the number of the current SMT section. (That is, this 8-bit field shall give the section number of this NRT Service Signaling table section. The section number of the first section in an NRT Service Signaling table shall be 0x00. The section_number shall be incremented by 1 with each additional section in the NRT Service Signaling table).

A last_section_number field (8 bits) specifies the number of the last section configuring the corresponding SMT. (That is, this 8-bit field shall give the number of the last section (i.e., the section with the highest section_number) of the Service Signaling table of which this section is a part).

A num_services field (8 bits) indicates the number of services in the SMT section. (That is, this num_services field is an 8 bit field that specifies the number of services in this SMT section.) At least one mobile service alone may be received within (i.e., while being included in) the ensemble that includes the SMT and at least one NRT service alone may be received within the ensemble and both the mobile service and the NRT service may also be received within the ensemble. If NRT services alone are transmitted within the ensemble which includes the SMT, the num_services field may indicate the number of NRT services included in the SMT.

Thereafter, the 'for' loop, which is also referred to as a "service loop", is executed the same number of times as the number of services corresponding to the num_services field value to provide signaling information of a plurality of services. That is, signaling information of the corresponding service is indicated for each of the services included in the SMT section. The service may be a mobile service or may be NRT service. Here, it is possible to provide the following field information for each service.

A service_id field (16 bits) indicates a value that can uniquely identify the corresponding service. (That is, this field indicates a 16-bit unsigned integer that shall uniquely identify this NRT service within the scope of this SMT section.) The service_id field value of one service does not vary while the service is maintained. (That is, the service_id of a service shall not change throughout the life of the service.) Here, in order to avoid confusion, when a service is terminated, a service_id field value of the service may remain unused until a specific time elapses. (That is, to avoid confusion, it is recommended that if a service is terminated, then the service_id for the service should not be used for another service until a suitable interval of time elapses.) Here, if the service is an NRT service, the service_id field will identify the NRT service.

A Multi_ensemble_service field (2 bits) indicates whether or not the service is transmitted through more than one ensemble. This field also indicates whether or not the service can be represented by a part of the service that is transmitted through the ensemble. (That is, the multi_ensemble_service field is a two-bit enumerated field that shall identify whether the service is carried across more than one Ensemble. Also, this field shall identify whether or not the service can be rendered only with the portion of service carried through this Ensemble.).

A service_status field (2 bits) indicates the status of the service. Here, the MSB of the service_status field indicates whether the corresponding service is active (when it is '1') or inactive (when it is '0') and the LSB indicates whether the corresponding service is hidden (when it is '1') or not hidden (when it is '0'). When the service is an NRT service, the MSB of the service_status field indicates whether the NRT service is active (when it is '1') or inactive (when it is '0') and the LSB indicates whether the NRT service is hidden (when it is '1') or not hidden (when it is '0').

An SP_indicator field (1 bit) indicates whether or not service protection is applied to the corresponding service. If the SP_indicator field value is 1, service protection is applied to at least one of the components that are required to provide meaningful presentation of the corresponding service. (That is, the SP_indicator field is a 1-bit field that indicates, when set to 1, that service protection is applied to at least one of the components needed to provide a meaningful presentation of this NRT service.)

A short_service_name_length field (3 bits) indicates, in bytes, the length of a short service name that is described in the short_service_name field.

A short_service_name field indicates a short name of the service. (That is, the short_service_name field indicates the short name of the service, each character of which shall be encoded per UTF-8 [29]. When there is an odd number of bytes in the short name, the second byte of the last of the byte pair per the pair count indicated by the short_service_name_length field shall contain 0x00). For example, when the service is a mobile service, the short_service_name field indicates the short name of the mobile service, and, when the service is an NRT service, the short_service_name field indicates the short name of the NRT service.

A service_category field (6 bits) indicates the type category of the service as defined in the following Table 3. When the value of this field is set to a value indicating "informative only", the value of the field is handled as an informative description of the category of the service. Then, in order to identify the actual category of a received service, it is necessary for receivers to check the component_level_descriptors ( ) field of the SMT. They have an NTP time base component for services having video and/or audio components.

TABLE 3

| service_category | Meaning |
| --- | --- |
| 0x00 | The service category is not specified by the service_category field. Look in the component_level_descriptors( ) to identify the category of service. |
| 0x01 | Basic TV (Informative only) - Look in the component_level_descriptors( ) to identify the specific category of service. |
| 0x02 | Basic Radio (Informative only) - Look in the component_level_descriptors( ) to identify the specific category of service. |
| 0x03 | RI service - Rights Issuer service as defined in Part #6 [34] of this standard. |
| 0x04-0x07 | Not specified by the current version of this standard. |
| 0x08 | Service Guide - Service Guide (Announcement) as defined in Part #4 [x] of this standard. |
| 0x09-0x0C | Not specified by the current version of this standard. |
| 0x0E | NRT Service |
| 0x0F-0XFF | [Reserved for future ATSC use] |

Specifically, in association with the present invention, for example, when the service_category field has a value of '0x0E', this indicates that the service is an NRT service. In this case, it can be determined that signaling information of the service that is currently described in the SMT section is signaling information of an NRT service.

A num_components field (5 bits) indicates the number of IP stream components included in a corresponding service. (That is, this num_components field is a 5-bit field that specifies the number of IP stream components in this service).

An IP_version_flag field (1 bit) indicates that the source_IP_address field, the service_destination_IP_address field, and the component_destination_IP_address field are IPv4 addresses when this field is set to '0' and indicates that the source_IP_address field, the service_destination_IP_address field, and the component_destination_IP_address field are IPv6 addresses when this field is set to '1'. (That is, this IP_version_flag field is a 1-bit indicator that, when set to '0', shall indicate that the source_IP_address, service_destination_IP_address, and component_destination_IP_address fields are IPv4 addresses. The value of '1' for this field is reserved for possible future indication that the source_IP_address, service_destination_IP_address, and component_destination_IP_address fields are IPv6 addresses. Use of IPv6 addressing is not currently defined).

A source_IP_address_flag field (1 bit) indicates that a source IP address value for the corresponding service is present to indicate a source specific multicast when this flag field is set. (That is, this source_IP_address_flag field is a 1-bit Boolean flag that shall indicate, when set, that a source IP address value for this service is present to indicate a source specific multicast).

A service_destination_IP_address_flag field (1 bit) indicates that a service_destination_IP_address value is present to provide a default IP address for the components of the corresponding service when this flag field is set to '1'. (That is, this service_destination_IP_address_flag field is a 1-bit Boolean flag that indicates, when set to '1', that a service_destination IP address value is present to serve as the default IP address for the components of this service).

A source_IP_address field (32 bits or 128 bits) is required to be interpreted (or analyzed) when the source_IP_address_flag is set to '1'. However, when the source_IP_address_flag is set to '0', the source_IP_address field is not required to be interpreted (or analyzed). When the source_IP_address_flag is set to '1', and when the IP_version_flag field is set to '0', the corresponding field indicates that the source_IP_address field indicates a 32-bit IPv4 address specifying the corresponding mobile service source. Alternatively, if the IP_version_flag field is set to '1', the source_IP_address field indicates a 32-bit IPv6 address specifying the corresponding mobile service source. (That is, this source_IP_address field shall be present if the source_IP_address_flag is set to '1' and shall not be present if the source_IP_address_flag is set to '0'. If present, this field shall contain the source IP address of all the IP datagrams carrying the components of this NRT service. The conditional use of the 128 bit-long address version of this field is to facilitate possible use of IPv6 in the future, although use of IPv6 is not currently defined)

If the service is an NRT service, the Source_IP_address field is a source IP address of the same server that transmits all channels of the FLUTE session.

In a service_destination_IP_address field (32 bits or 128 bits), when the service_destination_IP_address_flag field is set to '1', the service_destination_IP_address_flag is required to be interpreted (or analyzed). However, when the service_destination_IP_address_flag is set to '0', the service_destination_IP_address_flag is not required to be interpreted (or analyzed). Herein, if the service_destination_IP_address_flag is set to '1', and if the IP_version_flag field is set to '0', the service_destination_IP_address field indicates a 32-bit destination IPv4 address for the corresponding mobile service. Alternatively, if the service_destination_IP_address_flag is set to '1', and if the IP_version_flag field is set to '1', the service_destination_IP_address field indicates a 64-bit destination IPv6 address for the corresponding mobile service. In case the corresponding service_destination_IP_address field cannot be interpreted, the component_destination_IP_address field within the num_components loop shall be interpreted. And, in this case, the receiving system shall use the component_destination_IP_address in order to access the IP stream component. (That is, this service_destination_IP_address field shall be present if the service_destination_IP_address_flag is set to '1' and shall not be present if the service_destination_IP_address_flag is set to '0'. If this service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined)

In the case where the service is an NRT service, the service_destination_IP_Address field is signaled if a destination IP address of the session level of the FLUTE session is present.

On the other hand, the SMT according to this embodiment provides information of a plurality of components using the 'for' loop.

Thereafter, the 'for' loop, which is also referred to as a "component loop", is executed the same number of times as the number of components corresponding to the num_components field value to provide access information of a plurality of components. That is, access information of each of the components included in the NRT service is provided. In this case, it is possible to provide the following field information for each component. Here, in an embodiment, one component corresponds to one FLUTE session.

An essential_component_indicator field (1 bit) indicates that the corresponding component is an essential component for the mobile service if this field value is set to '1'. Otherwise, this field indicates that the corresponding component is optional. (That is, this essential_component_indicator field is a one-bit indicator which, when set to '1', shall indicate that this component is an essential component for the service. Otherwise, this field indicates that this component is an optional component).

A component_destination_IP_address_flag field (1 bit) is a flag that indicates that a component_destination_IP_address field is present for the corresponding component if the flag is set to '1'. (That is, this component_destination_IP_address_flag is a 1-bit Boolean flag that shall indicate, when set to '1', that the component_destination_IP_address is present for this component).

A port_num_count field (6 bits) indicates the number of UDP ports associated with the corresponding UDP/IP stream component. The destination UDP port number value starts from the component_destination_UDP_port_num field value and increments by 1. (That is, this field shall indicate the number of destination UDP ports associated with this UDP/IP stream component. The values of the destination UDP port numbers shall start from the component_destination_UDP_port_num field and shall be incremented by one, except in the case of RTP streams, when the destination UDP port numbers shall start from the component_estination_UPD_port_num field and shall be incremented by two, to allow for the RTCP streams associated with the RTP streams).

A destination_UDP_port_num field (16 bits) indicates a destination UDP port number for the corresponding IP stream component. For RTP streams, the value of component_estination_UDP_port_num shall be even, and the next higher value shall represent the destination UDP port number of the associated RTCP stream. (That is, the 16-bit unsigned integer field, that represents the destination UDP port number for this UDP/IP stream component. For RTP streams, the value of component_estination_UDP_port_num shall be even, and the next higher value shall represent the destination UDP port number of the associated RTCP stream).

A component_destination_IP_address field (32 bits or 128 bits) indicates a 32-bit destination IPv4 address for the corresponding IP stream component when the IP_version_flag field is set to '0'. Furthermore, when the IP_version_flag field is set to '1', the component_destination_IP_address field indicates a 128-bit destination IPv6 address for the corresponding IP stream component. (That is, this field shall be present if the component_destination_IP_address_flag is set to '1' and shall not be present if the component_destination_IP_address_flag is set to '0'. When this field is present, the destination address of the IP datagrams carrying this component of the M/H Service shall match the address in this field. When this field is not present, the destination address of the IP datagrams carrying this component shall match the address in the M/H_service_destination_IP_address field. The conditional use of the 128 bit-long address version of this field is to facilitate possible use of IPv6 in the future, although use of IPv6 is not currently defined).

A num_component_level_descriptors field (4 bits) indicates the number of descriptors that provide additional information about the component level.

The same number of descriptors component_level_descriptor( ) as a number corresponding to the num_component_level_descriptors field value are included in the component loop to provide additional information about the component.

A num_service_level_descriptors field (4 bits) indicates the number of descriptors that provide additional information about the service level.

The same number of descriptors service_level_descriptor( ) as a number corresponding to the num_service_level_descriptors field value are included in the service loop to provide additional information about the service.

A num_ensemble_level_descriptors field (4 bits) indicates the number of descriptors that provide additional information about the ensemble level.

The same number of descriptors ensemble_level_descriptor( ) as a number corresponding to the num_ensemble_level_descriptors field value are included in the ensemble loop to provide additional information about the ensemble.

On the other hand, in the SMT of FIG. 30, the component_descriptor( ) as shown in FIG. 16 can also be provided as the component_level_descriptors.

The component_descriptor( ) is used as one of the component level descriptor component_level_descriptors ( ) of the SMT and describes additional signaling information of the corresponding component.

Accordingly, in a mobile NRT service, signaling information required to receive a corresponding FLUTE session can also be provided using the component_descriptor( ) descriptor of FIG. 16.

For example, if the component_type field value of the component_descriptor( ) of FIG. 16 is 38, the component_data (component_type) field provides data for FLUTE file delivery as shown in FIG. 17. A description of the fields of FIGS. 16 and 17 is omitted herein since they have already been described above.

Media object association information may also be provided in the SMT of FIG. 30.

In an embodiment, when media object association information is present, the NRT_media_object_association_descriptor( ) as shown in FIG. 12 is provided as a component level descriptor. In this case, the receiver parses all descriptors included in the component level descriptor. Here, an NRT_media_object_association_descriptor( ) can be identified using the identifier of the descriptor. A description of each field of the NRT_media_object_association_descriptor and a procedure for extracting media object association information in text format from the NRT_media_object_association_descriptor( ) is omitted herein since reference can be made to the above description of the NST of FIG. 12. Here, a media_object_association_indicator field (1 bit) may also be allocated to the SMT of FIG. 30 in order to indicate whether or not an NRT_media_object_association_descriptor( ) is present in the component loop.

In another embodiment, media object association information may also be provided using a component_descriptor( ) as shown in FIG. 16. Here, the component_type field value may use a value between 43 and 71. In an embodiment of the present invention, 43 is allocated to the component_type field value to provide the media object association information as component data. The illustrated number is only an example and does not limit the scope of the present invention. That is, if the component_type field value is 43, the component_data (component_type) field provides component data for media object association information as shown in FIG. 18. A description of each field of FIG. 17 is omitted herein since reference can be made to FIG. 12.

In another embodiment, when media object association information is provided using the component_descriptor( ) as shown in FIG. 16, one of the values in a dynamic range of 96-127 may also be allocated to the component_type field value. In this case, the media object association information may be provided using the component data as shown in FIG. 19. In FIG. 19, a value of 0x2 or a value in a range of 0x4-0xF may be allocated to the general_media_type field value and media object association information may be provided in text format using the media_type_text ( ) field and the decoding_parameters_text ( ) field. In FIG. 19, a media_type_text_length field (8 bits) indicates the byte length of a subsequent media_type_text ( ) character string. (That is, this field shall specify the length (in bytes) of the media_type_text ( ) character string.) The media_type_text ( ) field indicates a media type that identifies the encoding format. That is, this field indicates, in text format, the encoding format of a stream corresponding to the general media type. A decoding_parameters_text_length field (8 bits) indicates the byte length of a subsequent decoding_parameters_text ( ) character string. (That is, this field shall specify the length (in bytes) of the decoding_parameters_text ( ) character string.) The decoding_parameters_text ( ) field indicates, in text format, decoding parameters of a stream corresponding to the general media type.

In an embodiment, the media_type_text ( ) field and the decoding_parameters_text ( ) field provide the encoding format and the decoding parameter in text format expressed in a Multipurpose Internet Mail Extensions (MIME) type.

That is, all information that are necessary for receiving the FLUTE session can be provided by performing signaling through component data bytes and information of all files that are transmitted through a FLUTE session can be obtained using an FDT received through the FLUTE session. Thus, it is possible to receive NRT service data.

At least container information, encoding information, or a media object decoding parameter, which are necessary for rendering the content/files of the NRT service according to the present invention, are signaled for each component in the corresponding NST.

On the other hand, according to the present invention, at least one container information, encoding information, or a media object decoding parameter, which are necessary for rendering the content/files of the NRT service, can be transmitted in OMA BCAST Service Guide (SG) information. Accordingly, for each of contents, the reception system can extract container information, encoding information, and a media object decoding parameter, which are necessary for rendering the content, and use the extracted information to perform rendering of the content.

Figure 31:
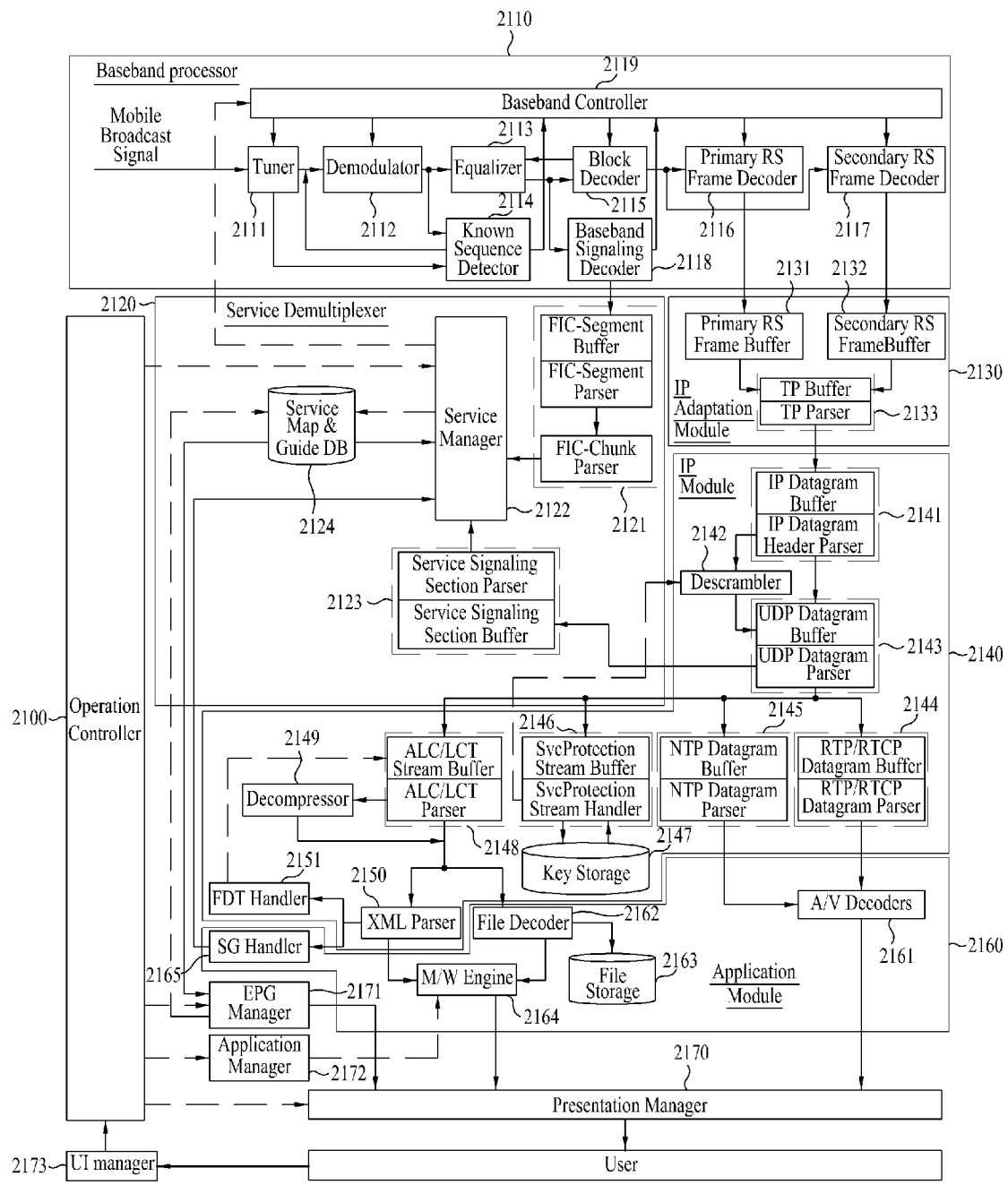
FIG. 31 is a block diagram illustrating an embodiment of a reception system that provides a mobile NRT service according to the present invention.

FIG. 31 illustrates an embodiment of a reception system that can receive, store, and present NRT content for a mobile NRT service. In FIG. 31, a solid arrow denotes a data path and a dotted arrow denotes a control signal path.

The receiving system according to the present invention may include an operation controller 2100, a tuner 2111, a demodulator 2112, an equalizer 2113, a known sequence detector (or known data detector) 2114, a block decoder 2115, a primary Reed-Solomon (RS) frame decoder 2116, a secondary RS frame decoder 2117, a signaling decoder 2118, and a baseband controller 2119. The receiving system according to the present invention may further include an FIC handler 2121, a service manager 2122, a service signaling handler 2123, and a first storage unit 2124. The receiving system according to the present invention may further include a primary RS frame buffer 2131, a secondary RS frame buffer 2132, and a transport packet (TS) handler 2133. The receiving system according to the present invention may further include an Internet Protocol (IP) datagram handler 2141, a descrambler 2142, an User Datagram Protocol (UDP) datagram handler 2143, a Real-time Transport Protocol/Real-time Transport Control Protocol (RTP/RTCP) datagram handler 2144, a Network Time Protocol (NTP) datagram handler 2145, a service protection stream handler 2146, a second storage unit 2147, an Asynchronous Layered Coding/Layered Coding Transport (ALC/LCT) stream handler 2148, an Extensible Mark-up Language (XML) parser 2150, and a Field Device Tool (FDT) handler 2151. The receiving system according to the present invention may further include an Audio/Video (A/V) decoder 2161, a file decoder 2162, a third storage unit 2163, a middle ware (M/W) engine 2164, and a Service Guide (SG) handler 2165. The receiving system according to the present invention may further include an Electronic Program Guide (EPG) manager 2171, an application manager 2172, and an User Interface (UI) manager 2173.

Herein, for simplicity of the description of the present invention, the operation controller 2100, the tuner 2111, the demodulator 2112, the equalizer 2113, the known sequence detector (or known data detector) 2114, the block decoder 2115, the primary RS frame decoder 2116, the secondary RS frame decoder 2117, the signaling decoder 2118, and the baseband controller 2119 will be collectively referred to as a baseband processor 2110. The FIC handler 2121, the service manager 2122, the service signaling handler 2123, and the first storage unit 2124 will be collectively referred to as a service multiplexer 2120. The primary RS frame buffer 2131, the secondary RS frame buffer 2132, and the TS handler 2133 will be collectively referred to as an IP adaptation module 2130. The IP datagram handler 2141, the descrambler 2142, the UDP datagram handler 2143, the RTP/RTCP datagram handler 2144, the NTP datagram handler 2145, the service protection stream handler 2146, the second storage unit 2147, the ALC/LCT stream handler 2148, the XML parser 2150, and the FDT handler 2151 will be collectively referred to as a common IP module 2140. The A/V decoder 2161, the file decoder 2162, the third storage unit 2163, the M/W engine 2164, and the SG handler 2165 will be collectively referred to as an application module 2160.

In addition, although the terms used in FIG. 31 are selected from generally known and used terms, some of the terms mentioned in the description of FIG. 31 have been selected by the applicant at his or her discretion, the detailed meanings of which are described in relevant parts of the description herein. Furthermore, it is required that the present invention is understood, not simply by the actual terms used but by the meaning of each term lying within.

Referring to FIG. 31, the baseband controller 2119 controls the operation of each block included in the baseband processor 2110.

By tuning the receiving system to a specific physical channel frequency (or physical transmission channel frequency, PTC), the tuner 2111 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 2112 and the known sequence detector 2114. More specifically, the tuner 2111 may receive main service data and mobile service data which are real-time service data, and receive non-real time service data.

The passband digital IF signal being outputted from the tuner 2111 may only include main service data, or only include mobile service data, or include both main service data and mobile service data.

The demodulator 2112 performs self-gain control, carrier recovery, and timing recovery processes on the passband digital IF signal inputted from the tuner 2111, thereby modifying the IF signal to a baseband signal. Then, the demodulator 2112 outputs the baseband signal to the equalizer 2113 and the known sequence detector 2114. The demodulator 2112 uses the known data symbol sequence inputted from the known sequence detector 2114 during the timing and/or carrier recovery, thereby enhancing the demodulating performance. The equalizer 2113 compensates channel-associated distortion included in the signal demodulated by the demodulator 2112. Then, the equalizer 2113 outputs the distortion-compensated signal to the block decoder 2115. By using a known data symbol sequence inputted from the known sequence detector 2114, the equalizer 2113 may enhance the equalizing performance. Furthermore, the equalizer 2113 may receive feed-back on the decoding result from the block decoder 2115, thereby enhancing the equalizing performance.

The known sequence detector 2114 detects known data place (or position) inserted by the transmitting system from the input/output data (i.e., data prior to being demodulated or data being processed with partial demodulation). Then, the known sequence detector 2114 outputs the detected known data position information and known data sequence generated from the detected position information to the demodulator 2112, the equalizer 2113, and the baseband controller 2119. Additionally, in order to allow the block decoder 2115 to identify the mobile service data that have been processed with additional encoding by the transmitting system and the main service data that have not been processed with any additional encoding, the known sequence detector 2114 outputs such corresponding information to the block decoder 2115.

If the data channel-equalized by the equalizer 2113 and inputted to the block decoder 2115 correspond to data processed with both block-encoding of serial concatenated convolution code (SCCC) method and trellis-encoding by the transmitting system (i.e., data within the RS frame, signaling data), the block decoder 2115 may perform trellis-decoding and block-decoding as inverse processes of the transmitting system. On the other hand, if the data channel-equalized by the equalizer 2113 and inputted to the block decoder 2115 correspond to data processed only with trellis-encoding and not block-encoding by the transmitting system (i.e., main service data), the block decoder 2115 may perform only trellis-decoding.

The signaling decoder 2118 decodes signaling data that have been channel-equalized and inputted from the equalizer 2113. It is assumed that the signaling data (or signaling information) inputted to the signaling decoder 2118 correspond to data processed with both block-encoding and trellis-encoding by the transmitting system. Examples of such signaling data may include transmission parameter channel (TPC) data and fast information channel (FIC) data.

For example, among the data that are being inputted, the signaling decoder 2118 performs regressive turbo decoding of a parallel concatenated convolution code (PCCC) method on data corresponding to the signaling information region. Subsequently, the signaling decoder 2118 separates FIC data and TPC data from the regressive-turbo-decoded signaling data. Additionally, the signaling decoder 2118 performs RS-decoding as inverse processes of the transmitting system on the separated TPC data, thereby outputting the processed data to the baseband controller 2119. Also, the signaling decoder 2118 performs deinterleaving in sub-frame units on the separated FIC data, so as to perform RS-decoding as inverse processes of the transmitting system on the deinterleaved FIC data, thereby outputting the processed data to the FIC handler 2121. The FIC data being deinterleaved and RS-decoded from the signaling decoder 2118 and outputted to the FIC handler 2121 are transmitted in units of FIC segments.

The FIC handler 2121 receives FIC data from the signaling decoder 2118, so as to extract signaling information for service acquisition (i.e., mapping information between an ensemble and a mobile service). In order to do so, the FIC handler 2121 may include an FIC segment buffer, an FIC segment parser, and an FIC chunk parser.

The FIC segment buffer buffers FIC segment groups being inputted in M/H frame units from the signaling decoder 2118, thereby outputting the buffered FIC segment groups to the FIC segment parser. Thereafter, the FIC segment parser extracts the header of each FIC segment stored in the FIC segment buffer so as to analyze the extracted headers. Then, based upon the analyzed result, the FIC segment parser outputs the payload of the respective FIC segments to the FIC chunk parser. The FIC chunk parser uses the analyzed result outputted from the FIC segment parser so as to recover the FIC chunk data structure from the FIC segment payloads, thereby analyzing the received FIC chunk data structure. Subsequently, the FIC chunk parser extracts the signaling information for service acquisition. The signaling information acquired from the FIC chunk parser is outputted to the service manager 2122.

Meanwhile, the service signaling handler 2123 includes a service signaling buffer and a service signaling parser. The service signaling handler 2123 buffers table sections (for example, SMT sections) of a service signaling channel received from the UDP datagram handler 2143 and analyzes and processes the buffered table sections. The SMT information processed by the service signaling handler 2123 is also output to the service manager 2122.

In an embodiment, the SMT section or a service signaling channel that carries the SMT section is received within a corresponding RS frame in a format of a UDP/IP packet that has a well-known IP destination address and a well-known destination UDP port number. Accordingly, the reception system can parse each SMT section and descriptors of each SMT section without requiring additional information.

The SMT section provides signaling information (including IP access information) of all services in an ensemble that includes the SMT section. Therefore, the reception system can provide a service desired by the user to the user by accessing an IP stream component belonging to the desired service using the information parsed from the SMT.

If the service is an NRT service, access information of a FLUTE session that carries the content/files that constitute the NRT service and signaling information required to perform rendering of the NRT service can be extracted from the SMT. For example, information necessary for rendering the content/files of an NRT service transmitted through each FLUTE session can be extracted from the SMT. The information necessary for rendering the content/files of the NRT service may be container information, encoding information, or a media object decoding parameter.

The information parsed from the SMT is collected by the service manager 2122 and is then stored in the first storage unit 2124. The service manager 2122 stores the information extracted from the SMT in the first storage unit 2124 in a service map and guide data format.

That is, the service manager 2122 uses the signaling information collected from each of the FIC handler 2121 and the service signaling handler 2123, so as to configure a service map. Thereafter, the service manager 2122 uses a service guide (SG) collected from the service guide (SG) handler 2165 so as to draw up a program guide. Then, the service manager 2122 controls the baseband controller 2119 so t h at a user can receive (or be provided with) a user-requested mobile service by referring to the service map and service guide. Furthermore, the service manager 2122 may also control the system so that the program guide can be displayed on at least a portion of the display screen based upon the user's input.

The first storage unit 2124 stores the service map and service guide drawn up by the service manager 2122. Also, based upon the requests from the service manager 2122 and the EPG manager 2171, the first storage unit 2124 extracts the required data, which are then transferred to the service manager 2122 and/or the EPG manager 2171.

The baseband controller 2119 receives the known data place information and TPC data, thereby transferring M/H frame time information, information indicating whether or not a data group exists in a selected parade, place information of known data within a corresponding data group, power control information, and so on to each block within the baseband processor 2110. The TPC data will be described in detail in a later.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data.

The primary RS frame decoder 2116 receives, as an input, the output of the block decoder 2115. Here, in an embodiment, the primary RS frame decoder 2116 receives mobile service data or NRT service data, which has been encoded through Reed Solomon (RS) encoding and/or Cyclic Redundancy Check (CRC) encoding, from the block decoder 2115. The primary RS frame decoder 2116 may also receive SMT section data or OMA BCAST SG data, which has been encoded through Reed Solomon (RS) encoding and/or Cyclic Redundancy Check (CRC) encoding, from the block decoder 2115.

That is, the primary RS frame decoder 2116 receives data that is not main service data, for example, at least one of mobile service data, NRT service data, SMT section data, and OMA BCAST SG data.

The primary RS frame decoder 2116 performs inverse processes of an RS frame encoder (not shown) included in the digital broadcast transmitting system, thereby correcting errors existing within the primary RS frame. More specifically, the primary RS frame decoder 2116 forms a primary RS frame by grouping a plurality of data groups and, then, correct errors in primary RS frame units. In other words, the primary RS frame decoder 2116 decodes primary RS frames, which are being transmitted for actual broadcast services. The primary RS frame decoded by the primary RS frame decoder 2116 outputs to the primary RS frame buffer 2131. The primary RS frame buffer 2131 buffers the primary RS frame, and then configures an M/H TP in each row unit. The M/H TPs of the primary RS frame outputs to the TP handler 2133.

Additionally, the secondary RS frame decoder 2117 receives, as an input, the output of the block decoder 2115. Herein, in an embodiment, the secondary RS frame decoder 2117 receives mobile service data or NRT service data, which has been encoded through Reed Solomon (RS) encoding and/or Cyclic Redundancy Check (CRC) encoding, from the block decoder 2115. The secondary RS frame decoder 2117 may also receive SMT section data or OMA BCAST SG data, which has been encoded through Reed Solomon (RS) encoding and/or Cyclic Redundancy Check (CRC) encoding, from the block decoder 2115.

That is, the secondary RS frame decoder 2117 receives data that is not main service data, for example, at least one of mobile service data, NRT service data, SMT section data, and OMA BCAST SG data.

The secondary RS frame decoder 2117 performs inverse processes of an RS frame encoder (not shown) included in the digital broadcast transmitting system, thereby correcting errors existing within the secondary RS frame. More specifically, the secondary RS frame decoder 2117 forms a secondary RS frame by grouping a plurality of data groups and, then, correct errors in secondary RS frame units. In other words, the secondary RS frame decoder 2117 decodes secondary RS frames, which are being transmitted for actual broadcast services. The secondary RS frame decoded by the secondary RS frame decoder 2117 outputs to the secondary RS frame buffer 2132. The secondary RS frame buffer 2132 buffers the secondary RS frame, and then configures an M/H TP in each row unit. The M/H TPs of the secondary RS frame outputs to the TP handler 2133.

The TP handler 2133 consists of a TP buffer and a TP parser. The TP handler 2133 buffers the M/H TPs inputted from the primary RS frame buffer 2131 and the secondary RS frame buffer 2132, and then extracts and analyzes each header of the buffered M/H TPs, thereby recovering IP datagram from each payload of the corresponding M/H TPs. The recovered IP datagram is outputted to the IP datagram handler 2141.

The IP datagram handler 2141 consists of an IP datagram buffer and an IP datagram parser. The IP datagram handler 2141 buffers the IP datagram delivered from the TP handler 2133, and then extracts and analyzes a header of the buffered IP datagram, thereby recovering UDP datagram from a payload of the corresponding IP datagram. The recovered UDP datagram is outputted to the UDP datagram handler 2143.

If the UDP datagram is scrambled, the scrambled UDP datagram is descrambled by the descrambler 2142, and the descrambled UDP datagram is outputted to the UDP datagram handler 2143. For example, when the UDP datagram among the received IP datagram is scrambled, the descrambler 2142 descrambles the UDP datagram by inputting an encryption key and so on from the service protection stream handler 2146, and outputs the descrambled UDP datagram to the UDP datagram handler 2143.

The UDP datagram handler 2143 consists of an UDP datagram buffer and an UDP datagram parser. The UDP datagram handler 2143 buffers the UDP datagram delivered from the IP datagram handler 2141 or the descrambler 2142, and then extracts and analyzes a header of the buffered UDP datagram, thereby recovering data transmitted through a payload of the corresponding UDP datagram. If the recovered data is an RTP/RTCP datagram, the recovered data is outputted to the RTP/RTCP datagram handler 2144. If the recovered data is also an NTP datagram, the recovered data is outputted to the NTP datagram handler 2145. Furthermore, if the recovered data is a service protection stream, the recovered data is outputted to the service protection stream handler 2146. And, if the recovered data is an ALC/LCT stream, the recovered data is outputted to the ALC/LCT steam handler 2148. Also, when the recovered data is SMT section data, the recovered data output to the service signaling section handler 2123.

Since the SMT section or the service signaling channel that carries the SMT section is an IP datagram having a well-known IP destination address and a well-known destination UDP port number, the IP datagram handler 2141 and the UDP datagram handler 2143 can output data including the SMT section to the service signaling section handler 2123 without requiring additional information.

The RTP/RTCP datagram handler 2144 consists of an RTP/RTCP datagram buffer and an RTP/RTCP datagram parser. The RTP/RTCP datagram handler 2144 buffers the data of RTP/RTCP structure outputted from the UDP datagram handler 2143, and then extracts A/V stream from the buffered data, thereby outputting the extracted A/V stream to the A/V decoder 2161.

The A/V decoder 2161 decodes the audio and video streams outputted from the RTP/RTCP datagram handler 2144 using audio and video decoding algorithms, respectively. The decoded audio and video data is outputted to the presentation manager 2170. Herein, at least one of an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm can be used as the audio decoding algorithm and at least one of an MPEG 2 video decoding algorithm, an MPEG 4 video decoding algorithm, an H.264 decoding algorithm, an SVC decoding algorithm, and a VC-1 decoding algorithm can be used as the audio decoding algorithm.

The NTP datagram handler 2145 consists of an NTP datagram buffer and an NTP datagram parser. The NTP datagram handler 2145 buffers data having an NTP structure, the data being outputted from the UDP datagram handler 2143. Then, the NTP datagram handler 2145 extracts an NTP stream from the buffered data. Thereafter, the extracted NTP stream is outputted to the A/V decoder 2161 so as to be decoded.

The service protection stream handler 2146 may further include a service protection stream buffer. Herein, the service protection stream handler 2146 buffers data designated (or required) for service protection, the data being outputted from the UDP datagram handler 2143. Subsequently, the service protection stream handler 2146 extracts information required for descrambling from the extracted data. The information required for descrambling includes a key value, such as SKTM and LKTM. The information for descrambling is stored in the second storage unit 2147, and, when required, the information for descrambling is outputted to the descrambler 2142.

The ALC/LCT stream handler 2148 consists of an ALC/LCT stream buffer and an ALC/LCT stream parser. And, the ALC/LCT stream handler 2148 buffers data having an ALC/LCT structure, the data being outputted from the UDP datagram handler 2143. Then, the ALC/LCT stream handler 2148 analyzes a header and a header expansion of an ALC/LCT session from the buffered data. Based upon the analysis result of the header and header expansion of the ALC/LCT session, when the data being transmitted to the ALC/LCT session correspond to an XML structure, the corresponding data are outputted to an XML parser 2150. Alternatively, when the data being transmitted to the ALC/LCT session correspond to a file structure, the corresponding data are outputted to a file decoder 2162. At this point, when the data that are being transmitted to the ALC/LCT session are compressed, the compressed data are decompressed by a decompressor 2149, thereby being outputted to the XML parser 2150 or the file decoder 2162.

The XML parser 2150 analyses the XML data being transmitted through the ALC/LCT session. Then, when the analyzed data correspond to data designated to a file-based service, the XML parser 2150 outputs the corresponding data to the FDT handler 2151. On the other hand, if the analyzed data correspond to data designated to a service guide, the XML parser 2150 outputs the corresponding data to the SG handler 2165. The FDT handler 2151 analyzes and processes a file description table of a FLUTE protocol, which is transmitted in an XML structure through the ALC/LCT session.

The SG handler 2165 collects and analyzes the data designated for a service guide, the data being transmitted in an XML structure, thereby outputting the analyzed data to the service manager 2122.

The file decoder 2162 decodes the data having a file structure and being transmitted through the ALC/LCT session, thereby outputting the decoded data to the middleware engine 2164 or storing the decoded data in a third storage unit 2163. Herein, the middleware engine 2164 translates the file structure data (i.e., the application) and executes the translated application. Thereafter, the application may be outputted to an output device, such as a display screen or speakers, through the application presentation manager 2170. According to an embodiment of the present invention, the middleware engine 2164 corresponds to a JAVA-based middleware engine.

Based upon a user-input, the EPG manager 2171 receives EPG data either through the service manager 2122 or through the SG handler 2165, so as to convert the received EPG data to a display format, thereby outputting the converted data to the presentation manager 2170.

The application manager 2172 performs overall management associated with the processing of application data, which are being transmitted in object formats, file formats, and so on. Furthermore, based upon a user-command inputted through the UI manager 2173, the operation controller 2100 controls at least one of the service manager 2122, the EPG manager 2171, the application manager 2172, and the presentation manager 2170, so as to enable the user-requested function to be executed.

The UI manager 2173 transfers the user-input to the operation controller 2100 through the UI.

Finally, the presentation manager 2170 provides at least one of the audio and video data being outputted from the A/V decoder 2161 and the EPG data being outputted from the EPG manager 2171 to the user through the speaker and/or display screen.

Herein, one of the service signaling section handler 2123 and the service manager 2122 obtains IP access information associated with a FLUTE session that carries the content/files of the NRT service from the component loop of the SMT of FIG. 30. In addition, when an NRT_media_object_association_descriptor( ) is received within the component loop of the NST), media object association information associated with the FLUTE session is extracted from the NRT_media_object_association_descriptor( ). In an embodiment, the media object association information is provided in a MIME type text format. Here, the media object association information is directly described in text format in the NRT_media_object_association_descriptor( ) or is provided in text format within a stream or file. In the case where the media object association information is transmitted in a stream or file format, the NRT_media_object_association_descriptor( ) provides access information used to receive the stream or file. In addition, in the case where the media object association information is transmitted in a file format, the NRT_media_object_association_descriptor( ) signals parameters required to receive the FLUTE session that carries the file. The media object association information includes container information, encoding information, a media object decoding parameter, or the like that are necessary for rendering the content/files of the NRT service. In another embodiment, the media object association information can also be extracted using a component_descriptor( ) that is received within the component loop. A description of the procedure for extracting the media object association information is omitted herein since it has already been described above in detail.

In addition, FLUTE level access information can be obtained using the component_descriptor( ). Then, the ALC/LCT stream handler 2148 and the file decoder 2162 access the FLUTE file delivery session using the obtained FLUTE level access information to collect files that are received through the session. The files are collected to construct one NRT service. This NRT service is stored in the third storage unit 2163 or is output to the middleware engine 2164 or the A/V decoder 2161 to be displayed on the display.

The broadcast signal reception method and the reception system according to the present invention can efficiently combine and provide a real-time broadcast service and a non-real-time broadcast service.

In addition, according to the present invention, it is possible to provide access information of each FLUTE session for a fixed NRT service and a mobile NRT service in the IP layer. It is also possible to receive information necessary for rendering the content/files of an NRT service, which is transmitted through the FLUTE session, through an IP-based signaling information channel.

Further, the reception system according to the present invention can receive information necessary for rendering the content/files of an NRT service and to determine whether or not to process the NRT service according to the received information. That is, even when an NRT service is received, the reception system does not process the NRT service if the received information includes information that cannot be processed by the reception system, for example, if the reception system has no codec capable of decoding the NRT service.

The present invention is not limited to the above embodiments and it will be apparent to those skilled in the art that various modifications can be made to in the present invention as can be seen from the appended claims and such modifications are included in the scope of the invention.

What is claimed is:

1. A method of transmitting a broadcast signal for a non-real-time service (NRT), the method comprising:

generating the broadcast signal including the NRT service that is a broadcast service delivered in advance of its use and signaling data for signaling the NRT service; and transmitting the NRT service via a broadcast channel and the signaling data for the NRT service via a service signaling channel with a specific Internet Protocol (IP) address and a user datagram protocol (UDP) port number, wherein the signaling data includes a service map table and a NRT content table, wherein the NRT content table contains first information describing NRT content included in the NRT service, the NRT content available for download to storage in a broadcast receiving device, wherein the first information includes download time information specifying times during which the NRT content delivered in at least one FLUTE session is to be made available for download, wherein the NRT content is segmented into files that are delivered in the at least one FLUTE session, wherein the service map table contains service-level attributes for the NRT service including the NRT content, second information used as a link from the service map table to the to the NRT content table, NRT service status information identifying a status of the NRT service, service protection information indicating whether service protection is applied to at least one component needed to provide a meaningful presentation of the NRT service, component number information specifying a number of components in the NRT service, essential component information indicating whether each of the components is essential or optional for the NRT service, component destination information specifying a destination address of IP datagrams carrying at least one of the components of the NRT service, component level descriptor number information specifying a number of component level descriptors providing additional information for the at least one of the components, and service level descriptor number information specifying a number of service level descriptors providing additional information for the NRT service, wherein a most significant bit of the NRT service status information indicates whether the NRT service is active or inactive, wherein a least significant bit of the NRT service status information indicates whether or not the NRT service is hidden, and wherein the service map table further contains third information indicating capabilities used for the NRT service, the capabilities including a media type factor indicating a media type of the NRT service, the media type specifying a codec applied to the NRT service and a forward error correction (FEC) factor indicating an FEC coding algorithm applied to data of the NRT service.

2. The method of claim 1, wherein:

the NRT service is transmitted within IP packets associated with a virtual channel and identified by references in a Virtual Channel Table (VCT) and an associated Program Map Table (PMT) table; and the IP packets are carried in a Moving Picture Experts Group-2 (MPEG-2) Transport Stream using digital storage media command and control (DSM-CC) Addressable Sections.

3. The method of claim 2, wherein the service signaling channel is carried in a portion of the IP packets.

4. The method of claim 1, wherein the NRT content table further contains content length information specifying a duration of playback of NRT content transmitted via the broadcast channel.

5. The method of claim 1, wherein the NRT content table further contains fourth information indicating capabilities used for NRT content data, the capabilities including media type information indicating a media type of the NRT content data and FEC information indicating an FEC coding algorithm applied to the NRT content data.

6. The method of claim 1, wherein the NRT content table further contains content size information indicating a total size in bytes of NRT content data for NRT content.

7. An apparatus for receiving a broadcast signal for a non-real-time (NRT) service, the apparatus comprising:

a tuner configured to receive the broadcast signal including the NRT service that is a broadcast service that is delivered in advance of its use and signaling data for signaling the NRT service, wherein the NRT service is received via a broadcast channel and the signaling data for the NRT service is received via a service signaling channel with a specific Internet Protocol (IP) address and a user datagram protocol (UDP) port number;

a processor configured to parse a service map table containing service-level attributes for the NRT service including NRT content from the signaling data, to obtain first information used as a link to a NRT content table from the service map table, and to parse the NRT content table containing second information describing the NRT content available for download by using the first information, wherein the second information includes download time information specifying times during which the NRT content delivered in at least one FLUTE session is to be made available for download, wherein the NRT content is segmented into files that are delivered in the at least one FLUTE sessions; and a storage unit configured to store the NRT content in the parsed NRT content table based on the second information, wherein the service map table further contains third information indicating capabilities used for the NRT service, the capabilities including a media type factor indicating a media type of the NRT service, the media type specifying a codec applied to the NRT service, a forward error correction (FEC) factor indicating an FEC coding algorithm applied to data of the NRT service, NRT service status information identifying a status of the NRT service, service protection information indicating whether service protection is applied to at least one component needed to provide a meaningful presentation of the NRT service, component number information specifying a number of components in the NRT service, essential component information indicating whether each of the components is essential or optional for the NRT service, component destination information specifying a destination address of IP datagrams carrying at least one of the components of the NRT service, component level descriptor number information specifying a number of component level descriptors providing additional information for the at least one of the components, and service level descriptor number information specifying a number of service level descriptors providing additional information for the NRT service, wherein a most significant bit of the NRT service status information indicates whether the NRT service is active or inactive, wherein a least significant bit of the NRT service status information indicates whether or not the NRT service is hidden.

8. The apparatus of claim 7, wherein:

the NRT service is delivered within IP packets, the IP packets associated with a virtual channel and identified by references in a Virtual Channel Table (VCT) and an associated Program Map Table (PMT) table; and the IP packets are carried in a Moving Picture Experts Group-2 (MPEG-2) Transport Stream using digital storage media command and control (DSM-CC) Addressable Sections.

9. The apparatus of claim 8, wherein the service signaling channel is carried in a portion of the IP packets.

10. The apparatus of claim 7, wherein the NRT content table further contains content length information specifying a duration of playback of NRT content transmitted via the broadcast channel.

11. The apparatus of claim 7, wherein the NRT content table further contains fourth information indicating capabilities used for NRT content data, the capabilities including media type information indicating a media type of the NRT content data and FEC information indicating an FEC coding algorithm applied to the NRT content data.

12. The apparatus of claim 7, wherein the NRT content table further contains content size information indicating a total size in bytes of NRT content data for NRT content.

\* \* \* \* \*